United States Patent
Hampel et al.

(10) Patent No.: US 10,560,879 B2
(45) Date of Patent: Feb. 11, 2020

(54) TECHNIQUES FOR ESTABLISHING A SECURE CONNECTION BETWEEN A WIRELESS DEVICE AND A LOCAL AREA NETWORK VIA AN ACCESS NODE

(71) Applicant: QUALCOMM Incorporated, San Diego, CA (US)

(72) Inventors: Karl Georg Hampel, New York, NY (US); Vincent Douglas Park, Budd Lake, NJ (US); Hong Cheng, Bridgewater, NJ (US); Gavin Bernard Horn, La Jolla, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 15/448,322

(22) Filed: Mar. 2, 2017

(65) Prior Publication Data

US 2018/0041490 A1  Feb. 8, 2018

Related U.S. Application Data

(60) Provisional application No. 62/371,650, filed on Aug. 5, 2016, provisional application No. 62/371,586, filed
(Continued)

(51) Int. Cl.
*H04L 29/06* (2006.01)
*H04W 36/08* (2009.01)
(Continued)

(52) U.S. Cl.
CPC ............. *H04W 36/08* (2013.01); *H04L 63/06* (2013.01); *H04L 63/08* (2013.01);
(Continued)

(58) Field of Classification Search
CPC . H04W 74/0833; H04W 72/02; H04W 76/11; H04W 12/04; H04W 48/12;
(Continued)

(56) References Cited

U.S. PATENT DOCUMENTS 8,248,915 B2  8/2012  Baglin et al.
8,639,251 B2  1/2014  Gunnarsson et al.
(Continued)

FOREIGN PATENT DOCUMENTS

WO    WO-2014100393 A1    6/2014

OTHER PUBLICATIONS

ISA/EP, International Search Report and Written Opinion of the International Searching Authority, Int'l Application No. PCT/US2017/043355, dated Oct. 18, 2017, European Patent Office, Rijswijk, NL, 14 pgs.

(Continued)

*Primary Examiner* — Abu S Sholeman
(74) *Attorney, Agent, or Firm* — Holland & Hart LLP

(57) ABSTRACT

Methods, systems, and devices for wireless communication are described. In one method, a wireless device may establish a connection with an access node (AN) of a local area network (LAN). The wireless device may also determine to perform an authentication. The wireless device may further receive an indication, as part of the authentication, of a protocol end point for the authentication as being a non-access stratum (NAS) layer or a radio resource control (RRC) layer. In another method, an AN may establish a connection with a wireless device. The AN may determine the wireless device determined to perform an authentication with an authenticator included in the AN. The AN may further indicate, as part of the authentication, a protocol end point for the authentication as being the NAS layer or the RRC layer.

78 Claims, 29 Drawing Sheets

Related U.S. Application Data on Aug. 5, 2016, provisional application No. 62/371,593, filed on Aug. 5, 2016.

(51) Int. Cl.

| | | |
|---|---|---|
| *H04W 12/04* | (2009.01) | |
| *H04W 12/06* | (2009.01) | |
| *H04W 84/12* | (2009.01) | |
| *H04W 76/11* | (2018.01) | |
| *H04W 72/02* | (2009.01) | |
| *H04W 74/08* | (2009.01) | |
| *H04W 36/00* | (2009.01) | |

(52) U.S. Cl.
CPC .......... *H04L 63/0869* (2013.01); *H04L 63/10* (2013.01); *H04L 63/166* (2013.01); *H04L 63/20* (2013.01); *H04W 12/04* (2013.01); *H04W 12/06* (2013.01); *H04W 36/0077* (2013.01); *H04W 72/02* (2013.01); *H04W 74/0833* (2013.01); *H04W 76/11* (2018.02); *H04W 84/12* (2013.01); *H04L 2463/061* (2013.01)

(58) Field of Classification Search
CPC ...... H04W 84/12; H04W 36/30; H04L 63/10; H04L 63/06; H04L 63/0869; H04L 63/166; H04L 63/20; H04L 2463/061
USPC .......................................................... 726/1
See application file for complete search history.

(56) References Cited

U.S. PATENT DOCUMENTS

| | | | | |
|---|---|---|---|---|
| 9,043,873 B1* | 5/2015 | Azem | .................... | H04W 12/04 |
| | | | | 713/155 |
| 9,055,062 B1* | 6/2015 | Huang | ................ | H04L 63/0884 |
| 9,060,028 B1* | 6/2015 | Azem | .................... | H04L 63/205 |
| 2002/0044552 A1 | 4/2002 | Vialen et al. | | |
| 2004/0098586 A1 | 5/2004 | Rebo et al. | | |
| 2005/0050318 A1 | 3/2005 | Alone et al. | | |
| 2007/0064647 A1 | 3/2007 | Prasad | | |
| 2008/0318546 A1 | 12/2008 | Kitazoe et al. | | |
| 2012/0163313 A1* | 6/2012 | Jung | ................... | H04W 72/048 |
| | | | | 370/329 |
| 2013/0276076 A1* | 10/2013 | Gupta | ................... | H04W 12/06 |
| | | | | 726/5 |
| 2013/0329583 A1* | 12/2013 | Vrzic | ..................... | H04W 36/30 |
| | | | | 370/252 |
| 2014/0101726 A1* | 4/2014 | Gupta | ................ | H04N 21/2365 |
| | | | | 726/4 |
| 2015/0223106 A1* | 8/2015 | Van Phan | ............... | H04L 29/14 |
| | | | | 370/225 |
| 2015/0350988 A1 | 12/2015 | Himayat et al. | | |
| 2016/0127903 A1 | 5/2016 | Lee et al. | | |
| 2016/0174111 A1 | 6/2016 | Zhu et al. | | |
| 2017/0156063 A1* | 6/2017 | McCann | ................. | H04L 63/08 |
| 2018/0041898 A1 | 2/2018 | Hampel et al. | | |
| 2018/0041930 A1 | 2/2018 | Hampel et al. | | |

OTHER PUBLICATIONS

Khan et al., "Wireless Handoff Optimization: A Comparison of IEEE 802.11r and Hokey," EUNICE 2010, Proceedings of the 16th EUNICE/IFIP WG 6.6 Conference on Networked Services and Applications: Engineering, Control and Management, 2010, pp. 118-131, International Federation for Information Processing.

Nokia Corporation et al., "Correction of References to IETF Drafts (RFCs Published)," Change Request; , 3GPP TSG-SA3 (Security) Meeting SA3 #56, S3-091248, Seattle, USA, Jul. 6-10, 2009, 9 pgs., XP050636007, 3rd Generation Partnership Project.

Tabassam et al., "Fast and Seamless Handover for Secure Mobile Industrial Applications with 802.11r," IEEE 5th International Workshop on Performance and Management of Wireless and Mobile Networks (P2MNET 2009); Zurich, Switzerland, Oct. 20-23, 2009, pp. 750-757, XP031581410, ISBN: 978-1-4244-4487-8/09, Institute of Electrical and Electronics Engineers.

* cited by examiner

C-Plane

U-Plane

TECHNIQUES FOR ESTABLISHING A SECURE CONNECTION BETWEEN A WIRELESS DEVICE AND A LOCAL AREA NETWORK VIA AN ACCESS NODE

CROSS REFERENCES

The present application for patent claims priority to: U.S. Provisional Patent Application No. 62/371,650 by Hampel, et al., entitled "Techniques For Establishing A Secure Connection Between A Wireless Device And A Local Area Network Via An Access Node," filed Aug. 5, 2016, assigned to the assignee hereof; U.S. Provisional Patent Application No. 62/371,586 by Hampel, et al., entitled "Techniques For Handover of a Connection Between a Wireless Device and a Local Area Network, From a Source Access Node to a Target Access Node," filed Aug. 5, 2016, assigned to the assignee hereof; and U.S. Provisional Patent Application No. 62/371,593 by Hampel, et al., entitled "Techniques For Fast Transition of a Connection Between a Wireless Device and a Local Area Network, From a Source Access Node to a Target Access Node," filed Aug. 5, 2016, assigned to the assignee hereof.

BACKGROUND

The following relates generally to wireless communication, and more specifically to establishing a secure connection between a wireless device and a Local Area Network (LAN) via an Access Node (AN).

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communication system may include a number of base stations, each simultaneously supporting communication for multiple communication devices, which may each be referred to as a wireless device.

Cellular packet access systems allow mobile devices to connect to and exchange Internet Protocol (IP) packets with IP networks. Cellular packet access systems have primarily been developed for large scale deployments by mobile network operators. There also are a number of LAN-based packet access systems that use Institute of Electrical and Electronics Engineers (IEEE) 802-based protocols. LAN-based packet access systems are sometimes deployed in smaller-scale environments, such as in enterprises, factories, and other types of private premises. With increasing performance of cellular RATs, it may be desirable to employ aspects of these cellular RATs in LAN-based packet access systems.

SUMMARY

A wireless device (e.g., a user equipment (UE)) may establish a secure connection with a local area network (LAN) via an access node (AN) of the LAN (e.g., a node of a radio access network (RAN) of the LAN). In some cases, the connection may be established with the AN using a cellular radio access technology (RAT). The LAN may include an authenticator, and the authenticator may be co-located with the AN or hosted at a node of the LAN located apart from the AN. In some cases, the AN may be in communication with central network node such as a core network (CN), and the central network node may contain a second authenticator. When establishing the connection with the AN, the wireless device may determine which authenticator to use for authentication, and may perform an authentication with the authenticator included in the LAN (e.g., at the AN, or apart from the AN) when establishing a connection with the LAN. The wireless device may receive (e.g., as part of the authentication) an indication of a protocol end point for the authentication as being a non-access stratum (NAS) layer or a radio resource control (RRC) layer. The RRC layer may be used for performing authentication with an authenticator that is co-located with the AN, and the NAS layer may be used for performing authentication with an authenticator that is not co-located with the AN, such as elsewhere on the LAN or at a CN operated by a cellular network operator (e.g., separate from the LAN). The wireless device may establish a radio bearer (e.g., associated with the established connection with the AN) to perform the authentication. The radio bearer may be established as part of establishing the connection with the AN. In some cases, performing the authentication may include exchanging authentication information with the authenticator over the radio bearer, and generating a security key based at least in part on the exchanged authentication information. Communications with the LAN may then be secured based at least in part on the security key.

According to aspects of the present disclosure, LAN protocols may be modified to support network-centric handover operations to facilitate smooth transitions from a source AN to a target AN, and accordingly reduce service interruptions that would otherwise be experienced when using legacy handover processes of a LAN. For example, the described modifications to LAN protocols may support the use of temporary security keys, which may be used to enable a wireless connection with a target AN according to a restriction policy. The restriction policy may include, for example, an expiration time for using the temporary security key, an amount of data allowed when using the temporary security key, and/or particular radio bearers that may be used with the temporary security key. A source AN may provide the temporary security key to the target AN, which may be permitted by the modified LAN protocols due to enhanced security protocols that enable ANs to be entrusted with the exchange of such security information. This level of trust may not present in legacy LAN deployments (e.g., those that operate according to Wi-Fi protocols), and therefore such an exchange of security information between access points of a legacy LAN would not be permitted.

Thus, according to the present disclosure, upon the initiation of a network-coordinated handover procedure a wireless device may securely communicate with a LAN based at least in part on a temporary security key provided by a source AN to a target AN, and a restriction policy for the temporary security key. The wireless device may subsequently perform an authentication procedure to obtain another key that not subject to the restriction policy (e.g., via a connection supported by the temporary security key), and securely communicate with the LAN based at least in part on the other security key. Accordingly, a wireless device may benefit from a modified handover procedure coordinated by devices of a LAN operating according to modified protocols, and communicating according to a temporary security key that reduces service interruptions, while also performing a more substantial authentication with the LAN such as authentications according to Wi-Fi protocols or other proprietary security solutions that may be deployed at the LAN.

According to aspects of the present disclosure, LAN protocols may be modified to support network-centric handover operations to facilitate smooth transitions from a source AN to a target AN, and accordingly reduce service interruptions that would otherwise be experienced when using legacy handover processes of a LAN. For example, the described modifications to LAN protocols may support the use of fast transition parameters with network-centric handovers, which may permit authentications to occur prior to a network-initiated handover command being issued to a wireless device and thus enable a handover from a source AN to a target AN to occur more rapidly. The fast transition parameters may be transmitted by a wireless device to an AN, and the AN (e.g., a source AN) may be entrusted to cache the fast transition parameters for forwarding during a subsequent handover. The entrusting of a wireless device's fast transition parameters at ANs may be permitted by the modified LAN protocols due to enhanced security protocols that enable ANs to be entrusted with the caching and exchange of such security information. This level of trust may not present in legacy LAN deployments (e.g., those that operate according to Wi-Fi protocols), and therefore such an exchange of fast transition parameters between access points of a legacy LAN would not be permitted.

Thus, according to the present disclosure, upon the initiation of a network-coordinated handover procedure for a wireless device, a source AN may forward cached fast transition parameters of the wireless device to a target AN. The target AN may perform a subsequent authentication (e.g., with an authentication node of the LAN, or with an authenticator that is co-located with the target AN) based at least in part on the fast transition parameters. The target AN may forward security parameters associated with the authentication to the source AN, and the source AN may transmit a handover command to the wireless device that includes the security parameters. Accordingly, the wireless device may benefit from a modified handover procedure coordinated by devices of a LAN that is operating according to modified protocols, including an exchange of fast transition parameters between ANs. The described operations may reduce service interruptions of a wireless device because certain authentication operations may be coordinated by devices of the LAN according to the modified LAN protocols without involvement of the wireless device, and also may be performed prior to the wireless device terminating a connection with a source AN.

According to at least one implementation, a method for wireless communication at a wireless device includes: establishing a connection with an AN of a LAN; determining to perform an authentication; receiving an indication of a protocol end point for the authentication as being a NAS layer or a RRC layer; and performing the authentication with the protocol end point, via the connection established with the AN, based at least in part on the received indication.

According to at least another implementation, an apparatus for wireless communication at a wireless device includes: means for establishing a connection with an AN of a LAN; means for determining to perform an authentication; means for receiving an indication of a protocol end point for the authentication as being a NAS layer or a RRC layer; and means for performing the authentication with the protocol end point, via the connection established with the AN, based at least in part on the received indication.

According to at least another implementation, an apparatus for wireless communication at a wireless device includes a processor and memory in electronic communication with the processor. Instructions are stored in the memory and operable, when executed by the processor, to cause the apparatus to: establish a connection with an AN of a LAN; determine to perform an authentication; receive an indication of a protocol end point for the authentication as being a NAS or a RRC layer; and perform the authentication with the protocol end point, via the connection established with the AN, based at least in part on the received indication.

According to at least another implementation, a non-transitory computer-readable medium stores computer-executable code for wireless communication at a wireless device. The code is executable to: establish a connection with an AN of a LAN; determine to perform an authentication; receive an indication of a protocol end point for the authentication as being a NAS layer or a RRC layer; and perform the authentication with the protocol end point, via the connection established with the AN, based at least in part on the received indication.

In some examples of the method, apparatuses, or non-transitory computer-readable medium for wireless communication at a wireless device, the protocol end point for the authentication includes an authenticator, and the method, apparatus, or non-transitory computer-readable medium includes operations, features, means, or instructions for transmitting, to the AN, an indication that the authentication is to be performed with the authenticator.

In some examples of the method, apparatuses, or non-transitory computer-readable medium for wireless communication at a wireless device, the transmitted indication that the authentication is to be performed with the authenticator is transmitted in a RRC connection establishment message.

Some examples of the method, apparatuses, or non-transitory computer-readable medium for wireless communication at a wireless device include operations, features, means, or instructions for: selecting at least one resource for performing a random access procedure; and performing the random access procedure with the AN using the at least one selected resource, wherein the at least one selected resource for performing the random access procedure comprises the indication that the authentication is to be performed with the authenticator.

In some examples of the method, apparatuses, or non-transitory computer-readable medium for wireless communication at a wireless device, the protocol end point for the authentication includes an authenticator, and the method, apparatus, or non-transitory computer readable medium includes operations, features, means, or instructions for: receiving an indication that the AN performs authentications using the authenticator, and determining to perform the authentication is based at least in part on receiving the indication that the AN performs authentications using the authenticator.

In some examples of the method, apparatuses, or non-transitory computer-readable medium for wireless communication at a wireless device, the indication that the AN performs authentications using the authenticator is received in at least one of: system information, a response to a query of the wireless device, a random access channel (RACH) establishment message, or a combination thereof.

Some examples of the method, apparatuses, or non-transitory computer-readable medium for wireless communication at a wireless device include operations, features, means, or instructions for: receiving an indication that the AN performs authentications using a second authenticator, and the second authenticator is contained in a CN associated with the AN.

In some examples of the method, apparatuses, or non-transitory computer-readable medium for wireless communication at a wireless device, determining to perform an authentication includes operations, features, means, or instructions for: selecting an authenticator that is co-located with the AN, the second authenticator, or both to perform the authentication.

In some examples of the method, apparatuses, or non-transitory computer-readable medium for wireless communication at a wireless device, determining to perform the authentication is based at least in part on a configuration of the AN stored at the wireless device.

Some examples of the method, apparatuses, or non-transitory computer-readable medium for wireless communication at a wireless device include operations, features, means, or instructions for: receiving an identifier associated with the AN; and retrieving the configuration of the AN based at least in part on the received identifier.

In some examples of the method, apparatuses, or non-transitory computer-readable medium for wireless communication at a wireless device, the authentication is performed over a radio bearer associated with the connection established with the AN.

In some examples of the method, apparatuses, or non-transitory computer-readable medium for wireless communication at a wireless device, the authentication is performed over the RRC layer.

In some examples of the method, apparatuses, or non-transitory computer-readable medium for wireless communication at a wireless device, the protocol end point for the authentication includes an authenticator, and performing the authentication includes operations, features, means, or instructions for: exchanging authentication information with the authenticator over the radio bearer; exchanging at least one random parameter with the AN over the radio bearer; and generating a security key based at least in part on the exchanged authentication information and the at least one random parameter.

Some examples of the method, apparatuses, or non-transitory computer-readable medium for wireless communication at a wireless device include operations, features, means, or instructions for: establishing one or more additional radio bearers based at least in part on the security key; and securely communicating with the LAN, over the connection via the radio bearer, the one or more additional radio bearers, or both, based at least in part on the generated security key.

In some examples of the method, apparatuses, or non-transitory computer-readable medium for wireless communication at a wireless device, the authentication is based at least in part on an extensible authentication protocol (EAP) performed over a radio bearer associated with the connection established with the AN.

In some examples of the method, apparatuses, or non-transitory computer-readable medium for wireless communication at a wireless device, the authentication is performed over the RRC layer or Ethernet.

In some examples of the method, apparatuses, or non-transitory computer-readable medium for wireless communication at a wireless device, the protocol end point for the authentication includes a first authenticator, and the method, apparatus, or non-transitory computer-readable medium includes operations, features, means, or instructions for: determining to perform a second authentication with a second authenticator, the second authenticator contained in a CN in communication with the AN; and performing the second authentication with the second authenticator via the AN.

In some examples of the method, apparatuses, or non-transitory computer-readable medium for wireless communication at a wireless device, the second authentication is performed over the NAS layer.

In some examples of the method, apparatuses, or non-transitory computer-readable medium for wireless communication at a wireless device, the connection is established using a cellular RAT.

In some examples of the method, apparatuses, or non-transitory computer-readable medium for wireless communication at a wireless device, the authentication is performed with an authenticator that is co-located with the AN, or an authenticator that is hosted at a node of the LAN located apart from the AN, or both.

According to at least one implementation, a method for wireless communication at an AN of a LAN includes: establishing a connection with a wireless device; determining that the wireless device has determined to perform an authentication; transmitting an indication of a protocol end point for the authentication as being a NAS layer or a RRC layer; and providing communications for the authentication between the wireless device and the protocol end point.

According to at least another implementation, an apparatus for wireless communication at an AN of a LAN includes: means for establishing a connection with a wireless device; means for determining that the wireless device has determined to perform an authentication; means for transmitting an indication of a protocol end point for the authentication as being a NAS layer or a RRC layer; and means for providing communications for the authentication between the wireless device and the protocol end point.

According to at least another implementation, an apparatus for wireless communication at an AN of a LAN includes a processor and memory in electronic communication with the processor. Instructions are stored in the memory and operable, when executed by the processor, to cause the apparatus to: establish a connection with a wireless device; determine that the wireless device has determined to perform an authentication; transmit an indication of a protocol end point for the authentication as being a NAS layer or a RRC layer; and provide communications for the authentication between the wireless device and the protocol end point.

According to at least another implementation, a non-transitory computer-readable medium stores computer-executable code for wireless communication at an AN of a LAN. The code is executable to: establish a connection with a wireless device; determine that the wireless device has determined to perform an authentication; transmit an indication of a protocol end point for the authentication as being a NAS layer or a RRC layer; and provide communications for the authentication between the wireless device and the protocol end point.

In some examples of the method, apparatuses, or non-transitory computer-readable medium for wireless communications at an AN of a LAN, the protocol end point for the authentication includes an authenticator, and the method, apparatus, or non-transitory computer-readable medium includes operations, features, means, or instructions for: receiving, from the wireless device, an indication that the authentication is to be performed with the authenticator.

In some examples of the method, apparatuses, or non-transitory computer-readable medium for wireless communications at an AN of a LAN, the indication that the authentication is to be performed with the authenticator is received in a RRC connection establishment message.

In some examples of the method, apparatuses, or non-transitory computer-readable medium for wireless communications at an AN of a LAN, the indication that the authentication is to be performed with the authenticator is received in a random access message from the wireless device on at least one resource.

In some examples of the method, apparatuses, or non-transitory computer-readable medium for wireless communications at an AN of a LAN, the protocol end point for the authentication includes an authenticator, and the method, apparatus, or non-transitory computer-readable medium includes operations, features, means, or instructions for: transmitting an indication that the AN performs authentications using the authenticator.

In some examples of the method, apparatuses, or non-transitory computer-readable medium for wireless communications at an AN of a LAN, the indication that the AN performs authentications using the authenticator is transmitted in at least one of: system information, a response to a query of the wireless device, a RACH establishment message, or a combination thereof.

Some examples of the method, apparatuses, or non-transitory computer-readable medium for wireless communications at an AN of a LAN may include operations, features, means, or instructions for: transmitting an indication that the AN performs authentications using a second authenticator, wherein the second authenticator is contained in a CN associated with the AN.

In some examples of the method, apparatuses, or non-transitory computer-readable medium for wireless communications at an AN of a LAN, providing communications for the authentication includes operations, features, means, or instructions for: transmitting messages associated with the authentication over a radio bearer associated with the connection established with the wireless device.

In some examples of the method, apparatuses, or non-transitory computer-readable medium for wireless communications at an AN of a LAN, the messages are transmitted over the RRC layer.

Some examples of the method, apparatuses, or non-transitory computer-readable medium for wireless communications at an AN of a LAN may include operations, features, means, or instructions for: exchanging authentication information with the wireless device over the radio bearer; exchanging at least one random parameter with the wireless device over the radio bearer; and generating a security key based at least in part on the exchanged authentication information and the at least one random parameter.

Some examples of the method, apparatuses, or non-transitory computer-readable medium for wireless communications at an AN of a LAN may include operations, features, means, or instructions for: establishing one or more additional radio bearers based at least in part on the security key; and securely communicating with the LAN, over the connection via the radio bearer, the one or more additional radio bearers, or both, based at least in part on the generated security key.

In some examples of the method, apparatuses, or non-transitory computer-readable medium for wireless communications at an AN of a LAN, providing communications for the authentication includes operations, features, means, or instructions for: transmitting messages pertaining to an authentication procedure over the connection established with the wireless device, and the authentication procedure is based at least in part on an EAP.

In some examples of the method, apparatuses, or non-transitory computer-readable medium for wireless communications at an AN of a LAN, the authentication procedure is performed over the RRC layer or Ethernet.

In some examples of the method, apparatuses, or non-transitory computer-readable medium for wireless communications at an AN of a LAN, the protocol end point for the authentication includes a first authenticator, and the method, apparatus, or non-transitory computer-readable medium may include operations, features, means, or instructions for: determining that the wireless device has determined to perform a second authentication with a second authenticator, wherein the second authenticator is contained in a CN in communication with the AN; and transmitting messages associated with the second authentication.

In some examples of the method, apparatuses, or non-transitory computer-readable medium for wireless communications at an AN of a LAN, the second authentication is performed over the NAS layer.

In some examples of the method, apparatuses, or non-transitory computer-readable medium for wireless communications at an AN of a LAN, the connection is established using a cellular radio access technology (RAT).

In some examples of the method, apparatuses, or non-transitory computer-readable medium for wireless communications at an AN of a LAN, the authentication is performed with an authenticator that is co-located with the AN, with an authenticator that is hosted at a node of the LAN located apart from the AN, or both.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

The disclosed examples illustrate techniques that enable a wireless device (e.g., a user equipment (UE)) to establish a secure connection with a local area network (LAN) via an access node (AN) of the LAN. In some examples, the connection may be established using a cellular radio access technology (RAT). The wireless device may perform an authentication, prior to securely communicating with the LAN, using an authenticator that is co-located with the AN, or an authenticator that is located elsewhere in the LAN (e.g., a central authentication server, an authenticator located at a core network of the LAN, etc.). Once established, the connection may be transferred to a target AN by performing a handover procedure, or a fast transition procedure.

Aspects of the disclosure are initially described in the context of a wireless communication system for enabling a wireless device to establish connectivity to a LAN via a cellular RAT. The disclosure provides various examples of architecture for the wireless communication system and signaling flow between various devices within the architecture. Aspects of the disclosure are further illustrated by and described with reference to apparatus diagrams, system diagrams, and flowcharts that relate to connecting to a LAN via a cellular RAT.

Figure 1:
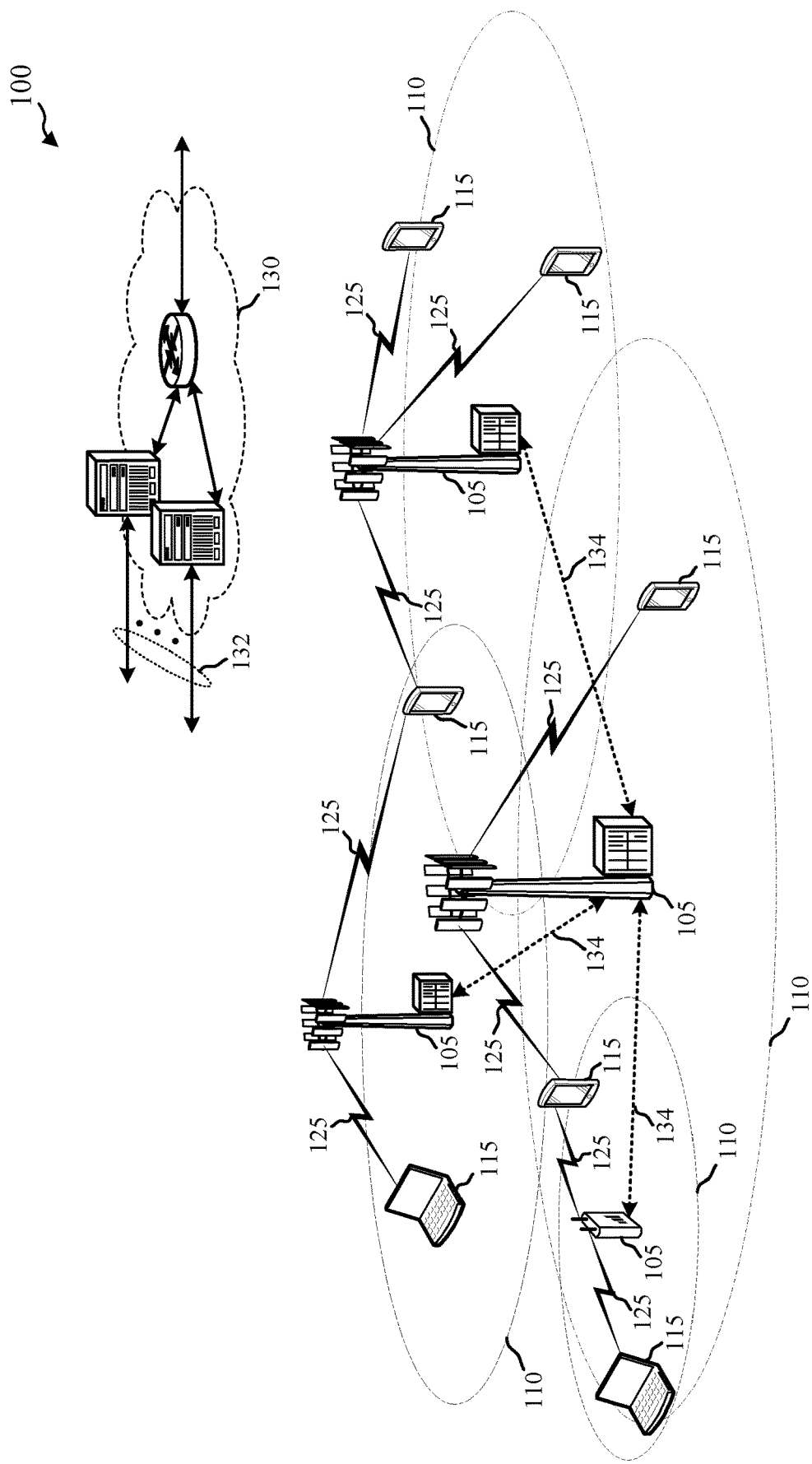
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 includes base stations 105, wireless devices 115, and a core network (CN) 130. In some examples, the wireless communication system 100 may include a Long Term Evolution (LTE)/LTE-Advanced (LTE-A) network.

The base stations 105 may wirelessly communicate with the wireless devices 115 via one or more base station antennas. Each base station 105 may provide communication coverage for a respective geographic coverage area 110. Communication links 125 shown in wireless communication system 100 may include uplink (UL) transmissions from a wireless device 115 to a base station 105, or downlink (DL) transmissions, from a base station 105 to a wireless device 115. Wireless devices 115 may be dispersed throughout the wireless communication system 100, and each wireless device 115 may be stationary or mobile. A wireless device 115 may also be referred to as a user equipment (UE), a mobile station, a subscriber station, a subscriber unit, a wireless unit, a remote unit, a mobile subscriber station, a mobile terminal, a wireless terminal, a remote device, an access terminal (AT), a handset, a user agent, a client, or like terminology. A wireless device 115 may also be a cellular phone, a personal digital assistant (PDA), a wireless modem, a wireless communication device, a handheld device, a tablet computer, a laptop computer, a cordless phone, a wireless local loop (WLL) station, an Internet of things (IoT) device, an Internet of Everything (IoE) device, a machine type communication (MTC) device, an appliance, an automobile, etc.

Base stations 105 may communicate with the CN 130 and with one another. For example, base stations 105 may interface with the CN 130 through backhaul links 132 (e.g., S1, etc.). Base stations 105 may communicate with one another over backhaul links 134 (e.g., X2, etc.) either directly or indirectly (e.g., through CN 130). Base stations 105 may perform radio configuration and scheduling for communication with wireless devices 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the CN 130. The CN 130 may be an example of an evolved packet core (EPC), which may include one or more network nodes. In an example, CN 130 may include at least one mobility management entity (MME), at least one serving gateway (S-GW), and at least one packet data network (PDN) gateway (P-GW). The MME, S-GW, and/or the P-GW may be implemented as a single network node or more be separate network nodes. The MME may be the control node that processes the signaling between the wireless device 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

In some cases, the wireless communication system 100 may utilize enhanced component carriers (eCCs). An eCC may be characterized by one or more features including: wider bandwidth, shorter symbol duration, shorter duration transmission time intervals (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by wireless devices 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a wireless device 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (e.g., the number of symbols in a TTI) may be variable.

The wireless communication system 100 may be an example of a wide area network (WAN) that provides a wireless packet access system access across a large service coverage area. Accordingly, communications protocols of the wireless communication system 100 may be provided by a RAT (e.g., a cellular RAT) in a manner that supports various operating conditions associated with a WAN application. By way of contrast, a legacy local area network (LAN) may provide wireless communication across a relatively small service coverage area, and thus, may be provided by a RAT (e.g., a Wi-Fi RAT) in a manner that supports conditions associated with a LAN application.

According to aspects of the present disclosure, wireless communication devices (e.g., wireless devices 115, ANs of a LAN) may implement aspects of the example wireless communication system 100, such as aspects of a cellular RAT, for accessing a LAN-based packet access system. For example, various aspects of a cellular RAT may be integrated into devices of an existing LAN (e.g., upgrading existing access points (APs), central nodes of a legacy LAN such as a LAN distribution system (DS), authentication servers of the LAN such as an authentication, authorization, and accounting (AAA) server (e.g., "AAA" for short), etc.), which may support a deployment of cellular communications protocols without requiring an entire cellular network to be deployed. Such an implementation may allow a LAN to leverage advanced techniques such as those relating to cellular RATs, while reusing existing LAN infrastructure and also maintaining security policies that may be in place for the LAN. Such an implementation may also allow the simultaneous operation of multiple RATs (e.g., a cellular RAT and a Wi-Fi RAT) for accessing the same LAN.

Various examples of LAN deployments may benefit from the described integration of advanced access techniques, such as aspects of a cellular RAT, into an existing LAN infrastructure that relies on legacy LAN technology. For example, the features described according to the present disclosure may provide benefits to LAN applications in high-QoS applications in enterprises and to mission-critical applications in factory automation. In factory automation, for instance, closed-loop control application may require short round trip times across the air interface (less than 1 ms) with high reliability (down to $10^{-9}$). Unlicensed technologies, such as those associated with legacy LAN applications, may have problems achieving these performance targets since they operate in shared spectrum, where a Station (STA) (e.g., according to Wi-Fi protocols) must backoff upon detection of a busy channel. Unlicensed bands may also be subject to uncontrolled interference due to the hidden-node problem. These downsides may not apply to a cellular RAT operating in licensed band, for instance. Further, the performance of cellular RATs is expected to increase with the evolution of cellular RATs from 4G to 5G, for example. Another use case for the methods described according to the present disclosure is fixed wireless access (FWA) which can leverage 5G millimeter wave (mmWave) technologies for last-mile-hop.

While some use cases may be addressed with the deployment of an entire cellular RAT system consisting of radio access network (RAN) and core network (CN), such solution may conflict with an existing LAN-based infrastructure that is already in place. Therefore, unique benefits may be achieved by integrating certain aspects of cellular connectivity into an existing LAN infrastructure, while reusing existing LAN infrastructure such as authentication server (e.g., a AAA) and DS without the need for a cellular CN.

Figure 2:
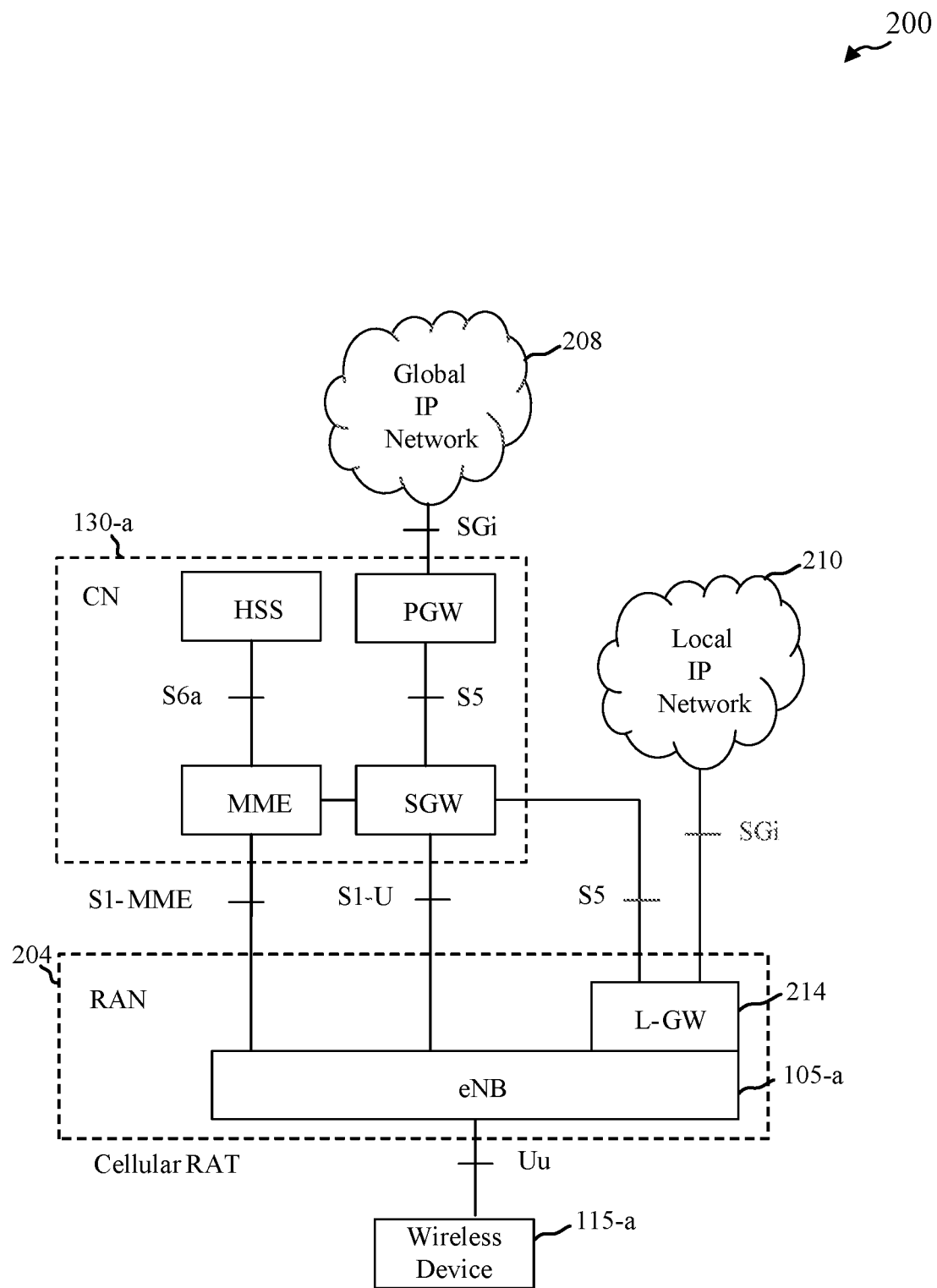
FIG. 2 shows an example of a wireless communication system for connecting to global and local IP networks via a cellular RAT, in accordance with various aspects of the present disclosure.

FIG. 2 shows an example of a wireless communication system 200 for connecting to global and local IP networks via a cellular RAT, in accordance with various aspects of the present disclosure. For example, the wireless communication system 200 may illustrate aspects of the wireless communication system 100 described with reference to FIG. 1. The wireless communication system 200 may include a RAN 204 having a base station 105-a (e.g., an eNB), a wireless device 115-a, and a CN 130-a, which may be examples of the corresponding devices described with reference to FIG. 1.

In one example, the wireless communication system 200 may operate according to a 3rd Generation Partnership Project (3GPP) architecture, and provide access according to a cellular RAT to one or more PDNs. For example, wireless communication system 200 may enable connectivity to one or more IP-based networks (e.g., the Internet), such as the global IP network 208, and may be operated by a Mobile Network Operator (MNO) for large-scale deployments (e.g., to provide IP packet access over a wide coverage area).

The RAN 204 may include one or more base stations 105 (e.g., NodeBs, eNodeBs, and the like), including base station 105-a, which support one or more cellular RATs to provide wireless connectivity to one or more wireless devices such as wireless device 115-a. Examples of cellular RATs include W-CDMA, LTE, 5G RATs, RATs using licensed or unlicensed spectrum, as well as derivatives and/or combinations thereof. The RAN 204 may also include a local gateway (L-GW) 214, which may be collocated with the base station 105-a. The L-GW 214 may provide an interface between the base station 105-a and a local IP network 210.

The CN 130-a may support control plane (C-plane) tasks (e.g., authentication, authorization, session management, policy control and charging) and user plane (U-plane) tasks (e.g., IP-traffic forwarding between a wireless device 115-a and a Global IP network 208). The CN 130-a may include one or more network nodes for performing C-plane and U-plane tasks, including a home subscriber server (HSS), a packet data network gateway (PGW), a S-GW, and a mobility management entity (MME).

Figure 3:
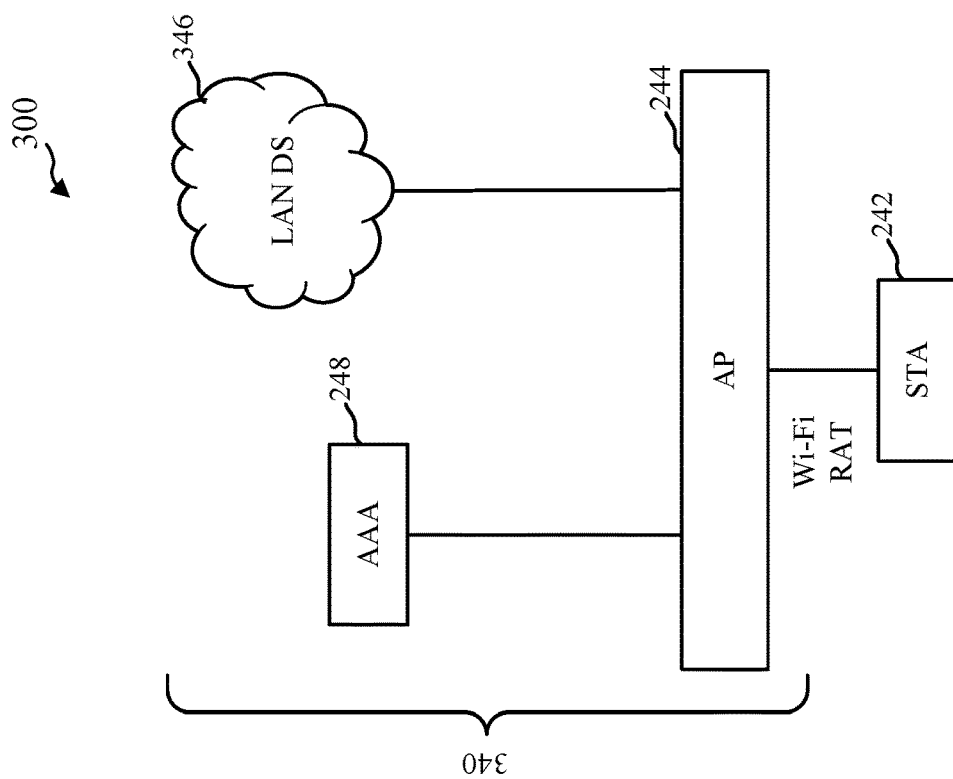
FIG. 3 shows an architecture for legacy access to a legacy LAN, in accordance with various aspects of the present disclosure.

FIG. 3 shows an architecture 300 for legacy access to a legacy LAN 340, using Wi-Fi access as an example, in accordance with various aspects of the present disclosure. As opposed to 3GPP, Wi-Fi protocols such as IEEE 802.11 only specify the radio air interface and the corresponding functions on a STA (e.g., STA 242), and an AP 244 to support the radio air interface of the architecture 300. Transport of data to the legacy LAN 340 via the AP 244 may be ascribed to a legacy LAN DS 346 having a protocol stack and forwarding mechanisms that are not specified by IEEE 802.11, for example, and may include various proprietary security solutions. While IEEE 802.11i introduces the Robust Security Network (RSN) concept, which introduces mutual authentication between STAs 242 and APs 244 and the establishment of a secure connection, it only specifies security-related messages between the STA 242 and an authenticator on the AP 244. At the same time, it creates the means for the authenticator to create a tunnel for the support of an extended security handshake between the STA 242 and an authenticator server (e.g., AAA 248) in the network. The tunnel may use EAP-over-LAN (EAPOL) on the air interface, though the tunnel is not further specified on the network side by this standard.

IEEE 802.11i, for example, relies on a 4-way handshake over the access link to create fresh keying material from a Pairwise Master Key (PMK), to ensure that the keys used on STA 242 and AP 244 are identical, and to assert that STA 242 and AP 244 have unambiguously agreed on a cipher suite. It further binds keying material to credentials of the STA 242 (e.g. media access control (MAC) address) and the AP 244 (e.g., a basic service set identifier (BSS ID)). Consequently, mobility from one AP 244 to another AP 244 (not shown) requires re-authentication, which may—dependent on the LAN security solution, for example—be a lengthy procedure.

IEEE 802.11r, for example, further introduces the concept of Fast BSS Transition (FT) to reduce mobility-related latency for deployments that leverage EAP with AAA. This concept establishes an additional key hierarchy level and an associated key holder. With 802.11r, a centralized Wireless LAN Controller (WLC) can be used as the higher of the two hierarchy entities (e.g., an R0 key holder (R0KH)) and the AP 244 can be used as the lower of the two hierarchy entities (e.g., an R1 key holder (R1KH)). Since the initial authentication of the STA 242 establishes a security association between the STA 242 and the (centralized) R0KH, the STA 242 can more quickly hand over from a source AP 244 to a target AP 244, and reestablish new keying material with the WLC (R0KH) via the target AP (R1KH) without undergoing a new EAP handshake with the AAA. However, the establishment of new keying material requires a 4-way handshake that has a purpose similar to that of 802.11i.

Some techniques according to the present disclosure apply to integrating aspects of a cellular RAT into a LAN infrastructure. For such an integration, some similar assumptions are made on the LAN infrastructure as established by IEEE for 802.11. As opposed to the 3GPP architecture shown in FIG. 2, the cellular RAT integrated into or attached to a LAN infrastructure may be assumed to have no mandatory support (e.g., may have optional support) via a 3GPP CN.

Some aspects of the present disclosure pertain to techniques for establishing a connection to a LAN infrastructure using aspects of a cellular RAT. The techniques provide secure access to a LAN infrastructure via a cellular RAT. This can leverage the performance advantages of cellular RATs when applied to the LAN infrastructure. This may also allow, for instance, reusing existing LAN infrastructures to support cellular RATs. Further, IEEE 802-based RATs can be used together with cellular RATs for access to the same LAN, as the infrastructures can be shared.

Figure 4:
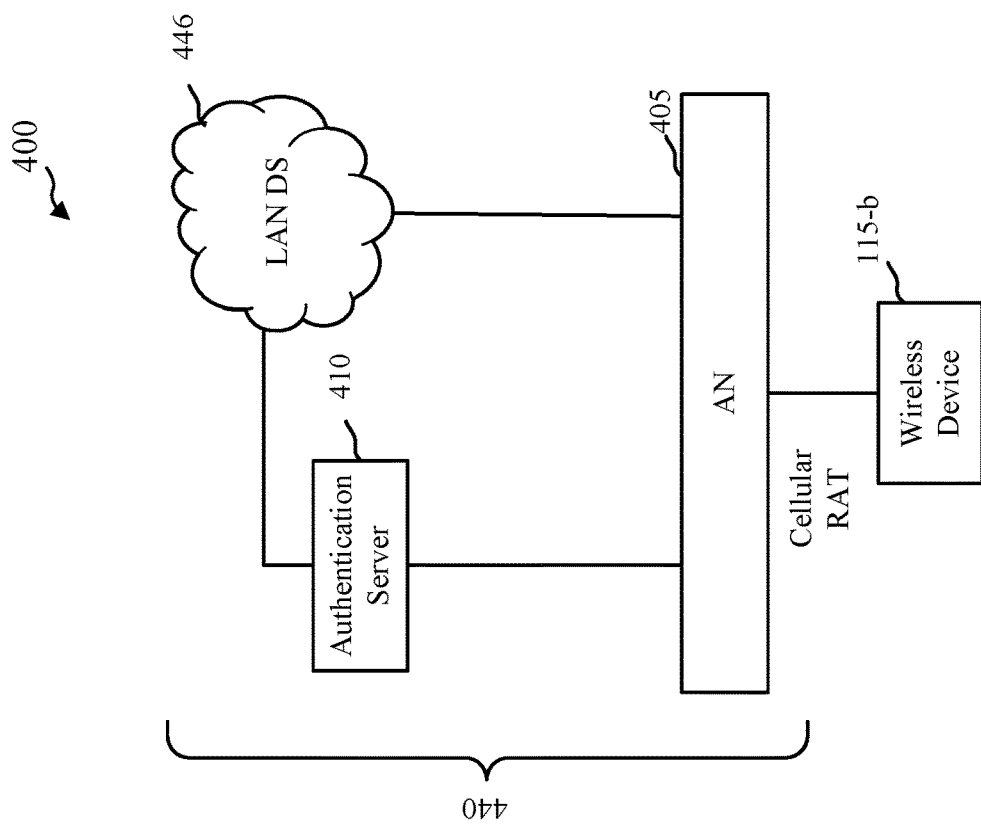
FIG. 4 shows a reference architecture for cellular RAT-based access to a LAN, in accordance with various aspects of the present disclosure.

FIG. 4 shows a reference architecture 400 for cellular RAT-based access to a LAN 440, in accordance with various aspects of the present disclosure. The radio access node associated with the LAN 440 is generically referred to as an AN 405, and the wireless device 115-b seeking access to the LAN 440 may be an example of wireless devices 115 described with reference to FIGS. 1 and 2. Although only one AN 405 is shown in reference architecture 400, additional ANs 405 (not shown) may provide wireless access to the LAN 440, and a plurality of ANs 405 associated with the LAN 440 may collectively be referred to as a RAN of the LAN 440.

Aspects of a cellular RAT may be employed to connect the wireless device 115-b to the LAN 440 via the AN 405. In some examples, the AN 405 may include an authenticator (e.g., an authenticator co-located with the AN 405) for authenticating connections with wireless devices (e.g., wireless device 115-b). Additionally or alternatively, the LAN 440 may support another authentication node that is not co-located with the AN 405, such as authentication server 410, which may be in communication with the LAN DS 446. In various examples an authentication node may be a stand-alone device of the LAN 440, or co-located or otherwise integrated with other devices of the LAN 440. For example, in some examples the authentication server 410 may be integrated with the LAN DS 446, contained in a CN 130 of the LAN 440 (not shown), or some other central node of the LAN 440. In some examples, an authentication server 410 may be separate from the LAN 440, such as a CN 130 of a separate cellular operator network (e.g., wireless communication system 100 described with reference to FIG. 1), which may be in communication with the LAN 440 (e.g., via a backhaul link with the LAN DS 446). In some examples the authentication server 410 may be accessible by a plurality of ANs 405, for authentication of wireless devices 115 via EAP according to aspects of the present disclosure (e.g., EAP over a control plane, EAP over a user plane, EAP over RRC, EAP over NAS, etc.). In some examples the authentication server 410 may be an example of a AAA 248 of a LAN infrastructure that has been modified according to aspects of the present disclosure to support access to the LAN 440 using advanced techniques such as those associated with a cellular RAT. The LAN 440 may therefore include a set of authenticators for performing authentications with the wireless device 115-b, with may include a plurality of authenticators co-located with a respective AN 405, and one or more authentication nodes that are not co-located with an AN 405 (e.g., one or more authentication servers 410).

According to aspects of the present disclosure, the wireless device 115-b may determine to perform an authentication with a particular authentication end point to establish secure communications with the LAN 440. The described features may be in contrast with legacy systems, which may preconfigure devices to perform authentications according to a particular communications protocol. For example, when operating according to 3GPP protocols, a wireless device 115 of wireless communications system 100 described with reference to FIG. 1 may be configured to perform authentications with a CN 130 that is configured by a particular cellular network operator. In another example, when operating according to legacy LAN protocols (e.g., Wi-Fi protocols), a STA 242 of the legacy LAN 340 described with reference to FIG. 3 may be configured to perform authentications with an AP 244. In either case, the wireless communication system 100 and the legacy LAN 340 may not support flexibility for a device to perform authentications with different protocol end points. Thus, by supporting a determination to perform an authentication with a particular authentication end point as described herein, the LAN 440 may support more flexible authentications for the wireless device 115-b to establish secure communications with the LAN 440.

For example, the wireless device 115-b may receive an indication of an end point for authentications with the LAN 440, which may include one or more indications of an authenticator co-located with the AN 405, an authenticator at the authentication server 410, an authenticator at the LAN DS 336, or an authenticator at some other network node (e.g., at a CN 130-a of the LAN 440 and/or at a CN 130-a of a cellular operator network that is not part of the LAN 440 (not shown)). In some examples the wireless device 115-b may receive an indication of a protocol end point for authentications as being an RRC layer or a NAS layer. The RRC layer may be used for performing authentication with an authenticator that is co-located with the AN 405, and the NAS layer may be used for performing authentication with an authenticator that is not co-located with the AN 405, such as elsewhere on the LAN or at a CN operated by a cellular network operator (e.g., separate from the LAN). The RRC layer may be associated with performing authentications over a signaling radio bearer (SRB) (e.g., with an authenticator co-located with the AN 405). One such example is EAP authentication with an authenticator co-located with the AN 405 that is performed via a SRB over a RRC layer.

Another example may be when the AN 405 performs functions normally associated with a CN 130 according to 3GPP protocols. Additionally or alternatively, the wireless device 115-b may receive an indication of a protocol end point for authentications as being a NAS layer, which may be associated with performing authentications over a data radio bearer (DRB) (e.g., with an authenticator that is not co-located with the AN 405, which may or may not be an authenticator that is part of the LAN 440, or with an authenticator of the AN 405 that performs authentications using signaling over the NAS layer). One such example is EAP authentication with an authenticator of the LAN DS 336 that is performed via a DRB using EAPOL over a NAS layer. Another example is authentication with an authenticator of the CN 130 of a cellular operator network using signaling over a NAS layer. In some examples multiple authentications may be performed with multiple respective authenticators, such that the wireless device 115-b may take advantage of aspects of cellular-RAT-based authentications, while also respecting an infrastructure security policy of the LAN 440 (e.g., according to Wi-Fi protocols or according to other proprietary solutions). Thus, according to the present disclosure, secure communications may be established with the LAN 440 based at least in part on various authenticators and/or authentication protocols or procedures that may be indicated to the wireless device 115-b.

Some aspects of the present disclosure describe techniques for handover of a connection to a LAN 440 using, for example, aspects of a cellular RAT (e.g., aspects of 4G, LTE, LTE-A, 5G, etc.). The techniques may leverage a 3GPP-based mobility protocol for a cellular RAT integrated into a LAN 440 (e.g., a 5G enterprise deployment). In this manner, the benefits of 3GPP handovers, such as seamless and lossless session migration, can be supported in an existing architecture of a LAN 440 that may also implement other protocols (e.g., Wi-Fi protocols, proprietary security solutions, etc.). At the same time, security policies (e.g., those not associated with cellular RATs) of the LAN (e.g., security policies that may be associated with a legacy LAN 340, such as Wi-Fi protocols or proprietary security protocols) may be respected, which typically demand authentication with an authentication server (e.g., an AAA 248) via a target AN 405 after handover. The LAN 440 may simultaneously support communications via an AN 405 using other protocols, such as Wi-Fi protocols, to support backwards compatibility and/or improve flexibility for connecting with the LAN 440. Moreover, the described techniques may also support concurrent connections of wireless devices 115-b with a LAN 440 and with a PDN (e.g., Global IP Network 208 of FIG. 2) via a cellular CN, such as a CN 130-a of a cellular service provider, that is not associated with the LAN 440 (e.g., CN 130 of the wireless communication system 100 described with reference to FIG. 1). Further techniques, such as handover and fast transition techniques, may build on a secure connection to a LAN 440 that has been established via aspects of a cellular RAT, as described herein.

Figure 5:
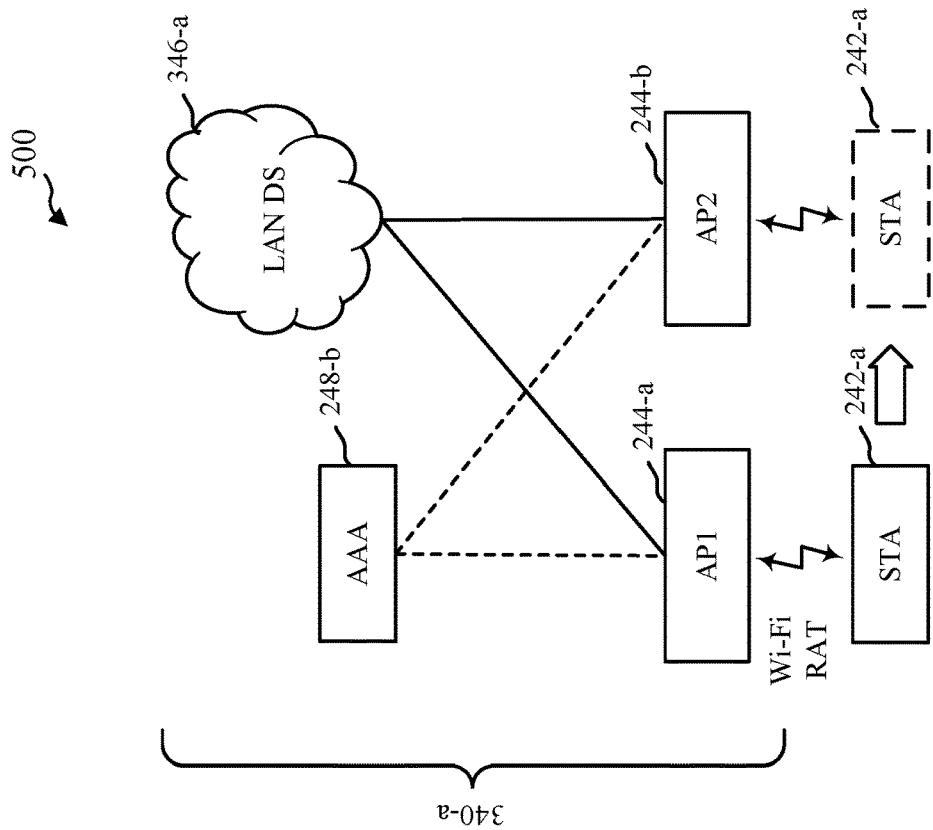
FIG. 5 shows a reference architecture for authentication of Wi-Fi-based legacy access to a legacy LAN, in accordance with various aspects of the present disclosure.

FIG. 5 shows a reference architecture 500 for authentication of Wi-Fi-based legacy access to a legacy LAN 340-a, in accordance with various aspects of the present disclosure. A STA 242-a may establish a connection with a first AP 244-a (e.g., a source AP 244), perform authentication with the first AP 244-a and/or an AAA 248-b (e.g., using EAP), and securely communicate with a legacy LAN 340-a (e.g., with a legacy LAN DS 346-a) based at least in part on the authentication. When moving into the coverage area of a second AP 244-b (e.g., a target AP 244), the STA 242-a may establish a connection with the second AP 244-b and perform another authentication with the second AP 244-*b* and/or the AAA 248-*b* before securely communicating with the legacy LAN 340-*a* (e.g., legacy LAN DS 346-*a*) via AP2 244-*b*. Thus, reference architecture 500 illustrates an example of STA-based mobility of a legacy LAN 340-*a*, where the STA 242-*a* performs handover operations without operations of the legacy LAN 340-*a* coordinating handover between the first AP 244-*a* and the second AP 244-*b*.

Figure 6:
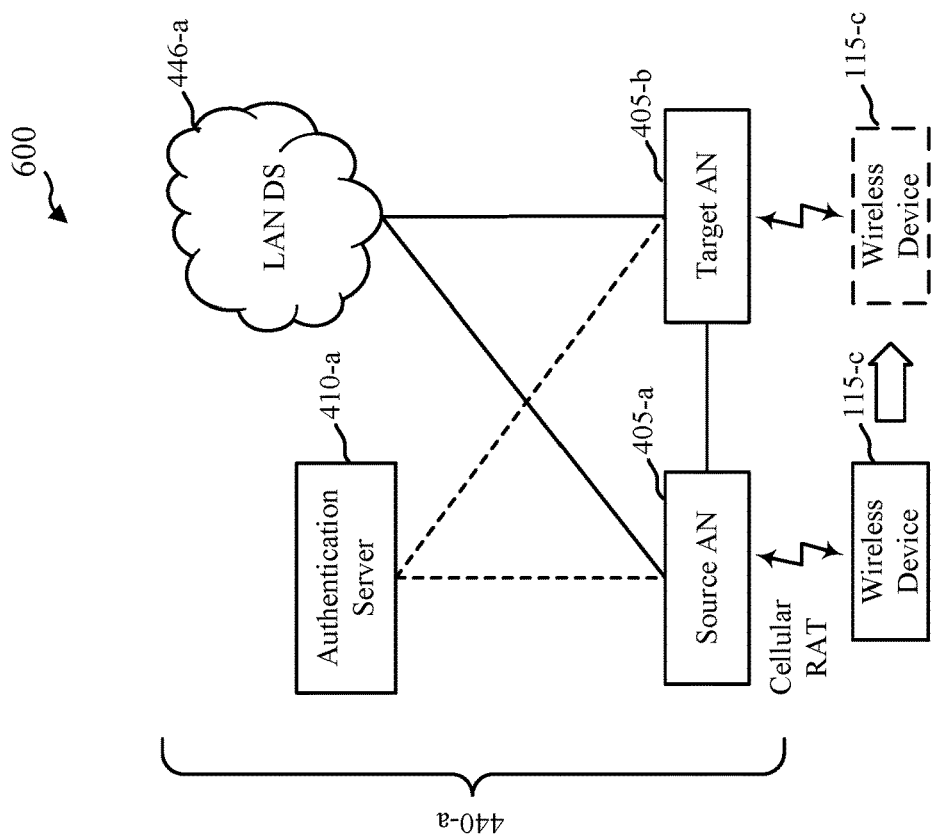
FIG. 6 shows a reference architecture for handover of cellular RAT-based access to a LAN, in accordance with various aspects of the present disclosure.

FIG. 6 shows a reference architecture 600 for handover of cellular RAT-based access to a LAN 440-*a*, in accordance with various aspects of the present disclosure. Reference architecture 600 illustrates an example of network-based LAN mobility of a wireless device 115-*c*, where handover operations are coordinated by operations of the LAN 440-*a*.

For example, wireless device 115-*c* may establish a connection with a source AN 405-*a* of the LAN 440-*a*, perform authentication with an authenticator located at the source AN 405-*a* and/or an authenticator at an authentication server 410-*a* (e.g., using EAP), and securely communicate with the LAN 440-*a* (e.g., LAN DS 446-*a*) based at least in part on the authentication(s). While connected with the LAN 440-*a*, the wireless device 115-*c* may perform measurements of signals received from the source AN 405-*a* and one or more target ANs 405 (e.g., target AN 405-*b*), and forward the measurements to the LAN 440-*a* (e.g., to the source AN 405-*a*, to the target AN 405-*b*, to the authentication server 410-*a*, and/or to the LAN DS 446-*a*). Based at least in part on the forwarded measurements, devices of the LAN 440-*a* may make a decision to handover the wireless device 115-*c* from the source AN 405-*a* to the target AN 405-*b*. For example, the source AN 405-*a* may receive communications measurements from the wireless device 115-*c*, make a handover decision based at least in part on determining that communications conditions may be better with the target AN 405-*b*, and send a handover request to the target AN 405-*b* based at least in part on the handover decision. If the target AN 405-*b* acknowledges the request, the source AN 405-*a* may forward handover parameters to the wireless device 115-*c* and/or the target AN 405-*b*.

Thus, according to aspects of the present disclosure, when moving into the coverage area of the target AN 105-*d* of the LAN 440-*a*, the wireless device 115-*c* may establish a connection with the target AN 405-*b*, based at least in part on handover operations performed by the LAN 440-*a* (e.g., the source AN 405-*a*, the target AN 405-*b*, the authentication server 410-*a*, the LAN DS 446-*a*, etc.). In some examples the wireless device 115-*c* may perform an authentication with an authenticator located at the target AN 405-*b* and/or the authenticator at the authentication server 410-*a* before securely communicating with the LAN 440-*a* (e.g., LAN DS 446-*a*) via the target AN 405-*b*. In some examples, handover of the wireless device's context and a temporary security key (e.g., a security key subject to a restriction policy), from the source AN 405-*a* to the target AN 405-*b* (e.g., over an X2 interface, either via LAN DS 446-*a* or directly from the source AN 405-*a* to the target AN 405-*b*), can reduce service interruptions that may otherwise be associated with legacy handover and authentication procedures of a LAN.

Some aspects of the present disclosure pertain to techniques for fast transition of a connection to a target AN 405 of a LAN 440 using a cellular RAT. The techniques apply a two-level key hierarchy, which may include aspects similar to techniques introduced by IEEE 802.11r, to support fast transition between ANs 405 of a LAN 440 that integrates aspects of a cellular RAT. In this manner, cellular mobility can leverage existing security infrastructure and protocols of the LAN 440 (e.g., an infrastructure of a legacy LAN 340) developed or deployed for fast BSS transition. The techniques may, for example, build on a secure connection to the LAN 440 that has been established via aspects of a cellular RAT, as described herein.

Thus, according to aspects of the present disclosure, the network-based mobility supported by the LAN 440-*a* overcomes various limitations of a legacy LAN 340 that relies on wireless devices to make handover decisions (e.g., legacy LAN 340-*a* described with reference to FIG. 5, which operates according to legacy LAN protocols such as those associated with Wi-Fi protocols). For example, according to the modified techniques described herein, LAN 440-*a* supports handover decisions made by an AN 405, an exchange of temporary network keys for restricted access to the LAN 440-*a* via the target AN 405-*b*, and a caching and exchange of FT parameters to facilitate handover between the source AN 405-*a* and the target AN 405-*b*.

Figure 7:
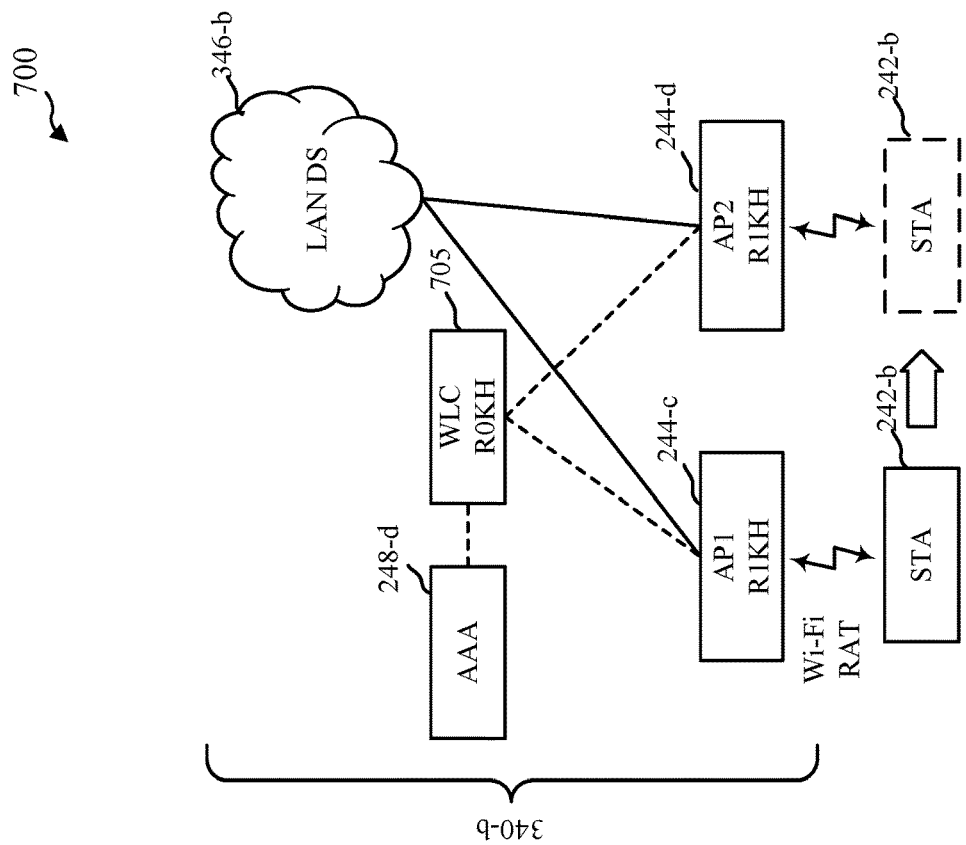
FIG. 7 shows a reference architecture for Wi-Fi-based legacy access to a legacy LAN using FT techniques, in accordance with various aspects of the present disclosure.

FIG. 7 shows a reference architecture for Wi-Fi-based legacy access to a legacy LAN 340-*b* using FT techniques, in accordance with various aspects of the present disclosure. A STA 242-*b* may establish a connection with a first AP 244-*c* of the legacy LAN 340-*b* (e.g., an R1KH), perform an authentication with an AAA 248-*d* (e.g., using EAP) via the first AP 244-*c*, establish a security association with the first AP 244-*c*, and securely communicate with the legacy LAN 340-*b* (e.g., legacy LAN DS 346-*b*) based at least in part on the security association. When establishing the connection with the first AP 244-*c*, the STA 242-*b* may transmit FT parameters. When moving into the coverage area of a second AP 244-*d* of the legacy LAN 340-*b*, the STA 242-*b* may establish a connection with the second AP 244-*d*, and the second AP 244-*d* may obtain the FT parameters from the WLC 705. The second AP 244-*d* may derive a security key (e.g., a session key) based at least in part on the FT parameters and authenticate the STA 242-*b* with the FT parameters more quickly than an authentication without the FT parameters.

Figure 8:
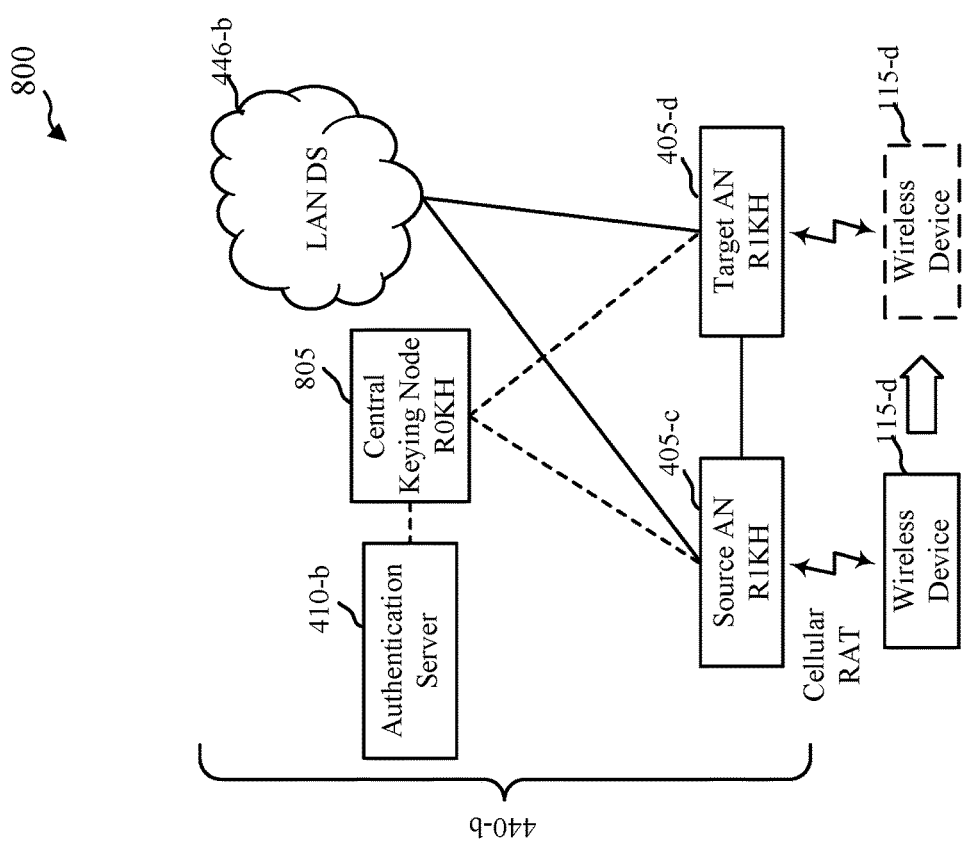
FIG. 8 shows a reference architecture for cellular RAT-based access to a LAN using FT techniques, in accordance with various aspects of the present disclosure.

FIG. 8 shows a reference architecture for cellular RAT-based access to a LAN 440-*b* using FT techniques, in accordance with various aspects of the present disclosure. A wireless device 115-*d* may establish a connection with a source AN 405-*c* of the LAN 440-*b* (an R1KH), perform an authentication with an authenticator located at the source AN 405-*c* and/or an authenticator located at an authentication server 410-*b* (e.g., using EAP), and securely communicate with the LAN 440-*b* (e.g., LAN DS 446-*b*) based at least in part on the authentication(s).

According to aspects of the present disclosure, the source AN 405-*c* of the LAN 440-*b* may cache the FT parameters for forwarding during a subsequent handover. Such forwarding may be supported by the LAN 440-*b* because the ANs 405 may implement security protocols in which ANs 405 trust each other for exchanging such parameters. This trust of LAN 440-*b* is in contrast with a legacy LAN 340 (e.g., legacy LAN 340-*b* described with reference to FIG. 7), in which such security protocols have not been established between APs 244 (e.g., between APs 244-*c* and 244-*d* as described with reference to FIG. 7). In other words, the APs 244 of a legacy LAN 340-*b* have not established trust that supports the exchange of FT parameters between the APs 244. Thus, according to aspects of the present disclosure, LAN 440-*b* may implement advanced security protocols at ANs 405 to facilitate fast handover of the wireless device 115-*d* from the source AN 405-*c* to the target AN 405-*d*.

When moving into the coverage area of a target AN 405-*d* of the LAN 440-*b* (e.g., another R1KH), the wireless device 115-*d* may establish a connection with the target AN 405-*d*, and the target AN 405-*d* may obtain the FT parameters from the source AN 405-*d*. In some examples, the FT parameters may be received by the target AN 405-*d* directly from the source AN 405-*c* (e.g., over an X2 interface, either via the LAN DS 446-*b* or directly from the source AN 405-*d*), which may not be acceptable under legacy LAN protocols because direct communications between APs 244 may not be secure, or otherwise trusted, under legacy protocols. The target AN 405-*d* may derive a security key (e.g., a session key) based at least in part on the FT parameters and authenticate the wireless device 115-*d* with the FT parameters more quickly than an authentication without the FT parameters, while also leveraging additional trust that may be provided between the source AN 405-*c* and the target AN 405-*d* according to the present disclosure.

Figure 9:
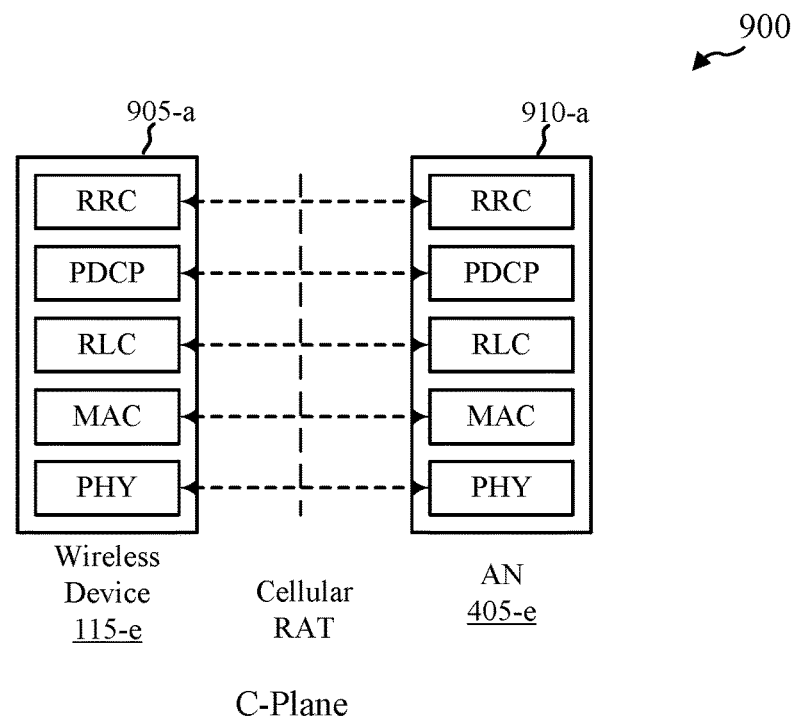
FIG. 9 shows an illustration of protocol stacks that may be used to support C-plane functionality for cellular RAT-based LAN access, in accordance with various aspects of the present disclosure.

FIG. 9 shows an illustration 900 of a protocol stack 905-*a* at a wireless device 115-*e* and a protocol stack 910-*a* at an AN 405-*e* that may be used to support C-plane functionality for cellular RAT-based access to a LAN 440, in accordance with various aspects of the present disclosure. Illustration 900 shows the lower level protocols (e.g., an L1/L2 stack) of the 4G-cellular RAT as including PHY/MAC/RLC/PDCP layers, as an example. Other L1/L2 stacks are possible. Using 4G protocols as an example, the C-plane may support Radio Resource Control (RRC) which is terminated at the wireless device 115-*e* and the AN 405-*e*.

Figure 10:
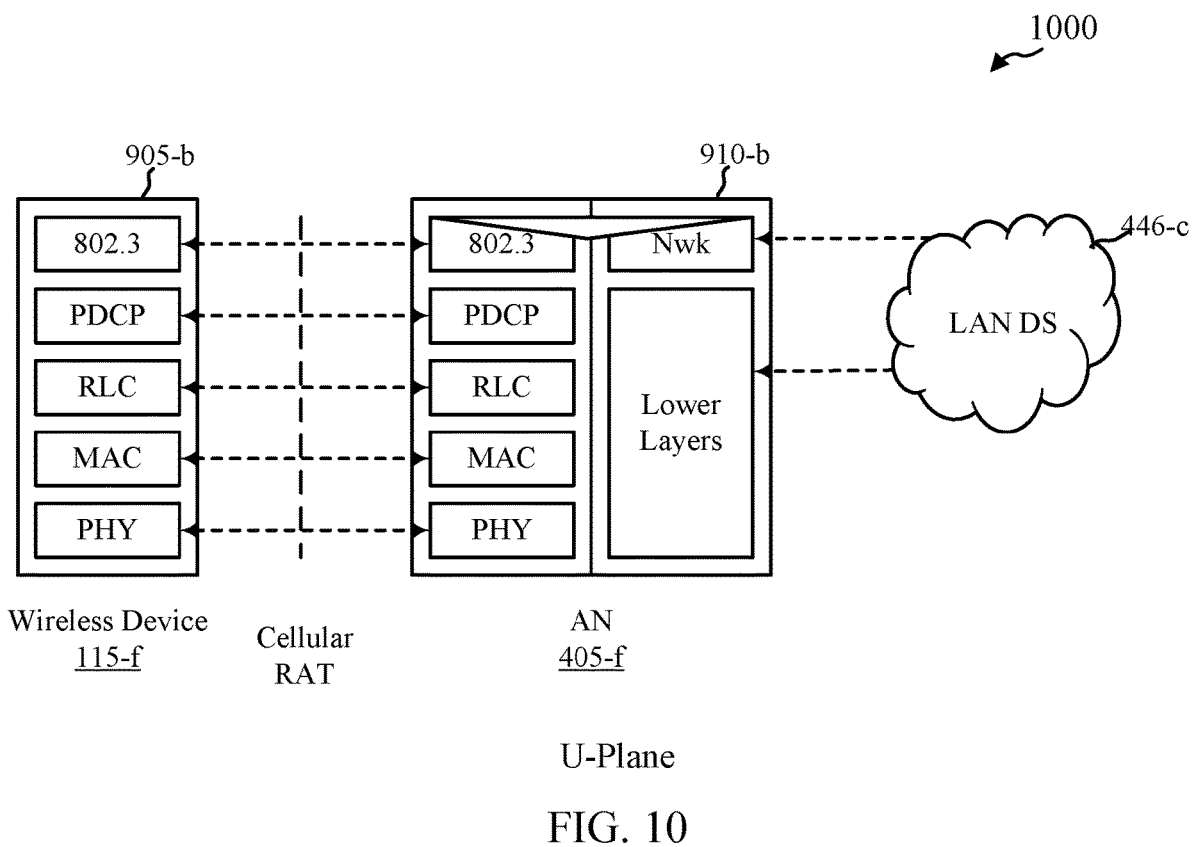
FIG. 10 shows an illustration of protocol stacks that may be used to support U-plane functionality for cellular RAT-based access to a LAN, in accordance with various aspects of the present disclosure.

FIG. 10 shows an illustration 1000 of a protocol stack 905-*b* at a wireless device 115-*f* and a protocol stack 910-*b* at an AN 405-*f* that may be used to support U-plane functionality for cellular RAT-based access to a LAN, in accordance with various aspects of the present disclosure. Illustration 1000 shows the lower level protocols (e.g., an L1/L2 stack) of the 4G-cellular RAT as including PHY/MAC/RLC/PDCP layers, as an example. Other L1/L2 stacks are possible. Using 4G as an example, the U-plane may support IEEE 802.3 between the wireless device 115-*f* and AN 405-*f*. The AN 405-*f* may relay packets between the wireless device 115-*f* and a LAN DS 446-*c*. The U-plane protocol stack between the AN 105-*h* and the LAN DS 446-*c* is not specified.

IEEE 802.11r, for example, does not define a particular protocol and protocol stack between an R0KH and an R1KH, but only the parameters that have to be transferred. When the described techniques adopt the two-layered security hierarchy, the same specifications may apply.

Figure 11:
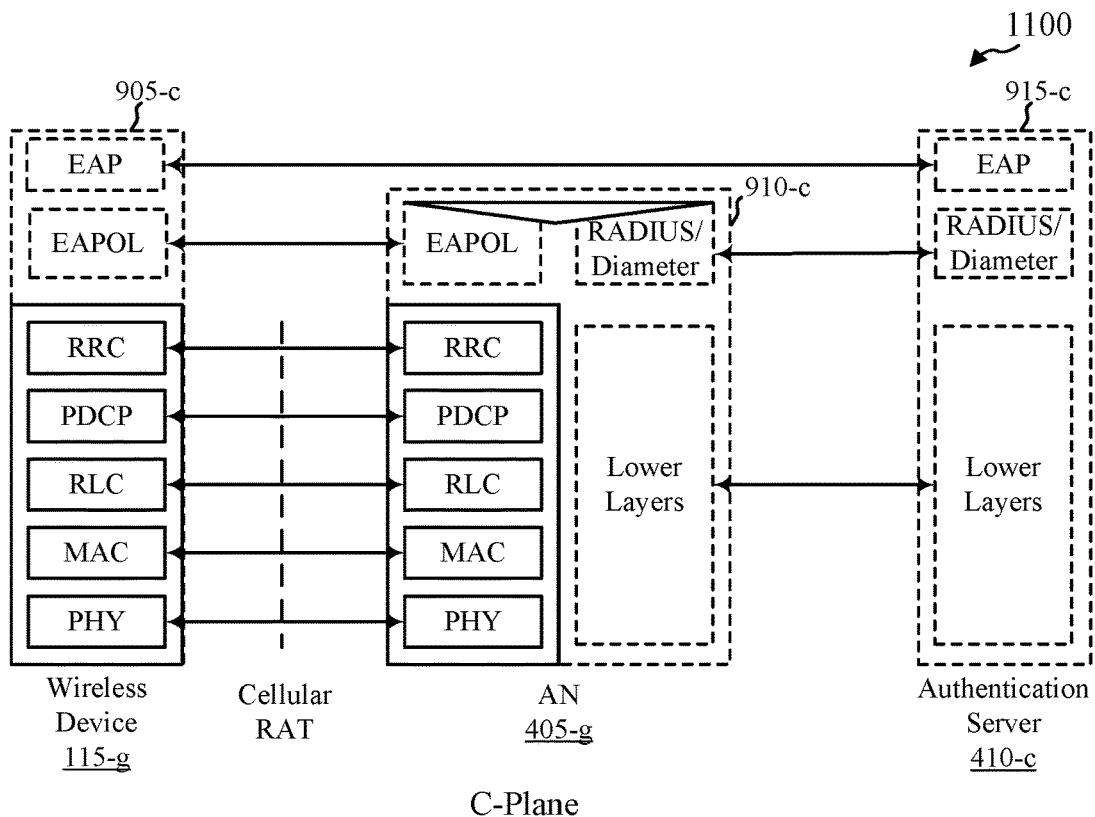
FIG. 11 shows an illustration of protocol stacks that may be used for authentication via EAP over C-plane, with an authentication server using IEEE 802.1x, in accordance with various aspects of the present disclosure.

FIG. 11 shows an illustration 1100 of a protocol stack 905-*c* at a wireless device 115-*g*, a protocol stack 910-*c* at an AN 405-*g*, and a protocol stack 915-*c* at an authentication server 410-*c* that may be used for authentication via EAP over C-plane, with an authentication server 410-*c* using aspects of IEEE 802.1x, in accordance with various aspects of the present disclosure. On the cellular link, between the wireless device 115-*g* and AN 405-*g*, the EAP exchange may be encapsulated in RRC (e.g., using a Signaling Radio Bearer (SRB)). Between the AN 405-*g* and the authentication server 410-*c*, the protocol stack is not specified. Illustration 1100 shows RADIUS/Diameter as example of protocols that may be used between the AN 405-*g* and the authentication server 410-*c*.

Figure 12:
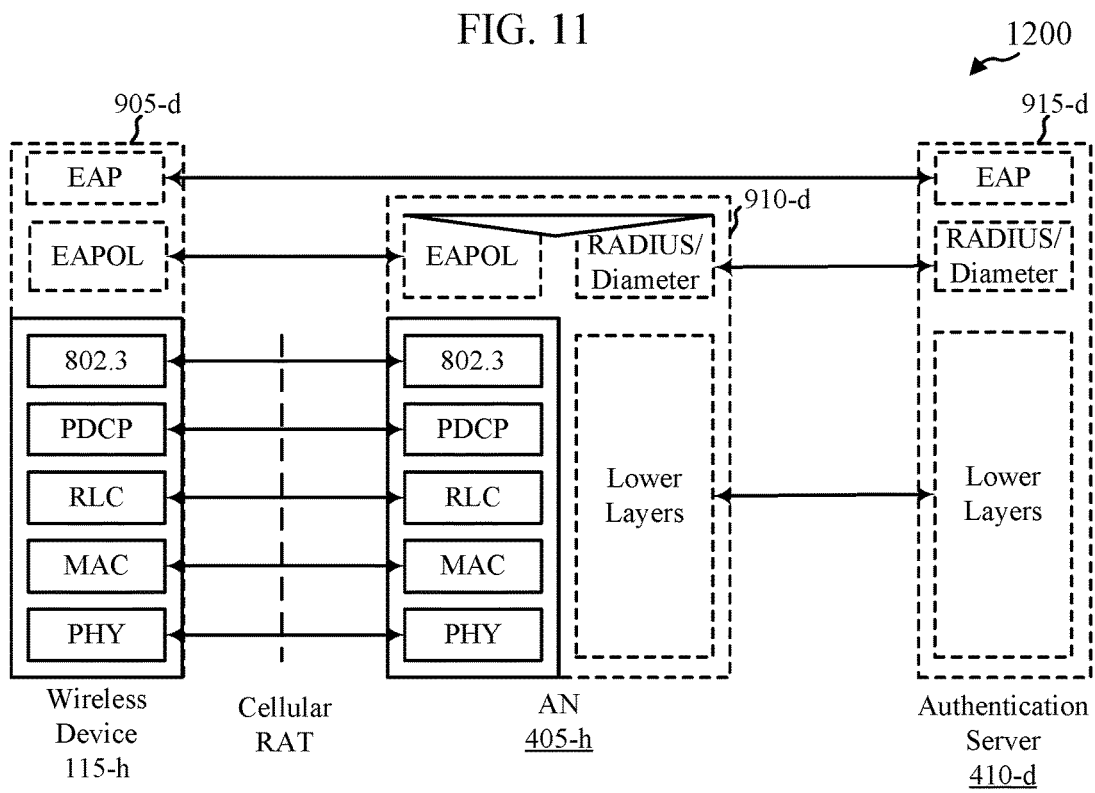
FIG. 12 shows protocol stacks that may be used for authentication via EAP over U-plane, in accordance with various aspects of the present disclosure.

FIG. 12 shows an illustration 1200 of a protocol stack 905-*d* at a wireless device 115-*h*, a protocol stack 910-*d* at an AN 405-*h*, and a protocol stack 915-*d* at an authentication server 410-*d* that may be used for authentication via EAP over U-plane, in accordance with various aspects of the present disclosure. In illustration 1200, the authentication server 410-*d* may use aspects of IEEE 802.1x, for example. On the cellular link, between the wireless device 115-*h* and AN 405-*h*, the EAP exchange may ride on top of the data plane using a Data Radio Bearer (DRB). Between the AN 405-*h* and the authentication server 410-*d*, the protocol stack is not specified. Illustration 1200 shows RADIUS/Diameter as example of protocols that may be used between the AN 405-*h* and the authentication server 410-*d*.

The use of EAP is not mandatory, e.g., in case a wireless device 115-*h* and an AN 405 are furnished with a Pre-Shared Key (PSK), for instance.

For an X2 interface between a source AN 405 and a target AN 405, any protocol stack can be used that supports X2-specific signaling messages and X2 traffic. In one embodiment, X2 may run on top of a User Datagram Protocol (UDP)/IP/DS protocol stack, where the X2/UDP/IP protocol stack is compliant with 3GPP technical specification (TS) 36.423 and 3GPP S 36.424. The layering of IP/DS protocol layers may, for example, be supported for a flat Ethernet-based DS with EtherType=0x0800 for IPv4 and EtherType=0x86DD for IPv6.

Figure 13:
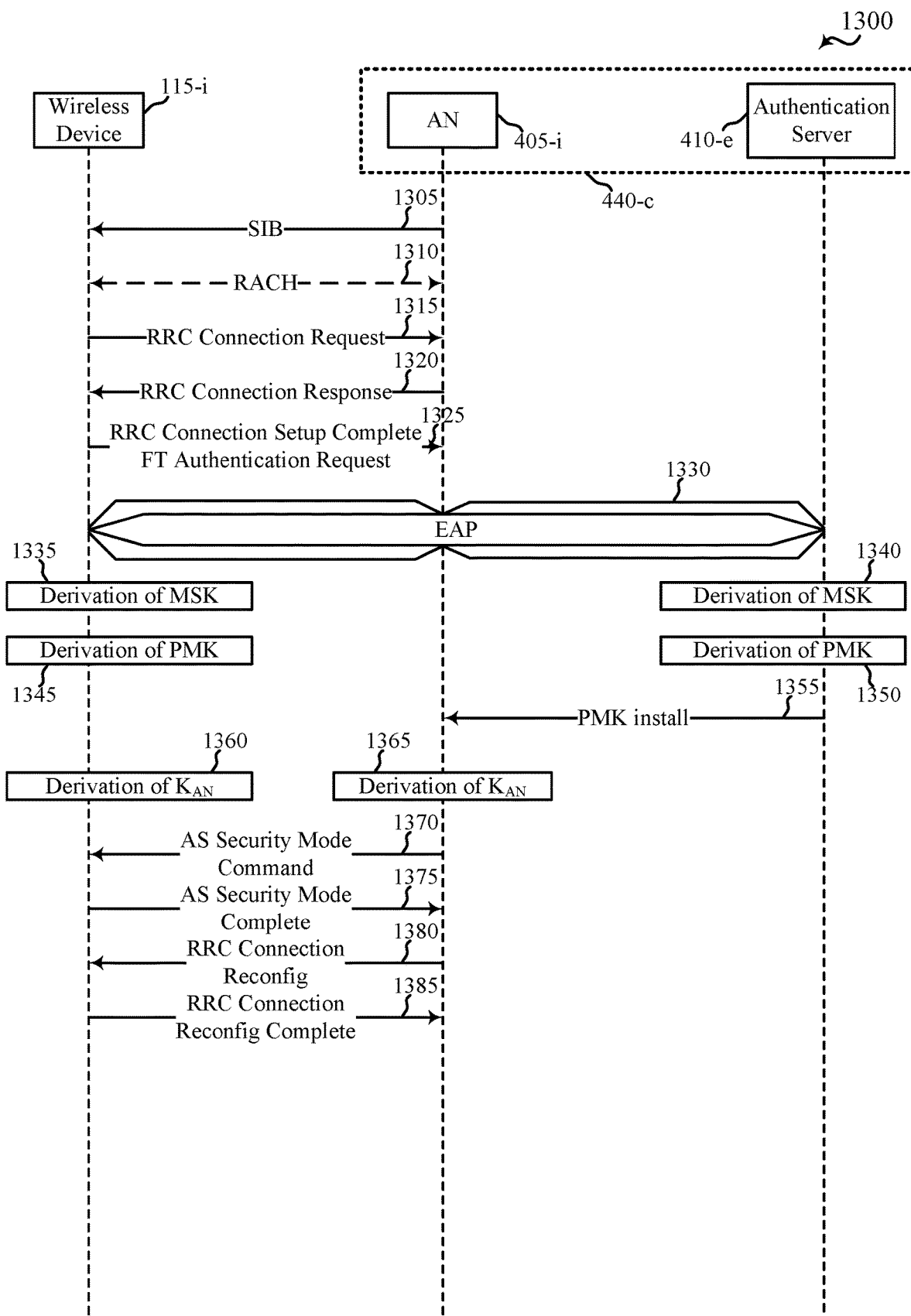
FIG. 13 shows an example message flow for establishing a secure connection between a wireless device and a LAN via an AN, in accordance with various aspects of the present disclosure.

FIG. 13 shows an example message flow 1300 for establishing a secure connection between a wireless device 115-*j* and a LAN 440-*c* via an AN 405-*i*, in accordance with various aspects of the present disclosure. The message flow 1300 illustrates messages between the wireless device 115-*j*, the AN 405-*i*, and an optional authentication server 410-*e* of the LAN 440-*c*. The wireless device 115-*i* may be an example of aspects of a wireless device 115 described with reference to FIGS. 1, 2, 4, 6, 8, 9, 10, 11, and 12. The AN 405-*i* may be an example of aspects of an AN 405 described with reference to FIGS. 4, 6, 8, 9, 10, 11, and 12. The authentication server 410-*e* may be an example of aspects of an authentication server 410 described with reference to FIGS. 4, 6, 8, 11, and 12.

In the message flow 1300, the messages transmitted between the wireless device 115-*i* and the AN 410-*i* may be transmitted over a connection based at least in part on (e.g., implementing aspects of) a cellular RAT (e.g., a LTE/LTE-A RAT). In alternative message flows using some or all of the described techniques, messages may be transmitted between the wireless device 115-*i* and the AN 405-*i* over a connection based at least in part on another type of RAT. In some examples, the messages transmitted between the wireless device 115-*i* and the AN 405-*i* may be messages described in 3GPP TS 36.300, TS 36.331, or TS 33.401, or messages based at least in part on the messages described in 3GPP TS 36.300, TS 36.331, or TS 33.401. The present disclosure describes parameters of the messages transmitted between the wireless device 115-*i*, the AN 405-*i*, and the optional authentication server 410-*e*, which parameters are relevant to the described techniques. In some examples, the messages may include other parameters, such as other parameters described in 3GPP TS 36.300, TS 36.331, or TS 33.401.

At 1305, the AN 405-*i* may broadcast system information (e.g., transmit a System Information Block (SIB)). The system information may include parameters for configuring an interface (e.g., a cellular interface or LTE/LTE-A interface) to communicate with the AN 405-*i*. In some examples, the system information may include an indication that authentication for communication with the LAN 440-*c* (e.g., communication with a LAN DS 446 of the LAN 440-*c* via the AN 405-*i*) is supported by the AN 405-*i*. The indication may indicate that the authentication is supported over a RRC layer or a NAS layer (e.g., via Ethernet, EAPOL, etc.), or that authentication is supported with an authenticator (e.g., an authenticator co-located with the AN 405-*i* and/or an authenticator of the authentication server 410-*e*) in the LAN 440-*c*. In some examples the indication may also indicate an authentication supported with an authenticator that is not located in the LAN 440-*c*, such as an authenticator at a CN 130 of a cellular operator network (e.g., CN 130 of wireless communication system 100 described with reference to FIG. 1). The indication that authentication for communication with the LAN 440-*c* is supported may be explicit or implicit. An implicit indication may include, for example, a network identifier or operator identifier that the wireless device 115-*i* may use to index a configuration of the AN 405-*i* stored at the wireless device 115-*i* (e.g., information that indicates that the AN 405-*i* supports authentication for communication with the LAN 440-*c* by means of a RRC layer, a NAS layer, Ethernet, an authenticator associated with (e.g., co-located at) the AN 405-*i*, an authenticator associated with the authentication server 410-*e*, etc.).

In some examples, the system information broadcast at 1305 may include a specification of the types of authentication supported, such as authentication using a PSK, authentication with the authentication server 410-*e*, or pre-authentication. In the case of pre-authentication, the wireless device 115-*i* may perform an authentication procedure based at least in part on a PMK that was established as part of a prior authentication with the authentication server 410-*e* (e.g., as part of an authentication procedure performed via a different AN 405 of the LAN 440-*c* (not shown)).

In some examples, the system information broadcast at 1305 may include a parameter such as a cell-specific parameter such as a Physical Cell Identity (PCI), a Cell Global Identity (CGI), a Closed Subscriber Group ID (CSG ID), an Evolved Absolute Radio Frequency Channel Number for Downlink (EARFCN-DL), the MAC address of the AN 405-*i* on the LAN 440-*c*, or any combination thereof. The parameter(s) may be included in the key derivation performed at 1360, or may be used by the wireless device 115-*i* to retrieve a PSK or a PMK for the AN 405-*i* (e.g., when pre-authentication is supported).

At 1310, the wireless device 115-*i* may initiate a random access procedure (e.g., a RACH procedure) with the AN 405-*i*, to establish a Cell Radio Network Temporary Identifier (C-RNTI) with the AN 405-*i*, and to obtain timing alignment information from the AN 405-*i*. The random access procedure may be based at least in part on parameters received at 1305, or on a configuration for the AN 405-*i* stored at the wireless device 115-*i*.

At 1315, the wireless device 115-*i* may transmit an RRC Connection Request message to the AN 405-*i*. The RRC Connection Request message may include the C-RNTI established at 1310. The RRC Connection Request message may also indicate what type of operation is desired by the wireless device 115-*i* for establishing the connection, e.g., performing a local LAN access, or accessing to a central network node of the LAN 440-*c* (e.g., a CN) for operator provided services, etc.

At 1320, the AN 405-*i* may respond to the RRC Connection Request message received at 1315 by transmitting an RRC Connection Setup message to the wireless device 115-*i*. The RRC Connection Setup message may identify or establish at least one Radio Bearer (RB) used for authentication messages. The at least one RB may include an SRB or a DRB. The AN 405-*i* may decide based at least in part on local policies of the LAN 440-*c*, or indicating in the RRC Connection Request messages, whether a SRB or DRB or both should be set up. In some examples, an SRB may be established according to C-plane protocol stacks 905-*c*, 910-*c*, and 915-*c* described with reference to FIG. 11, and the SRB may support transporting authentication data (e.g., EAP authentication data) being encapsulated in RRC. In some examples a DRB may be established according to U-plane protocol stacks 905-*d*, 910-*d*, and 915-*d* described with reference to FIG. 12, and the DRB may support transporting authentication data (e.g., EAP authentication data) being encapsulated in Ethernet for transport via a LAN DS 446 to authentication server 410-*e* over a NAS layer. The RRC Connection Setup message may include, for example, some or all of the information indicated to be included in the system information broadcast; a random parameter such as a nonce (e.g., a Nonce-AN) that is to be included in the derivation of a security key at 1360; the MAC address of the AN 405-*i* on the LAN 440-*c* (e.g., to prepare for authentication via EAPOL (an Extensible Authentication Protocol (EAP) over LAN) over a DRB); or a configuration of a wireless device MAC address.

At 1325, the wireless device 115-*i* may respond to the RRC Connection Setup message received at 1320 by transmitting an RRC Connection Setup Complete message to the AN 405-*i*. In some examples, the communications at 1325 may also include a request for FT authentication, where the FT authentication may include determining, exchanging, and/or caching of FT parameters, as described herein. In some examples, the request for FT authentication may be based at least in part on receiving an indication of support for network-based FT from the AN 405-*i*. Such an indication of support may be provided by the AN 405-*i*, for example, in a SIB at 1305, during a RACH message at 1310, during an RRC connection setup message at 1325, or during any other communications between the wireless device 115-*k* and the AN 405-*i*. In some examples an indication of support for network-based FT from the AN 405-*i* may be provided in response to the FT authentication request at 1325, and may be provided in secured communications (e.g., as part of an AS security mode command at 1370, during an RRC connection reconfiguration message at 1380, or during some other communications between the wireless device 115-*i* and the AN 405-*i* after an authentication procedure. In some examples the wireless device 115-*i* may accordingly transmit a set of FT parameters to the AN 405-*i* based at least in part on receiving the indication of support for network-based FT.

Thus, 1305 through 1325 may illustrate an example of operations corresponding to establishing a connection between the wireless device 115-*i* and the AN 405-*i*, and the wireless device 115-*i* may subsequently determine to perform an authentication via the established connection. According to aspects of the present disclosure, these operations may further include an indication of an end point for authentication between the wireless device 115-*i* and the LAN 440-*c*. For example, the indications may identify an authenticator as being co-located with, or otherwise integrated with the AN 405-*i* and/or an authenticator as being part of the authentication server 410-*e*, which may not be co-located with the AN 405-*i*. In some examples, the indication of the authentication end point may be included in a message from the AN 405-*i* to the wireless device 115-*i* (e.g., in the SIB at 1305 or the RRC connection response at 1320). Such messages may include an indication of the protocol end point for authentications as being a NAS layer (which may correspond to authentications using an authenticator at the authentication server 410-*e*, another node of the LAN 440-*c*, or an authenticator that is not part of the LAN 440-*c*) or an RRC layer (which may correspond to authentications using an authenticator at the AN 405-*i*). In some examples, the indication of the protocol end point for authentications may be transmitted by the AN 405-*i* in response to a query sent by the wireless device 115-*i* (e.g., during the connection establishment of 1305-1325, or some other time). The wireless device 115-i may therefore determine to perform an authentication based at least in part on the received indication of the protocol end point for authentications, and/or any other configuration information of the AN 405-i that may be stored at the wireless device 115-i, and retrieved based at least in part on receiving an identifier associated with the AN 405-i (e.g., during connection establishment operations of 1305-1325).

In some examples, (e.g., based at least in part on the received indication of a protocol end point for authentication(s)) the wireless device 115-i may determine one or more authenticators to use for authentication (e.g., determining to use one or both of an authenticator co-located with the AN 405-i or an authenticator at the authentication server 410-e), and transmit an indication that the wireless device 115-i has determined to perform an authentication, which may further include an indication that authentication is to be performed with an authenticator at the AN 405-i and/or an authenticator at the authentication server 410-e. Such indications may be transmitted by the wireless device 115-i at 1315 or 1325 as an explicit indication as part of an RRC connection establishment message. In some examples the wireless device 115-i may select certain resources for performing the RACH procedure at 1310 (e.g., a particular preamble associated with the RACH procedure), and the indication that authentication is to be performed at a particular authenticator may be an implicit indication based at least in part on the selected resources. In other words, the wireless device 115-i may determine to use a particular preamble during the RACH procedure at 1310 as an implicit indication of which protocol end point to use for authentication.

The RRC Connection Setup Complete message at 1325 may confirm the establishment of RB(s) which may be used for authentication messages, and may include, for example, an indication of capabilities of the wireless device 115-i, including supported cipher suites. The RRC Connection Setup Complete message at 1325 may also include an identifier of a PSK or a PMK, if available, together with an identifier of the wireless device 115-i that allows the AN 405-i to retrieve a PSK or PMK cached for the wireless device 115-i. The wireless device 115-i may retrieve these key identifiers based at least in part on the PCI, CGI, or MAC address of the AN 405-i obtained at 1305 or 1320. The RRC Connection Setup Complete message may also include a random parameter such as a nonce (e.g., a Nonce-UE) that is to be included in the derivation of a security key at 1360, or the MAC address of the wireless device 115-i (e.g., if the MAC address of the wireless device 115-i was not provisioned by the AN 405-i and configured at 1320). The MAC address of the wireless device 115-i may be used to prepare for authentication via EAPOL over a DRB, and for traffic forwarding between the wireless device 115-i and the LAN 440-c (e.g., traffic forwarding between the wireless device 115-i and a LAN DS 446 of the LAN 440-c).

At 1330, the AN 405-i may optionally trigger an authentication procedure between the wireless device 115-i and the authentication server 410-e. The authentication procedure between the wireless device 115-i and the authentication server 410-e may be triggered, for example, when an authenticator at the AN 405-i cannot allocate a PSK or a PMK based at least in part on information provided by the wireless device 115-i, or when authentication using a PSK or pre-authentication is not supported by an authenticator at the AN 405-i. In some examples the authentication procedure between the wireless device 115-i and the authentication server 410-a may be based at least in part on an indication received from the wireless device 115-i to perform an authentication with an authenticator at the authentication server 410-e.

From the authentication procedure performed between the wireless device 115-i and the authentication server 410-e, each of the wireless device 115-i and the authentication server 410-e may derive a Master Session Key (MSK) at 1335 or 1340. From the MSK, each of the wireless device 115-i and the authentication server 410-e may derive a PMK at 1345 or 1350. The authentication procedure between the wireless device 115-i and the authentication server 410-e may use EAP, for example. The EAP messages may be exchanged between the wireless device 115-i and the authentication server 410-e via the AN 405-i in various manners, including, for example, natively over a RB identified at 1320. In this example, the packet data convergence protocol (PDCP) layer of the RB may carry an indicator that EAP packets are encapsulated on the cellular link (e.g., a packet may be flagged to pertain to authentication in a PDCP PDU header associated with the packet). In another example, the EAP messages may be exchanged between the wireless device 115-i and the authentication server 410-e over an RB dedicated to an exchange of authentication information. In this example, the logical channel ID of the dedicated RB may flag the packets transmitted on the dedicated RB as pertaining to EAP. In another example, the EAP messages may, with reference to FIG. 11, be exchanged between the wireless device 115-i and the authentication server 410-e in an RRC message (e.g., encapsulated for transport via LAN DS 446 to the authentication server 410-e over the NAS layer) flagged to pertain to authentication (e.g., in an RRC container marked with an EAP indicator). In another example, the EAP messages may, with reference to FIG. 12, be exchanged between the wireless device 115-i and the authentication server 410-e in an Ethernet packet (EAPOL) transmitted over a DRB via the NAS layer that carries traffic of Ethertype=EAP.

When the authentication procedure between the wireless device 115-i and the authentication server 410-e is performed, and when the authentication server 410-e successfully derives a PMK, the authentication server 410-e may forward the PMK to the AN 405-i at 1355. In some examples, the PMK may be forwarded to the AN 405-i. Thereafter, and regardless of whether the optional authentication procedure between the wireless device 115-i and the authentication server 410-e is performed at 1330, both the wireless device 115-i and the AN 405-i should have possession of a PMK prior to 1360 or 1365.

At 1360 or 1365, each of the wireless device 115-i and the AN 405-i may use a Key Derivation Function (KDF) to derive a fresh session key, $K_{AN}$ (i.e., a security key), from the PMK. One example of a KDF is the KDF used to derive a pairwise transient key (PTK) from a PMK in IEEE 802.11i. The KDF may be based at least in part on the random parameters (e.g., Nonce-UE and Nonce-AN) exchanged between the wireless device 115-i and AN 405-i, in addition to AN-specific IDs such as a PCI, a CGI, a CGS-ID, an EARFCN-DL, a MAC address of the AN 405-i, or any combination thereof. Further security keys may be derived from the session key, $K_{AN}$, for securely communicating with the LAN 440-c (e.g., for securely communicating with a LAN DS 446 of the LAN 440-c via the AN 405-i). These further security keys, such as user plane security keys $K_{UPenc}$ or $K_{UPint}$, or RRC security keys $K_{RRCenc}$ or $K_{RRCint}$, may be used to protect traffic transmitted over a DRB or a SRB between the wireless device 115-i and the LAN 440-c (e.g., with a LAN DS 446 of the LAN 440-c), respectively, as defined, for example, in 3GPP TS 33.401, which may be established based at least in part on the further security keys.

Thus, the operations of 1330-1365 may illustrate an example of operations associated with optionally performing an authentication with a protocol end point being an authenticator located at an authentication server 410-*e* that is not co-located with AN 405-*i*, which may correspond to the indication received at 1305 identifying a protocol end point as a NAS layer. In such an example, AN 405-*a* may be communicatively coupled to authentication server 410-*e* via a LAN DS 446 (see FIG. 4), and authentication messages may be encapsulated in Ethernet packets, for example, for transport between the AN 405-*a* and the authentication server 410-*e* via the LAN DS 446. If, instead, the authentication server 410-*e* is co-located with the AN 405-*i*, the indication of the protocol end point for authentication at 1305 would identity the RRC layer, and the co-authentication server 410-*e* would communicate with the wireless device 115-*i* via the RRC layer. Although the authentication procedures of the example message flow 1300 are described in relation to the authentication server 410-*e* being part of the LAN 440-*v*, in various examples the described authentication procedures may alternatively or additionally be performed by an authenticator that is co-located with the AN 405-*i*, or at an authenticator that is outside the LAN 440-*c* (e.g., an authenticator of a CN 130 of a cellular operator network).

At 1370, the AN 405-*i* may transmit an Access Stratum (AS) Security Mode Command message to the wireless device 115-*i*. The AS Security Mode Command message may indicate a specific cipher suite to be used by the wireless device 115-*i* for securely communicating with the LAN 440-*c* (e.g., for securely communicating with a LAN DS 446 of the LAN 440-*c* via the AN 405-*i*), and may include a Message Integration Code using $K_{AN}$ to prove the AN's knowledge of $K_{AN}$.

At 1375, the wireless device 115-*i* may respond to the AS Security Mode Command message received at 1370 by transmitting an AS Security Mode Command Complete message to the AN 405-*i*. The AS Security Mode Command Complete message may include a Message Integration Code using $K_{AN}$ to prove the wireless device's knowledge of $K_{AN}$.

At 1380, the AN 405-*i* may transmit an RRC Connection Reconfiguration message to the wireless device 115-*i*, to establish which DRBs and SRBs are protected based at least in part on $K_{AN}$.

At 1385, the wireless device 115-*i* may configure the RBs identified at 1380, and may respond to the RRC Connection Reconfiguration message received at 1380 by transmitting an RRC Connection Reconfiguration Complete message to the AN 405-*i*. Thereafter, the wireless device 115-*i* may securely communicate with the LAN 440-*c* (e.g., securely communicate with a LAN DS 446 of the LAN 440-*c* via the AN 405-*i*) by transmitting Ethernet packets with its MAC address over the protected DRBs.

Figure 14:
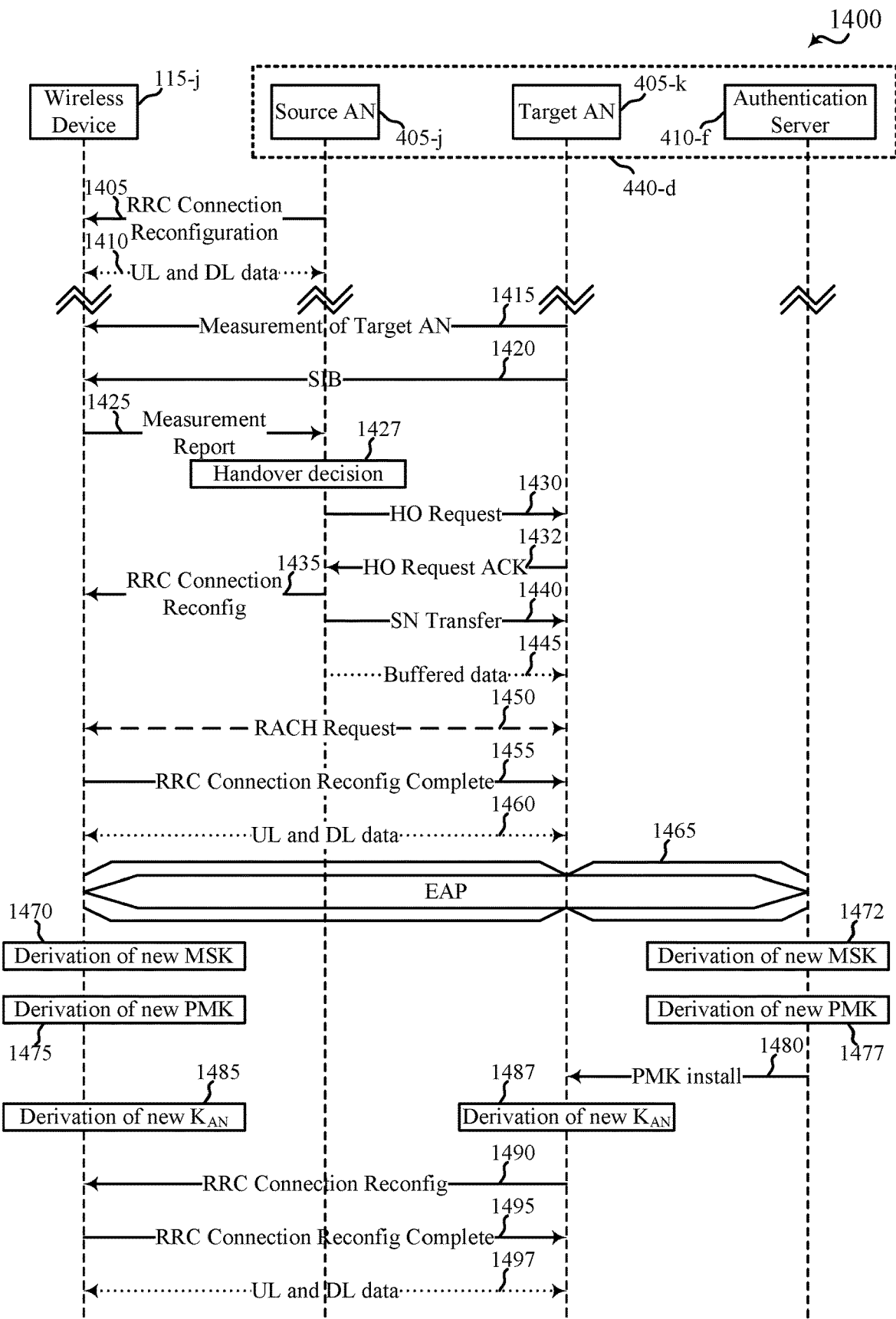
FIG. 14 shows an example message flow for performing a handover of a wireless device having a secure connection with a LAN from a source AN to a target AN, in accordance with various aspects of the present disclosure.

FIG. 14 shows an example message flow 1400 for performing a handover of a wireless device 115-*j* having a secure connection with a LAN 440-*d* from a source AN 405-*j* to a target AN 405-*k*, in accordance with various aspects of the present disclosure. Message flow 1400 illustrates messages between the wireless device 115-*j*, the source AN 405-*j*, the target AN 405-*k*, and an optional authentication node (e.g., authentication server 410-*f*) of the LAN 440-*d*. The wireless device 115-*j* may be an example of aspects of aspects of a wireless device 115 described with reference to FIGS. 1, 2, 4, 6, 8, 9, 10, 11, and 12. The source AN 405-*j* and the target AN 405-*k* may be examples of aspects of an AN 405 described with reference to FIGS. 1, 2, 4, 6, 8, 9, 10, 11, and 12. The authentication server 410-*f* may be an example of aspects of an authentication server 410 described with reference to FIGS. 4, 6, 8, 11, and 12.

In the message flow 1400, the messages transmitted between the wireless device 115-*j* and the source AN 405-*j*, or between the wireless device 115-*j* and the target AN 405-*k*, may be transmitted over a connection based at least in part on (e.g., implementing aspects of) a cellular RAT (e.g., a LTE/LTE-A RAT). In alternative message flows using some or all of the described techniques, messages may be transmitted between the wireless device 115-*j* and the source AN 405-*j*, or between the wireless device 115-*j* and the target AN 405-*k*, over a connection based at least in part on another type of RAT. In some examples, the messages transmitted between the wireless device 115-*j* and the source AN 405-*j*, or between the wireless device 115-*j* and the target AN 405-*k*, may be messages described in 3GPP TS 36.300, TS 36.331, or TS 33.401, or messages based at least in part on the messages described in 3GPP TS 36.300, TS 36.331, or TS 33.401. The present disclosure describes parameters of the messages transmitted between the wireless device 115-*j*, the source AN 405-*j*, the target AN 405-*k*, and the optional authentication server 410-*f*, which parameters are relevant to the described techniques. In some examples, the messages may include other parameters, such as other parameters described in 3GPP TS 36.300, TS 36.331, or TS 33.401.

At 1405, the wireless device 115-*j* may be connected to the LAN 440-*d* via source AN 405-*j* over a connection established according to various operations of message flow 1300 as described with reference to FIG. 13. The source AN 405-*j* may transmit an RRC Connection Reconfiguration message to the wireless device 115-*j* to establish which DRBs and SRBs are protected based at least in part on a first security key, $K_{AN}$. In some examples, the RRC Connection Reconfiguration message may provide the wireless device 115-*j* with a measurement configuration. The measurement configuration may enable the wireless device 115-*j* to measure parameters of communications with the source AN 405-*j* and potential target ANs 405 (e.g., including the target AN 405-*k*). In response to receiving the RRC Connection Reconfiguration message, the wireless device 115-*j* may configure the identified RBs, and respond to the RRC Connection Reconfiguration message by transmitting an RRC Connection Reconfiguration Complete message to the source AN 405-*j* (not shown). In some examples, the RRC Connection Reconfiguration message and RRC Connection Reconfiguration Complete message may be examples of the RRC Connection Reconfiguration message and RRC Connection Reconfiguration Complete message transmitted at 1375 and 1380 of message flow 1300 described with reference to FIG. 13.

At 1410, the wireless device 115-*j* may securely communicate with the LAN 440-*d* (e.g., securely communicate UL and DL data with a LAN DS 446 of the LAN 440-*d*), via the connection with the source AN 405-*j*. The communications at 1405 may include transmitting Ethernet packets with the MAC address of the wireless device 115-*j* over the protected DRBs between the wireless device 115-*j* and the source AN 405-*j*.

At 1415, the wireless device 115-*j* may use the measurement configuration received at 1405 to measure communications received from the target AN 405-*k*. For example, the wireless device 115-*j* may measure the signal strength of communications received from the target AN 405-*k*.

At 1420, the wireless device 115-*j* may receive system information (e.g., a SIB) broadcast by the target AN 405-*k*. The system information may include any of the information described with reference to the operations at 1305 of message flow 1300 described with reference to FIG. 13. In some examples, the wireless device 115-*j* may decode just part of the received system information, such as enough of the system information to obtain a PCI or CGI of the target AN 405-*k*.

At 1425, the wireless device 115-*j* may transmit a measurement report to the source AN 405-*j*. The measurement report may include information related to a measurement of communications with the target AN 405-*k*, in addition to identifying information such as the PCI or CGI of the target AN 405-*k*. When the wireless device 115-*j* holds a PMK due to pre-authentication with the target AN 405-*k*, the wireless device 115-*j* may include a PMK_ID for the PMK in the measurement report. The measurement may also include a random parameter such as a nonce (e.g., a Nonce-UE), or a Nonce-UE-ID that may be used by the source AN 405-*j* to identify a particular Nonce-UE at a later stage of the message flow 1400.

At 1427, the source AN 405-*j* may determine, based at least in part on this measurement report, to initiate a handover of the wireless device 115-*j* from the source AN 405-*j* to the target AN 405-*k*. This is in contrast to operations of a legacy LAN 340 (e.g., legacy LAN 340-*a* described with reference to FIG. 5), where mobility decisions are made by STAs 242 (e.g., STA 242-*a* described with reference to FIG. 5). By providing network-based mobility as described herein, devices of the LAN 440-*d* may advantageously coordinate aspects of handing over the wireless device 115-*j* between the source AN 405-*j* and the target AN 405-*k*, which may reduce downtime due to deteriorating radio conditions and/or movement between coverage areas of the source AN 405-*j* and target AN 405-*k*, reduce the amount of time to perform authentications between the wireless device 115-*j* and the LAN 440-*d*, and reduce communications latency between the wireless device 115-*j* and the LAN 440-*d*.

At 1430, the source AN 405-*j* may transmit a Handover (HO) Request message to the target AN 405-*k* (e.g., based at least in part on the measurement report received at 1425). The Handover Request message may include the context of the wireless device 115-*j*. In some examples, the Handover Request message may be an X2 message routed via the LAN 440-*d*. In some examples, the source AN may retrieve the transport address of the target AN 405-*k* by indexing a lookup table based at least in part on the PCI or CGI included in the measurement report from the wireless device 115-*j*. The Handover Request message may also include a temporary security key, which may be referred to as $K_{AN}^*$, which is derived from (e.g., based at least in part on) the first security key, $K_{AN}$. The temporary security key may be derived using a KDF (e.g., a KDF as described in 3GPP TS 33.401 for the derivation of $K_{eNB}^*$ from $K_{eNB}$). The Handover Request message may also include a Nonce-UE or Nonce-UE-ID received from the wireless device 115-*j* in the measurement report, in addition to a PMK_ID provided in the measurement report, if any.

At 1432, upon accepting the Handover Request, the target AN 405-*k* may respond to the source AN 405-*j* with a Handover Request acknowledgment (ACK) message. The target AN 405-*k* may include in the Handover Request ACK message a container holding the RRC configuration that enables the wireless device 115-*j* to connect to the target AN 405-*k*. The RRC configuration may include a random parameter such as a nonce (e.g., a Nonce-AN), in addition to the Nonce-UE-ID, if any, received in the Handover Request message. The container may also hold a temporary security key usage policy indicating how the temporary security key, $K_{AN}^*$, may be used to securely communicate with the LAN 440-*d* (e.g., a LAN DS 446 of the LAN 440-*d*) via the target AN 405-*k*. The Handover Request ACK message may also indicate a cipher suite selected from the wireless device 115-*j* security capabilities that were transmitted to the target AN 405-*k* by the source AN 405-*j*. The Handover Request ACK message may further include an indication of whether the wireless device 115-*j* needs to perform an authentication handshake with an authentication server (e.g., the optional authentication server 410-*f*) before securely communicating with the target AN 405-*k*. The indication of whether the wireless device 115-*j* needs to perform an authentication handshake with an authentication server 410 may not be necessary when the source AN 405-*j* forwards a PMK_ID to the target AN 405-*k* and the target AN 405-*k* is able to retrieve the corresponding PMK.

The temporary security key usage policy (e.g., a restriction policy of the temporary security key) may include at least one of: an indication of a time interval for which the temporary security key is valid for securely communicating with the LAN 440-*d* via the target AN 405-*k* (e.g., an expiration time), an indication of a number of packets for which the temporary security key is valid for securely communicating with the LAN 440-*d* via the target AN 405-*k*, an indication of a set of one or more bearers for which the temporary security key is valid for securely communicating with the LAN 440-*d* via the target AN 440-*d*, an indication of a bearer type for which the temporary security key is valid for securely communicating with the LAN 440-*d* via the target AN 405-*k*, or a combination thereof.

At 1435, the source AN 405-*j* may forward the RRC configuration received, from the target AN 405-*k*, to the wireless device 115-*j* in an RRC Connection Reconfiguration message. In some examples the source AN 405-*j* may also forward the temporary security key $K_{AN}^*$ to the wireless device 115-*j*. However, in some examples, the wireless device 115-*j* may separately derive $K_{AN}^*$ at the wireless device 115-*j* (e.g., based at least in part on a similar procedure, based at least in part on $K_{AN}$, used by the source AN 405-*j* to derive $K_{AN}^*$ as described with reference to 1430). At this point, the wireless device 115-*j* and the target AN 405-*k* hold the RRC configuration for a direct cellular connection, as well as the random parameters Nonce-UE and Nonce-AN.

At 1440, the source AN 405-*j* may transmit the present PDCP Sequence Number (SN) to the target AN 405-*k* in an SN Transfer message; and at 1445, the source AN 405-*j* may transmit buffered DL data for the wireless device 115-*j*, to the target AN 405-*k*, via an X2 interface.

At 1450, the wireless device 115-*j* may perform a RACH handshake with the target AN 405-*k*.

At 1455, the wireless device 115-*j* may transmit an RRC Connection Reconfiguration Complete message to the target AN 405-*k*, thereby establishing a connection between the wireless device 115-*j* and the target AN 405-*k*. The established connection may include a protected DRB in which the protection is based at least in part on the temporary security key, $K_{AN}^*$ (e.g., based at least in part on a comparison of $K_{AN}^*$ as known to the wireless device 115-*j* and $K_{AN}^*$ as known to the target AN 405-*k*), and in which the use of the protected DRB is based at least in part on the usage policy for the temporary security key. The wireless device may receive the usage policy, for example, in configuration information received from the LAN 440-*d*, in a handover command message received from the source AN 405-*j*, and/or in configuration information received from the target AN 405-*k*. This protected DRB may be used for the exchange of Ethernet traffic with the LAN 440-*d* (e.g., with a LAN DS 446 of the LAN 440-*d*). The RRC configuration may also establish, as part of the connection, a SRB for RRC messages, and may establish a second DRB usable for performing an authentication procedure with an authentication server (e.g., the optional authentication server 410-*f*), as indicated by the indication of whether the wireless device 115-*j* needs to perform an authentication handshake with an authentication server. Thus, operations of 1427 through 1455 may illustrate an example of performing a handover of the wireless device 115-*j* from the source AN 405-*j* to the target AN 405-*k*.

At 1460, the wireless device 115-*j* may use the protected DRB to exchange UL and DL Ethernet traffic with the LAN 440-*d* via the target AN 405-*k*. The protected DRB may be protected based at least in part on the temporary security key, $K_{AN}^*$, with usage of the temporary security key being subject to the policy contained in the RRC Connection Reconfiguration message received by the wireless device 115-*j* at 1435.

At 1465, and based at least in part on an indication that the wireless device 115-*j* needs to perform an authentication handshake with an authentication server, the wireless device 115-*j* may perform an authentication procedure with the authentication server 410-*f* via the second DRB associated with the target AN 405-*k* (e.g., a DRB associated with the temporary security key $K_{AN}^*$). Thus, the target AN 405-*k* may act as a relay for the authentication procedure between the target AN 405-1 and the authentication server 410-*f*. In some examples, the authentication procedure may be based at least in part on an EAP handshake with the authentication server 410-*f* From this authentication procedure, the wireless device 115-*j* and the authentication server may derive a MSK (at 1470 and 1472, respectively), and then derive a PMK from the MSK (at 1475 and 1477, respectively).

Thus, operations at 1465 through 1477 illustrate an example of performing an authentication with an authentication server 410, wherein the authentication is based at least in part on an EAP. The authentication may be enabled, for example, by a connection via the target AN 405-*k* that is based at least in part on the temporary security key $K_{AN}^*$. In some examples, an authentication may be performed with another node of the LAN 440-*d* such as a central keying node 805 (not shown), and the authentication procedure may be based at least in part on a supplicant key holder identifier (ID), an authenticator key holder ID, a PMK_ID, a PMK name, or a combination thereof. Other security solutions may be possible at the LAN 440-*d*, such as various proprietary security solutions.

According to aspects of the present disclosure, communications at 1460 and/or 1465 may involve communications based at least in part on the temporary security key $K_{AN}^*$, and a usage policy (e.g., a restriction policy) for the temporary security key $K_{AN}^*$. For example, communications based at least in part on the temporary security key may include data communications for a fixed duration (e.g., a fixed amount of time or a fixed amount of data (e.g., a fixed number of data packets)), and/or communications via a dedicated communications link (e.g., a dedicated radio bearer for the UL and DL data communications at 1460 and/or a dedicated radio bearer for the communications at 1465 for establishing a more substantial re-authentication). These operations may facilitate a smoother and/or more rapid handover for various communications of the wireless device 115-*j* than would otherwise be permitted by a legacy LAN 340 (e.g., legacy LAN 340-*a* described with reference to FIG. 5). For example, security policies of a legacy LAN 340 may not permit such forwarding of security information between APs 244, and may require a more substantial authentication of a STA 242 (e.g., a new re-authentication with a target AP and/or a full authentication with a AAA 248), and therefore not permit temporary security keys to be exchanged.

By way of contrast, communications based at least in part on the temporary security key $K_{AN}^*$ may be permitted in the LAN 440-*d* before a more substantial authentication is performed (e.g., with the authentication server 410-*f*) because certain protocols (e.g., aspects of a cellular RAT) are employed to support a level of security between the source AN 405-*j* and the target AN 405-*k* that permits providing such a temporary security key between ANs 405. Thus, the communications at 1460 and/or 1465 that are based at least in part on the temporary security key $K_{AN}^*$ may provide a smoother handover of the wireless device 115-*j* from the source AN 405-*j* to the target AN 405-*k*, by limiting or avoiding communications interruptions associated with handover procedures of a legacy LAN 340, such as STA-centric handover procedures. However, by limiting communications based at least in part on the temporary security key $K_{AN}^*$ according to the associated usage policy, various security policies of the LAN 440-*d* (e.g., security policies according to Wi-Fi protocols, or other proprietary security policies) may still be supported (e.g., based at least in part on an expiration of the temporary security key $K_{AN}^*$, based at least in part on limiting usage of the temporary security $K_{AN}^*$ to certain types of communications or certain radio bearers, for wireless devices 115 that do not support temporary security keys, etc.).

At 1480, the authentication server 410-*f* may transmit the PMK to the target AN 405-*k*. At 1485 and 1487, respectively, the wireless device 115-*j* and the target AN 405-*k* may each derive a second security key based at least in part on the PMK, the Nonce-UE, and the Nonce-AN. The second security key may serve as the new $K_{AN}$ for secure communications between the wireless device 115-*j* and the LAN 440-*d* via the connection between the wireless device 115-*j* and the target AN 405-*k* that may implement aspects of a cellular RAT.

At 1490, the target AN 405-*k* may transmit an RRC Connection Reconfiguration message to the wireless device 115-*j*, to configure a protected DRB in which the protection is based at least in part on the second security key. The RRC Connection Reconfiguration message may include a Message Integrity Code that uses the second security key to verify to the wireless device 115-*j* that the target AN 405-*k* has knowledge of the second security key.

At 1495, the wireless device 115-*j* may respond to the RRC Connection Reconfiguration message received at 1490 by transmitting an RRC Connection Reconfiguration Complete message. The RRC Connection Reconfiguration Complete message may include a Message Integrity Code that uses the second security key to verify to the target AN 405-*k* that the wireless device 115-*j* has knowledge of the second security key.

At 1497, the wireless device 115-*j* may exchange Ethernet traffic with the LAN 440-*d* (e.g., a LAN DS 446 of the LAN 440-*d*) over the newly configured DRB of the connection established between the wireless device 115-*j* and the target AN 405-*k*.

Thus, according aspects of the present disclosure, the wireless device 115-*j* may securely communicate with the LAN 440-*d*, via the connection established between the wireless device 115-*j* and the target AN 405-*k*, according to the temporary security key $K_{AN}*$ and the usage policy for the temporary security key $K_{AN}*$, and also according to the second security key of 1480, which is not subject to the usage policy associated with the temporary security key $K_{AN}*$. In some examples, this may include secure communications based at least in part on the temporary security key and communications based at least in part on the second security key occurring at different times. In some examples, these secure communications may include switching from securely communicating with the LAN 440-*d* based at least in part on the temporary security key to securely communicating with the LAN 440-*d* based at least in part on the second security key, and the switching may be based at least in part on a configuration message received from the target AN 405-*k* (e.g., the RRC Connection Reconfiguration message transmitted at 1490), an availability of the second security key, or a combination thereof.

As used herein, secure communications based at least in part on a security key described as being "not subject to" a restriction policy for another security key may refer to communications where none of the restriction policy of the other security key are applied, communications where some subset of the restriction policy of the other security key are applied, communications where an entirely different restriction policy is applied, communications where no restriction policy applies, and so on. In other words, the secure communications based at least in part on the two different security keys may be based on different restriction policies.

In a variation of the message flow 1400, the authentication server 410-*f* may be, or be otherwise integrated with a central keying node 805 (e.g., a wireless LAN controller), and the authentication procedure performed with the central keying node 805 may be based at least in part on: a supplicant key holder ID, an authenticator key holder ID, a PMK_ID, a PMK name, or a combination thereof.

Figure 15:
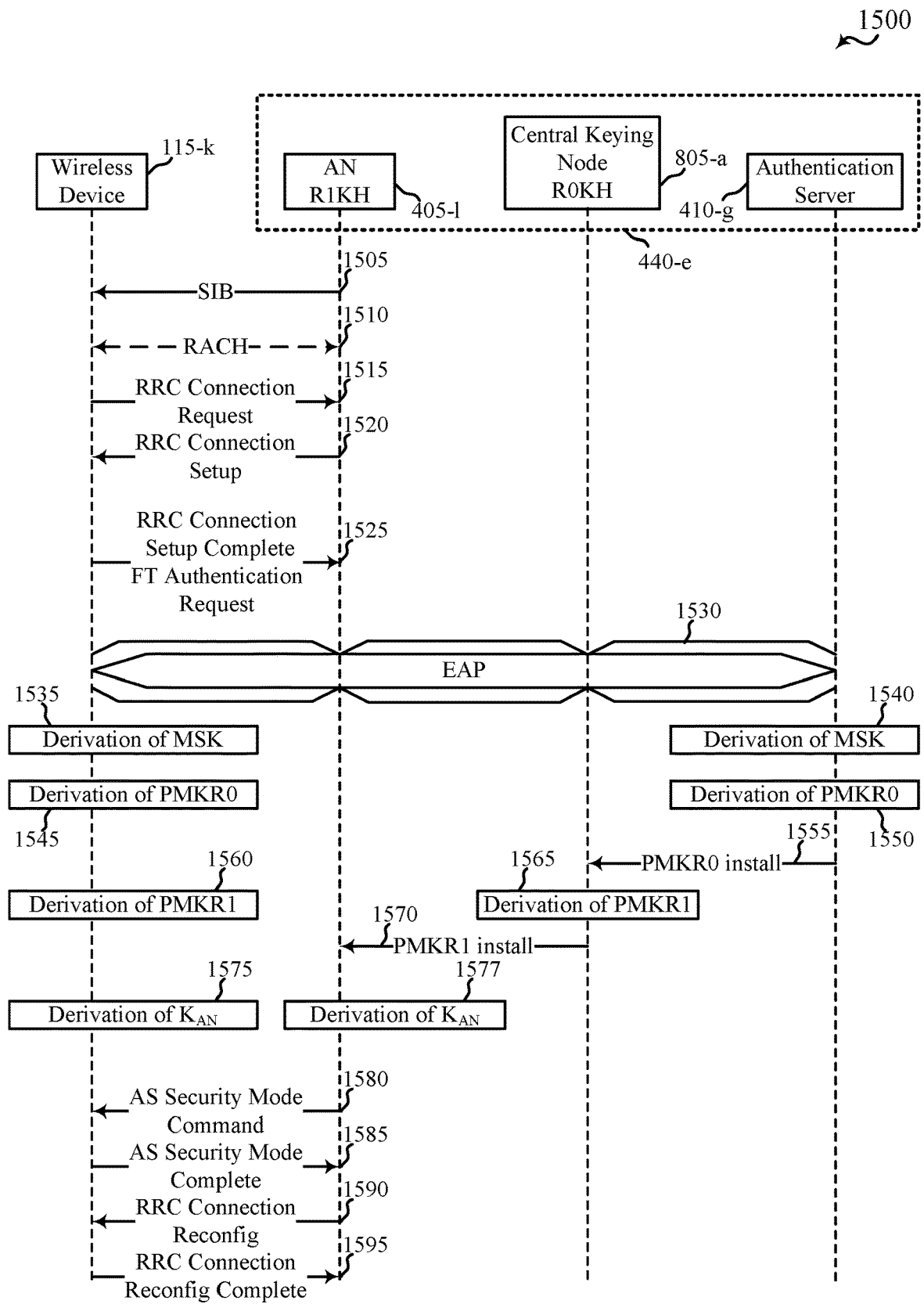
FIG. 15 shows an example message flow for establishing a secure connection between a wireless device and a LAN, in accordance with various aspects of the present disclosure.

FIG. 15 shows an example message flow 1500 for establishing a secure connection between a wireless device 115-1 and a LAN 440-*e*, in accordance with various aspects of the present disclosure. Message flow 1500 illustrates messages between the wireless device 115-1, an AN 405-1 of the LAN 440-*e*, a central keying node 805-*a* of the LAN 440-*e*, and an authentication server 410-*g* of the LAN 440-*e*. The wireless device 115-1 may be an example of aspects of a wireless device 115 described with reference to FIGS. 1, 2, 4, 6, 8, 9, 10, 11, and 12. The AN 405-1 may be an example of aspects of the ANs 405 described with reference to FIGS. 4, 6, 8, 9, 10, 11, and 12. The central keying node 805-*a* may be an example of aspects of the central keying node 805 described with reference to FIG. 8. The authentication server 410-*g* may be an example of aspects of the authentication servers 410 described with reference to FIGS. 4, 6, 8, 11, and 12.

In the message flow 1500, the messages transmitted between the wireless device 115-*k* and the AN may be transmitted over a connection based at least in part on (e.g., implementing aspects of) a cellular RAT (e.g., a LTE/LTE-A RAT). In alternative message flows using some or all of the described techniques, messages may be transmitted between the wireless device 115-*k* and the AN 405-1 over a connection based at least in part on another type of RAT. In some examples, the messages transmitted between the wireless device 115-*k* and the AN 405-1 may be messages described in 3GPP TS 36.300, TS 36.331, or TS 33.401, or messages based at least in part on the messages described in 3GPP TS 36.300, TS 36.331, or TS 33.401. The present disclosure describes parameters of the messages transmitted between the wireless device 115-*k*, the AN 405-1, and the authentication server 410-*g*, which are relevant to the described techniques. In some examples, the messages may include other parameters, such as other parameters described in 3GPP TS 36.300, TS 36.331, or TS 33.401.

In some examples, the messages transmitted as part of the message flow 1500 may be examples of the messages transmitted as part of the message flow 1300 described with reference to FIG. 13, and may include aspects of (including the entireties of) corresponding messages transmitted as part of the message flow 1300.

At 1505, the AN 405-1 may broadcast system information (e.g., transmit a SIB). The system information may include parameters for configuring an interface (e.g., a cellular interface or LTE/LTE-A interface) to communicate with the AN 405-1. In some examples, the system information may include a Fast Transition Mobile Domain ID (MDID). Based at least in part on the MDID, the wireless device 115-*k* may recognize a change in a R0KH (e.g., the central keying node 805-*a*), if any.

At 1510, the wireless device 115-*k* may initiate a random access procedure (e.g., a RACH procedure) with the AN 405-1, to establish a C-RNTI with the AN 405-1 and to obtain timing alignment information from the AN 405-1. The random access procedure may be based at least in part on parameters received at 1505, or on a configuration for the AN 405-1 stored at the wireless device 115-*k*.

At 1515, the wireless device 115-*k* may transmit an RRC Connection Request message to the AN 405-1. The RRC Connection Request message may include the C-RNTI established at 1510.

At 1520, the AN 405-1 may respond to the RRC Connection Request message received at 1515 by transmitting an RRC Connection Setup message to the wireless device 115-*k*. The RRC Connection Setup message may identify (or establish) at least one RB used for authentication messages. The at least one RB may include an SRB or a DRB. The RRC Connection Setup message may include, for example, some or all of the information indicated to be included in the system information broadcast (including the MDID, if it is not transmitted in the system information broadcast); a random parameter such as a nonce (e.g., a Nonce-AN) that is to be included in the derivation of a security key at 1575 or 1577; an R1-Key-Holder-ID (R1KH-ID) and an R0-Key-Holder ID (R0KH-ID); or a MAC address for the wireless device 115-*k* on the LAN 440-*e* (which may serve as a supplicant key holder ID such as an S1-Key-Holder ID (S1KH-ID)). In some examples, the R1KH-ID may be the MAC address of the AN 405-1 on the LAN 440-*e*. In some examples, the R0KH-ID may be an identifier of a network node referred to as a WLC (e.g., central keying node 805-*a*).

At 1525, the wireless device 115-*k* may respond to the RRC Connection Setup message received at 1520 by transmitting an RRC Connection Setup Complete message to the AN 405-1. The RRC Connection Setup Complete message may confirm the establishment of the RB used for authentication messages, and may include, for example, an S1KH-ID, which in some examples may be the MAC address of the wireless device 115-*k*. The S1KH-ID may not be included in the RRC Connection Setup message when the MAC address of the wireless device 115-*k* serves as the S1KH-ID and was received from the AN 405-1 in the RRC Connection Setup message (at 1520). The RRC Connection Setup Complete message may also include a random parameter such as a nonce (e.g., a Nonce-UE) that is to be included in the derivation of a security key at 1575 or 1577.

In some examples, the communications at 1525 may also include a request for FT authentication, which may include determining, exchanging, and/or caching of FT parameters, as described herein. In some examples, the request for FT authentication may be based at least in part on receiving an indication of support for network-based FT from the AN 405-1. Such an indication of support may be provided by the AN 405-1, for example, in a SIB at 1505, during a RACH message at 1510, during an RRC connection setup message at 1525, or during any other communications between the wireless device 115-k and the AN 405-1. In some examples an indication of support for network-based FT from the AN 405-1 may be provided in response to the FT authentication request at 1525, and may be provided in secured communications (e.g., as part of an AS security mode command at 1580, during an RRC connection reconfiguration message at 1590, or during some other communications between the wireless device 115-k and the AN 405-1 after an authentication procedure. In some examples the wireless device 115-k may accordingly transmit a set of FT parameters to the AN 405-1 based at least in part on receiving the indication of support for network-based FT.

At 1530, the AN 405-1 may trigger an authentication procedure between the wireless device 115-k and the authentication server 410-g. From the authentication procedure performed between the wireless device 115-k and the authentication server 410-g, each of the wireless device 115-k and the authentication server 410-g may derive a MSK at 1535 or 1540. From the MSK, each of the wireless device 115-k and the authentication server 410-g may derive a PMKR0 at 1545 or 1550. The authentication procedure between the wireless device 115-k and the authentication server 410-g may use EAP, for example. The EAP messages may be exchanged between the wireless device 115-k and the authentication server 410-g (e.g., via the AN 405-1) in various manners, including, for example, natively on the RB identified at 1520. The EAP transport may be routed via the central keying node 805-a.

At 1555, the authentication server 410-g may forward the PMKR0 to the central keying node 805-a on a secure channel. At 1560 and 1565, the central keying node 805-a and the wireless device 115-k may respectively derive a PMKR1 from the PMKR0 using a KDF (e.g., using the KDF defined in IEEE 802.11r). The KDF may be based, in part, on the MAC addresses of the AN 405-1 and the wireless device 115-k. At 1570, the central keying node 805-a may transmit the PMKR1 to the AN 405-1.

At 1575 and 1577, each of the wireless device 115-k and the AN 405-1 may use a KDF to derive a fresh session key, $K_{AN}$ (e.g., a security key), from the PMKR1. One example of a KDF is the KDF used to derive a PTK from a PMK in IEEE 802.11i. The KDF may be based at least in part on the random parameters (e.g., Nonce-UE and Nonce-AN) exchanged between the wireless device 115-k and the AN 405-1, in addition to AN-specific IDs such as a PCI, a CGI or an MAC address of the AN 405-1. Further security keys may be derived from the session key, $K_{AN}$, for securely communicating with the LAN 440-e (e.g., with a LAN DS 446 of the LAN 440-e). These further security keys, such as $K_{UP}$ and $K_{RRC}$, may be used to protect traffic transmitted over a DRB or a SRB, respectively, as defined, for example, in 3GPP TS 33.401.

At 1580, the AN 405-1 may transmit an AS Security Mode Command message to the wireless device 115-k. The AS Security Mode Command message may indicate a specific cipher suite to be used by the wireless device 115-k for securely communicating with the LAN 440-e, and may include a Message Integration Code using $K_{AN}$ to prove the AN's knowledge of $K_{AN}$.

At 1585, the wireless device 115-k may respond to the AS Security Mode Command message received at 1580 by transmitting an AS Security Mode Command Complete message to the AN 405-1. The AS Security Mode Command Complete message may include a Message Integration Code using $K_{AN}$ to prove the wireless device's knowledge of $K_{AN}$.

At 1590, the AN 405-1 may transmit an RRC Connection Reconfiguration message to the wireless device 115-k, to establish which DRBs and SRBs are protected based at least in part on $K_{AN}$.

At 1595, the wireless device 115-k may configure the RBs identified at 1590, and may respond to the RRC Connection Reconfiguration message received at 1590 by transmitting an RRC Connection Reconfiguration Complete message to the AN 405-1. Thereafter, the wireless device 115-k may securely communicate with the LAN 440-e (e.g., with a LAN DS 446 of the LAN 440-e) by transmitting Ethernet packets with its MAC address over the protected DRBs.

Figure 16:
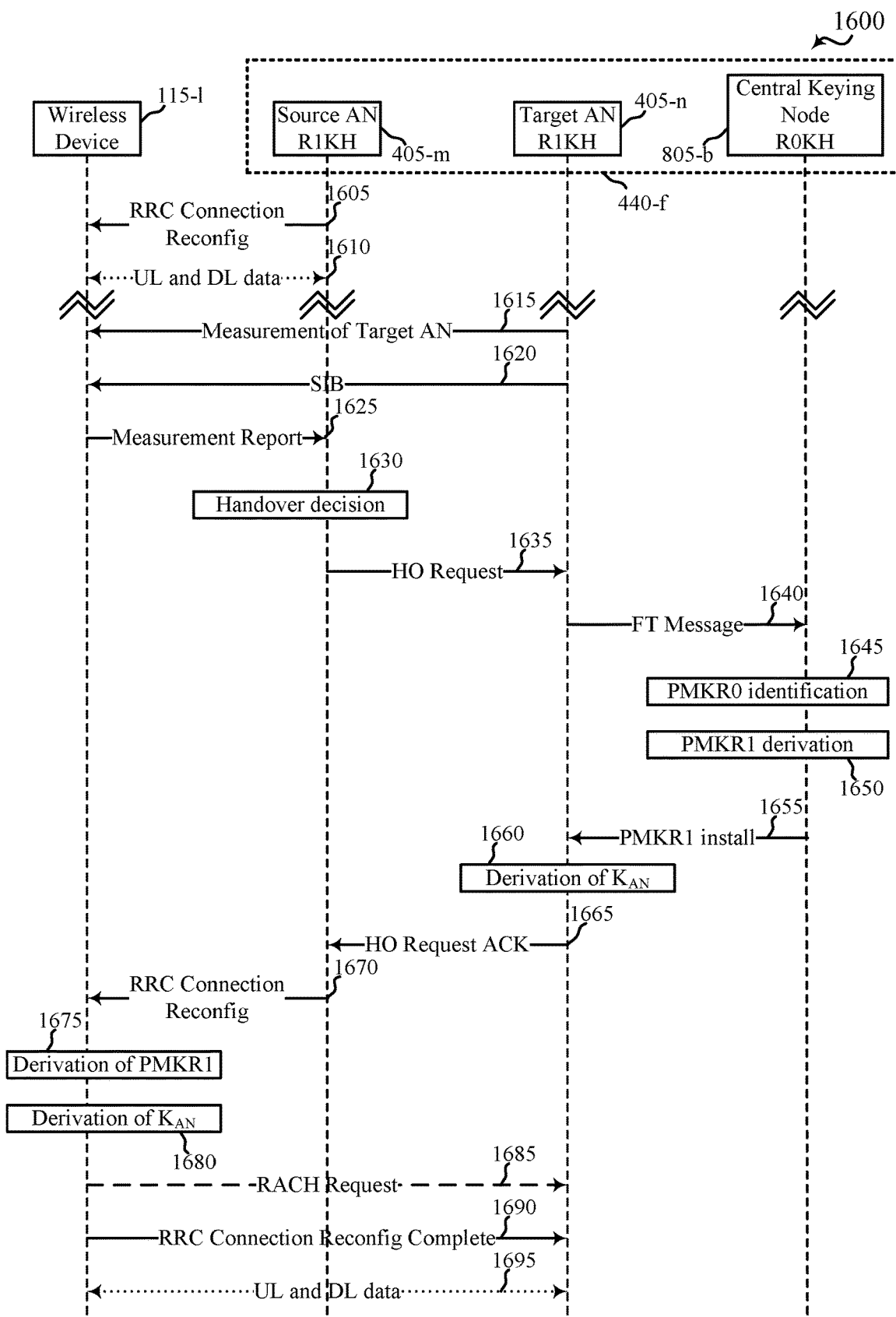
FIG. 16 shows an example message flow for performing a fast transition of a secure connection with a LAN from a source AN to a target AN, in accordance with various aspects of the present disclosure.

FIG. 16 shows an example message flow 1600 for performing a fast transition of a secure connection with a LAN 440-f from a source AN 405-m to a target AN 405-n, in accordance with various aspects of the present disclosure. The message flow 1600 illustrates messages between the wireless device 115-1, a source AN 405-m, a target AN 405-n, and a central keying node 805-b. The wireless device 115-1 may be an example of aspects of a wireless device 115 described with reference to FIGS. 1, 2, 4, 6, 8, 9, 10, 11, and 12. The source AN 405-m and the target AN 405-n may be examples of aspects an AN 405 described with reference to FIGS. 4, 6, 8, 9, 10, 11, and 12. The central keying node 805-b may be an example of aspects of a central keying node 805 described with reference to FIGS. 8 and 15.

In the message flow 1600, the messages transmitted between the wireless device 115-1 and the source AN 405-m, or between the wireless device 115-1 and the target AN 405-n, may be transmitted over a connection based at least in part on (e.g., implementing aspects of) a cellular RAT (e.g., a LTE/LTE-A RAT). In alternative message flows using some or all of the described techniques, messages may be transmitted between the wireless device 115-1 and the source AN 405-m, or between the wireless device 115-1 and the target AN 405-n, over a connection based at least in part on another type of RAT. In some examples, the messages transmitted between the wireless device 115-1 and the source AN 405-m, or between the wireless device 115-1 and the target AN 405-n, may be messages described in 3GPP TS 36.300, TS 36.331, or TS 33.401, or messages based at least in part on the messages described in 3GPP TS 36.300, TS 36.331, or TS 33.401. The present disclosure describes parameters of the messages transmitted between the wireless device 115-1, the source AN 405-m, the target AN 405-n, and the central keying node 805-b, which are relevant to the described techniques. In some examples, the messages may include other parameters, such as other parameters described in 3GPP TS 36.300, TS 36.331, or TS 33.401.

At 1605, the wireless device 115-1 may be connected to the source AN 405-m (e.g., via a first connection, which may be established, for example, according to operations of message flows 1300 and/or 1500 described with reference to FIGS. 13 and 15), and the source AN 405-m may transmit an RRC Connection Reconfiguration message to the wireless device 115-1, to establish which DRBs and SRBs are protected based at least in part on a first security key, $K_{AN}$. In some examples, the RRC Connection Reconfiguration message may provide the wireless device 115-1 with a measurement configuration. The measurement configuration may enable the wireless device 115-1 to measure parameters of communications with the source AN 405-m and potential target ANs (e.g., including the target AN 405-n). These measured parameters may subsequently be provided to the LAN 440-f to support network-based mobility operations, as described according to the present disclosure. The network-based mobility operations of the LAN 440-f are in contrast with a legacy LAN 340 (e.g., legacy LAN 340-b described with reference to FIG. 7), which may operate according to STA-centric mobility operations. Thus, as described herein, the modifications to support network-based mobility operations of the LAN 440-f may improve handover operations, including those pertaining to the exchange of FT parameters, as compared with a legacy LAN 340.

In response to receiving the RRC Connection Reconfiguration message, the wireless device 115-1 may configure the identified RBs, and respond to the RRC Connection Reconfiguration message by transmitting an RRC Connection Reconfiguration Complete message to the source AN 405-m (not shown). In some examples, the RRC Connection Reconfiguration message and RRC Connection Reconfiguration Complete message may be an example of aspects of the RRC Connection Reconfiguration message and RRC Connection Reconfiguration Complete message transmitted at 1380 and 1385 in message flow 1300 described with reference to FIG. 13.

At 1610, the wireless device 115-1 may securely communicate with the LAN 440-f (e.g., with a LAN DS 446 of the LAN 440-f), via the first connection with the source AN 405-m, by transmitting Ethernet packets with its MAC address over the protected DRBs.

At 1615, the wireless device 115-1 may use the measurement configuration received at 1605 to measure communications received from the target AN 405-n. For example, the wireless device 115-1 may measure the signal strength of communications received from the target AN 405-n.

At 1620, the wireless device 115-1 may receive system information (e.g., a SIB) broadcast by the target AN 405-n. The system information may include any of the information of the SIB at 1305 of message flow 1300 described with reference to FIG. 13, of the SIB at 1420 of message flow 1400 described with reference to FIG. 14, and/or of the SIB at 1505 of message flow 1500 described with reference to FIG. 15, for example. In some examples, the wireless device 115-1 may decode just part of the received system information, such as enough of the system information to obtain a PCI or CGI of the target AN 405-n.

At 1625, the wireless device 115-1 may transmit a measurement report to the source AN 405-m. The measurement report may include information related to the measurement of communications from the target AN 405-n, in addition to identifying information such as the PCI or CGI of the target AN 405-n. The measurement report may include a random parameter such as a nonce (e.g., a Nonce-UE), or a Nonce-UE-ID that may be used by the source AN 405-m to identify a particular Nonce-UE at a later stage of the message flow 1600.

According to aspects of the present disclosure, the wireless device 115-1 may transmit, to the source AN 405-m, a set of FT parameters pertaining to authentication for caching at the source AN 405-m, entrusting the source AN 405-m with the FT parameters for a subsequent handover. The FT parameters may include keying material and/or information pertaining to the identity of the wireless device 115-1, including, for example, information pertaining to a supplicant key holder identifier (e.g., an S1KH-ID), information pertaining to a first authenticator key holder ID, information pertaining to a security key, a set of fast basic service set (BSS) transition parameters, or a combination thereof. The FT parameters may be provided to the source AN 405-m in various messages, including in UL data at 1610, with the measurement report at 1625, or with other messages exchanged during the establishment of the connection between the wireless device 115-1 and the source AN 405-m (e.g., as described with reference to message flows 1300 and 1500 described with reference to FIGS. 13 and 15). In some examples, the transmitting of FT parameters by the wireless device 115-1 may be based at least in part on receiving an indication of support for network based FT, as described with reference to FIGS. 13 and 15. Subsequently, the source AN 405-m may cache the set of FT parameters for forwarding during handover.

At 1630, the source AN 405-m may determine, based at least in part on this measurement report, to initiate a handover of the wireless device 115-1 from the source AN 405-m to the target AN 405-n.

At 1635, the source AN 405-m may transmit a HO Request message to the target AN 405-n. The HO Request message may include the wireless device's context. In some examples, the HO Request message may be an X2 message routed via the LAN 440-f (e.g., via a LAN DS 446 of the LAN 440-f). In some examples, the source AN 405-m may retrieve the transport address of the target AN 405-n by indexing a lookup table based at least in part on the PCI or CGI included in the measurement report from the wireless device 115-1. The HO Request message may also include, for example, the FT parameters such as a S1KH-ID (e.g., the MAC address of the wireless device 115-1), a R0KH-ID (e.g., the ID of the central keying node 805-b), a PMKR0Name derived from the PMKR0 (as defined, e.g., by IEEE 802.11r), a Nonce-UE (and eventually, a Nonce-UE-ID), capability information of the wireless device 115-1 (e.g., a cipher suite supported by the wireless device 115-1), or a combination thereof.

By caching the FT parameters of the wireless device 115-1 at the source AN 405-m, and providing the FT parameters from the source AN 405-m to the target AN 405-n during handover, the LAN 440-f may provide for improved handover operations as compared to a legacy LAN 340 that does not support such operations. For example, because the LAN 440-f has been modified to support FT parameter exchange between ANs 405, the source AN 405-m and the target AN 405-n may have established security protocols that support a direct exchange of such security parameters between ANs 405. A legacy LAN 340 operating under legacy protocols (e.g., legacy LAN 340-b described with reference to FIG. 7), on the other hand, may not have such established trust between APs 244, and therefore would not support such an exchange (e.g., between R1 key holders).

Further, because the LAN 440-f operates with network-based mobility operations, handover decisions and operations may be coordinated by various devices in the LAN 440-f, as described herein. Accordingly, while handover operations are initiated and performed by devices of the LAN 440-f, the wireless device 115-1 may be concurrently connected with, and communicating via the source AN 405-m, and such handover decisions and operations may be transparent to the wireless device 115-1. A legacy LAN 340 (e.g., legacy LAN 340-b described with reference to FIG. 7), on the other hand, performs STA-centric mobility operations, and accordingly may not support such a concurrent connection. Rather, under the STA-centric mobility protocols of a legacy LAN 340, a STA 242 may perform communications with a source AP 244, determine to connect with a target AP 244, and may experience significant interruption in communications while performing handover operations to establish a connection with the target AP 244. At 1640, in an example that uses a central keying node 805-b to provide an updated security key using the FT parameters, the target AN 405-n, representing the new R1KH, may identify the central keying node 805-b based at least in part on the R0KH-ID and forward FT information (e.g., at least a portion of the FT parameters received from the wireless device 115-1) to the central keying node 805-b. The forwarded information may include, for example, the S1KH-ID (e.g., the MAC address of the wireless device 115-1), the R1KH-ID (e.g., the MAC address of the target AN 405-n), the PMKR0Name, and the R0KH-ID.

At 1645, the central keying node 805-b may retrieve the PMKR0 based at least in part on the S1KH-ID and the PMKR0Name. At 1650, the central keying node 805-b may derive a PMKR1 based at least in part on the S1KH-ID and the R1KH-ID of the target AN 405-n using a KDF (e.g., the KDF used by IEEE 802.11i for derivation of a PTK from a PMK). At 1655, the central keying node 805-b may transmit the PMKR1 to the target AN 405-n using a secured connection.

At 1660, the target AN 405-n may select a random parameter (e.g., a Nonce-AN) and derive a fresh session key, $K_{AN}$, from the PMKR1, the Nonce-AN, and the Nonce-UE. The target AN 405-n may respond to the HO Request from the source AN 405-m with a HO Request ACK message at 1665. The HO Request ACK message may include a container that holds the RRC configuration for the wireless device 115-1 to connect to the target AN 405-n. The RRC configuration may include a set of security parameters that are based at least in part on the FT parameters. The set of security parameters may include, for example, the Nonce-AN, the Nonce-UE-ID, the R1KH-ID (e.g., the MAC address of the target AN 405-n), a key lifetime interval, a reconnection deadline interval, a cipher suite selector, and a message integrity code (MIC) using $K_{AN}$ to prove knowledge of this security key. Because $K_{AN}$ is derived at 1660 based at least in part on the PMKR1 of 1650, and the PMKR1 is derived at 1650 based at least in part on the S1KH-ID of the wireless device 115-1 (an example of an FT parameter), the set of security parameters may therefore be based at least in part on the FT parameters for at least the set of security parameters' inclusion of the MIC using $K_{AN}$ to prove knowledge of the security key. Other examples exist, however, where exchanged FT parameters may be used to generate set of security parameters that may be forwarded, by a source AN 405, from a target AN 405 to a wireless device 115, to facilitate a network-coordinated handover of the wireless device 115 from the source AN 405 to the target AN 405.

At 1670, the source AN 405-m may forward the RRC configuration obtained from the target AN 405-m to the wireless device 115-1 in an RRC Connection Reconfiguration message. At this point, the wireless device 115-1 and target AN 405-n hold the RRC configuration for a direct cellular connection between the wireless device 115-1 and the target AN 405-n, including the R1KH-ID of the target AN 405-n, as well as random parameters Nonce-UE and Nonce-AN. At 1675 and 1680, the wireless device 115-1 may derive PMKR1 and the session key $K_{AN}$, and may verify the MIC contained in the set of security parameters included with the RRC Connection Reconfiguration message.

At 1685, the wireless device 115-1 may perform a RACH handshake with the target AN 405-n.

At 1690, the wireless device 115-1 may transmit an RRC Connection Reconfiguration Complete message to the target AN 405-n, thereby establishing a protected DRB in which the protection is based at least in part on the security key, $K_{AN}$. The RRC Connection Reconfiguration Complete message may include a MIC using $K_{AN}$ to prove knowledge of this key. The target AN 405-n may verify the MIC. The protected DRB may be used for the exchange of Ethernet traffic with the LAN 440-f (e.g., with a LAN DS 446 of the LAN 440-f). The RRC configuration may also establish a SRB for RRC messages, and may establish a second DRB usable for performing an authentication procedure with an authentication server 410 (not shown), as indicated by the indication of whether the wireless device 115-1 needs to perform an authentication handshake with an authentication server 410.

At 1695, the wireless device 115-1 may use the protected DRB to exchange UL and DL Ethernet traffic with the LAN 440-f (e.g., with a LAN DS 446 of the LAN 440-f). The protected DRB may be protected based at least in part on the security key, $K_{AN}$.

Accordingly, as described herein, the message flow 1600 for communications between the wireless device 115-1 and the LAN 440-f advantageously supports a modified approach in which the LAN 440-f provides network-based mobility operations, where the wireless device 115-1 may provide FT parameters that are entrusted for exchange directly between the ANs 405 of the LAN 440-f (e.g., the source AN 405-m and the target AN 405-n). These FT parameters may be used by devices of the LAN 440-f (e.g., the source AN 405-m, the target AN 405-n, and the central keying node 805-b) to facilitate smoother handover between ANs 405, and perform handover operations that are transparent to the wireless device 115-1, and support concurrent communications between the wireless device 115-1 and the LAN 440-f while such handover operations take place, thereby reducing communications interruptions during handover as compared to those that may be experienced when operating according to protocols of a legacy LAN 340 (e.g., Wi-Fi protocols).

Figure 17:
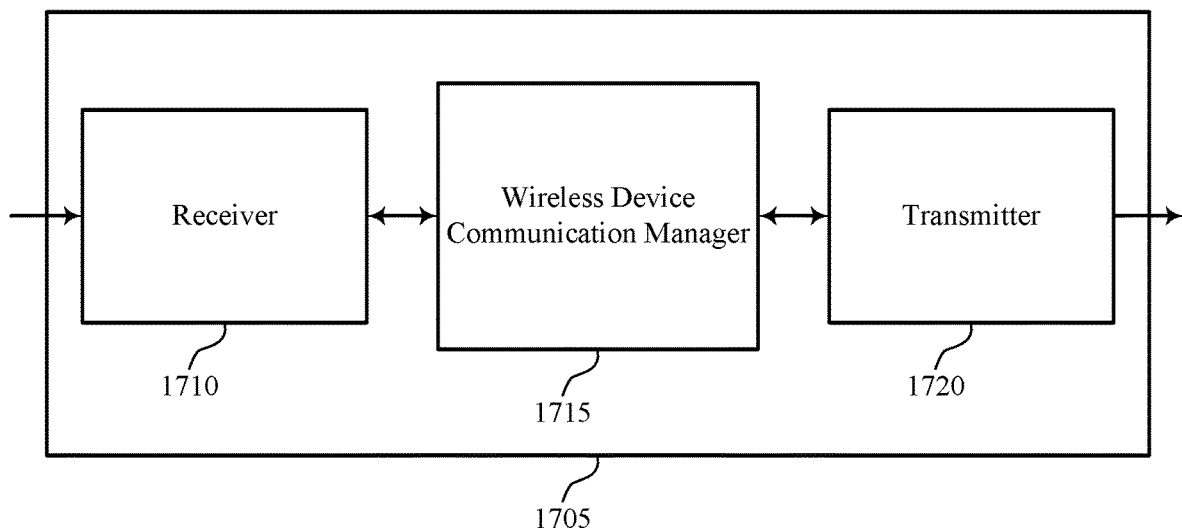
FIG. 17 shows a block diagram of a device that supports modified techniques for establishing secure connections between a wireless device and a LAN via an AN, in accordance with various aspects of the present disclosure.

FIG. 17 shows a block diagram 1700 of a device 1705 that supports modified techniques for establishing secure connections between a wireless device 115 and a LAN 440 via an AN 405, in accordance with various aspects of the present disclosure. Device 1705 may be an example of aspects of a wireless device 115 as described with reference to FIGS. 1, 2, 4, 6, 8, and 9-16. Device 1705 may include a receiver 1710, a wireless device communication manager 1715, and a transmitter 1720. Device 1705 may also include a processor. Each of these components may be in communication with one another (e.g., via one or more buses).

Receiver 1710 may receive information such as packets, user data, or control information associated with various information channels (e.g., control channels, data channels, and information related to modified techniques for establishing a secure connection between a wireless device 115 and a LAN 440 via an AN 405, etc.). Received information may be passed on to other components of the device 1705. The receiver 1710 may be an example of aspects of the transceiver 1935 described with reference to FIG. 19. The receiver 1710 may include or be associated with a single antenna or a plurality of antennas.

Transmitter 1720 may transmit signals generated by other components of the device 1705. In some examples, the transmitter 1720 may be collocated with a receiver 1710 in a transceiver module. For example, the transmitter 1720 may be an example of aspects of the transceiver 1935 described with reference to FIG. 19. The transmitter 1720 may include or be associated with a single antenna or a plurality of antennas.

Wireless device communication manager 1715 and/or at least some of its various sub-components may be implemented in hardware, software executed by a processor, firmware, or any combination thereof. If implemented in software executed by a processor, the functions of the wireless device communication manager 1715 and/or at least some of its various sub-components may be executed by a general-purpose processor, a digital signal processor (DSP), an application-specific integrated circuit (ASIC), an field-programmable gate array (FPGA), or other programmable logic device, discrete gate or transistor logic, discrete hardware components, or any combination thereof designed to perform the functions described in the present disclosure. The wireless device communication manager 1715 and/or at least some of its various sub-components may be physically located at various positions, including being distributed such that portions of functions are implemented at different physical locations by one or more physical devices. In some examples, wireless device communication manager 1715 and/or at least some of its various sub-components may be a separate and distinct component in accordance with various aspects of the present disclosure. In other examples, wireless device communication manager 1715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Wireless device communication manager 1715 may also be an example of aspects of the wireless device communication manager 1915 described with reference to FIG. 19.

In examples where the wireless device communication manager 1715 supports modified techniques for establishing a secure connection with a LAN 440 via an AN 405 as described herein, the wireless device communication manager 1715 may (e.g., in cooperation with the receiver 1710 and/or the transmitter 1720) establish a connection with an AN 405 of a LAN 440, determine to perform an authentication, receive an indication of a protocol end point for the authentication as being a NAS layer or an RRC layer, and perform the authentication with the protocol end point, via the connection established with the AN 405, based on the received indication.

In examples where the wireless device communication manager 1715 supports modified techniques for handover of a connection with a LAN 440 from a source AN 405 to a target AN 405 as described herein, the wireless device communication manager 1715 may (e.g., in cooperation with the receiver 1710 and/or the transmitter 1720) securely communicate with a LAN 440, via a first connection with a source AN 405 of the LAN 440, based on a first security key, perform a handover from the source AN 405 of the LAN 440 to a target AN 405 of the LAN 440, derive a second security key based on the first security key, securely communicate with the LAN 440, via a second connection with the target AN 405 of the LAN 440, based on the second security key and a restriction policy for the second security key, perform an authentication procedure, via the second connection, with an authentication node associated with the target AN 405 of the LAN 440 to obtain a third security key, the third security key not subject to the restriction policy, and securely communicate with the LAN 440, via the second connection with the target AN 405 of the LAN 440, based on the third security key.

In examples where the wireless device communication manager 1715 supports modified techniques for fast transition of a connection with a LAN 440 from a source AN 405 to a target AN 405, the wireless device communication manager 1715 may (e.g., in cooperation with the receiver 1710 and/or the transmitter 1720) transmit to a source AN 405 of a LAN 440, over a first connection, a set of FT parameters pertaining to authentication for caching at the source AN 405 for handover, receive from the source AN 405, over the first connection, a configuration for determining an AN 405 for handover, receive from the source AN 405, over the first connection, a command to perform a handover to a target AN 405 of the LAN 440, the command including a set of security parameters associated with secure communication between the wireless device 115 and the target AN 405, the set of security parameters based on the set of FT parameters, and securely communicate with the LAN 440, via a second connection with the target AN 405, based on the set of security parameters.

Figure 18:
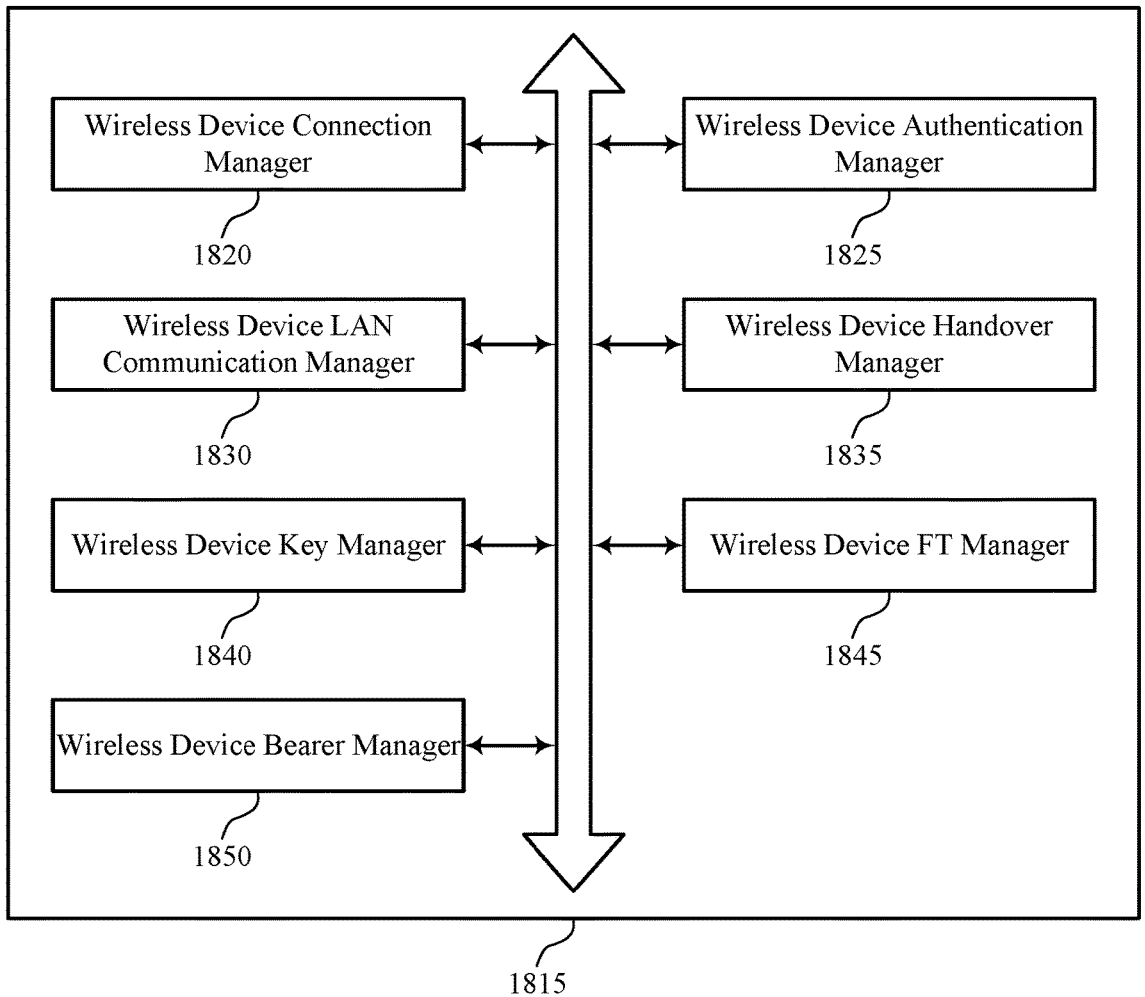
FIG. 18 shows a block diagram of a wireless device communication manager that supports modified techniques for establishing secure connections between a wireless device and a LAN via an AN, in accordance with various aspects of the present disclosure.

FIG. 18 shows a block diagram 1800 of a wireless device communication manager 1815 that supports modified techniques for establishing secure connections between a wireless device 115 and a LAN 440 via an AN 405, in accordance with various aspects of the present disclosure. The wireless device communication manager 1815 may be an example of aspects of a wireless device communication manager 1715 or a wireless device communication manager 1915 described with reference to FIGS. 17 and 19. The wireless device communication manager 1815 may include wireless device connection manager 1820, wireless device authentication manager 1825, wireless device LAN communication manager 1830, wireless device handover manager 1835, wireless device key manager 1840, wireless device FT manager 1845, and wireless device bearer manager 1850. Each of these modules may communicate, directly or indirectly, with one another (e.g., via one or more buses). The wireless device communication manager 1815 may also be in communication with a transmitter and a receiver (not shown), which may be examples of aspects of the receiver 1710 and/or the transmitter 1720 described with reference to FIG. 17. The wireless device communication manager 1815 may operate in cooperation with the transmitter and/or receiver to support the various operations described herein.

The wireless device connection manager 1820 may establish a connection with an AN 405 of a LAN 440, as described herein. In some examples the wireless device connection manager 1820 may receive an identifier associated with an AN 405, retrieve the configuration of the AN 405 based on the received identifier, and establish a connection with the based on the received configuration information for the AN 405. In some examples, a connection established by the wireless device connection manager 1820 may be established using a cellular RAT. In some examples the wireless device connection manager 1820 may select at least one resource for performing a random access procedure, and perform the random access procedure with the AN 405 using the at least one selected resource, where the at least one selected resource for performing the random access procedure includes an indication that an authentication is to be performed with an authenticator.

The wireless device authentication manager 1825 may manage aspects of authentications performed between a wireless device 115 and a LAN 440, as described herein. For example, the wireless device authentication manager 1825 may determine to perform an authentication, receive an indication of a protocol end point for the authentication as being a NAS layer or a RRC layer, and perform the authentication with the protocol end point, via a connection established with an AN 405, based on the received indication. In some cases, determining to perform an authentication may include selecting an authenticator that is co-located with the AN 405, or an authenticator that is hosted at a node of the LAN 440 located apart from the AN 405 the second authenticator, or both to perform the authentication. In some cases, the wireless device authentication manager 1825 may determine to perform an authentication based on a configuration of the AN 405 stored at the wireless device 115.

In some examples, the wireless device authentication manager 1825 may receive an indication that the AN 405 performs authentications using an authenticator, and determining to perform the authentication may be based on receiving the indication that the AN 405 performs authentications using the authenticator. In some cases, the indication that the AN 405 performs authentications using the authenticator is received in at least one of: system information, a response to a query of the wireless device 115, a RACH establishment message, or a combination thereof. In some examples the wireless device authentication manager 1825 may transmit, to an AN 405, an indication that the authentication is to be performed with the authenticator. In some cases, the transmitted indication that the authentication is to be performed with the authenticator is transmitted in a RRC connection establishment message.

In various examples, the authentication may be performed over the RRC layer, and/or the NAS layer. In some cases, the authentication is performed over the RRC layer or Ethernet (e.g., encapsulate authentication message in an Ethernet packet for transmission over the NAS layer from a wireless device to an authenticator via the AN and via a LAN). In some cases, the authentication may be performed with an authentication node, such as a wireless LAN controller and the authentication procedure may be based on: a supplicant key holder ID, an authenticator key holder ID, a PMK ID, a PMK name, or a combination thereof. In some cases, an authentication node includes an authentication server, and the authentication procedure may be based on EAP. In some cases, the protocol end point for the authentication includes an authenticator, and performing the authentication includes the wireless device authentication manager 1825 exchanging authentication information with the authenticator over a radio bearer associated with a connection established with an AN 405. In some cases, the authentication may be based on an extensible authentication protocol (EAP) performed over a radio bearer associated with the connection established with an AN 405.

In some examples, the wireless device authentication manager 1825 may receive an indication that an AN 405 performs authentications using a second authenticator, where the second authenticator is contained in a CN associated with the AN 405 (e.g., a CN 130 of a LAN 440 including the AN 405, a CN 130 of a separate cellular operator network, etc.). In such examples the wireless device authentication manager 1825 may determine to perform a second authentication with the second authenticator, via the AN 405. In some cases, the second authentication is performed over the NAS layer.

In some examples, the wireless device authentication manager 1825 may support modified techniques for handover of a connection with a LAN 440 from a source AN 405 to a target AN 405. For example, the wireless device authentication manager 1825 may perform an authentication procedure, via a connection established with a target AN 405 of a LAN 440. The authentication procedure may be performed via communications that are based at least in part on a temporary security key (e.g., a key that is subject to a restriction policy). An authentication via a target AN 405 may be performed with an authentication node associated with the target AN 405, and the authentication with the authentication node may provide a security key that is not subject to a security key restriction policy.

The wireless device LAN communication manager 1830 may manage operations performed by a wireless device 115 in support of secure communications with a LAN 440, as described herein. For example, the wireless device LAN communication manager 1830 may support securely communicating with a LAN 440, via a connection with an AN 405 of the LAN 440, based on a security key. In some examples the wireless device LAN communication manager 1830 may securely communicate with the LAN 440, over the connection via a radio bearer associated with a connection established with an AN 405, based on a generated security key.

In some examples, secure communications performed by the wireless device LAN communication manager 1830 may be based on different security keys, and communications based on the different security keys may occur at different times. In some examples the wireless device LAN communications manager 1830 may switch from securely communicating with the LAN 440 based on a first security key to securely communicating with the LAN 440 based on a second security key, and the switching may be based on: a configuration message received from the target AN 405, an availability of the second security key, or a combination thereof, In some examples, the wireless device LAN communication manager 1830 may securely communicate with a LAN 440 based on a security key and a restriction policy for the security key. In some cases, the restriction policy for a security key includes at least one of: a time interval for which the security key is valid for securely communicating with the LAN 440 via the second connection, a number of packets for which the security key is valid for securely communicating with the LAN 440 via the second connection, a set of one or more radio bearers for which the security key is valid for securely communicating with the LAN 440 via the second connection, a radio bearer type for which the security key is valid for securely communicating with the LAN 440 via the second connection, or a combination thereof. The wireless device LAN communication manager 1830 may receive the restriction policy for a security key in at least one of: configuration information received from the LAN 440, a handover command message received from the source AN 405 of the LAN 440, configuration information received from the target AN 405, or a combination thereof.

The wireless device handover manager 1835 may manage operations performed by a wireless device 115 in support of handover from a source AN 405 to a target AN 405, as described herein. For example, the wireless device handover manager 1835 may receive, from a source AN 405 of a LAN 440, a configuration for determining an AN 405 for handover. The configuration may be associated with a measurement configuration with the wireless device 115, and the wireless device handover manager 1835 may subsequently measure at least one signal received from target ANs 405 of the LAN 440.

The wireless device handover manager 1835 may subsequently transmit, to the source AN 405, a measurement report including information pertaining to the target AN 405, the information pertaining to the target AN 405 based on the configuration, and then receive, from the source AN 405, a command to perform a handover to a target AN 405 of the LAN 440. The command to perform the handover may include configuration information for the target AN 405, and/or a set of security parameters associated with secure communication between the wireless device 115 and the target AN 405, based on a set of FT parameters provided by the wireless device 115. In some cases, the set of security parameters includes at least one of: information pertaining to a key-holder identifier (ID), a cipher suite selection parameter, a time interval for which a security key is valid, a random parameter, a random parameter identifier, a proof of knowledge of a security key, or a combination thereof. The wireless device handover manager 1835 may receive a handover command (e.g., based on the measuring of signals from target ANs 405), and perform a handover from the source AN 405 of the LAN 440 to a target AN 405 of the LAN 440.

The wireless device key manager 1840 may perform operations associated with key generation and management at a wireless device 115, as described herein. For example the wireless device key manager 1840 may generate security keys based on exchanged authentication information and/or random parameters, as described herein. In some examples the wireless device key manager 1840 may derive a security key (e.g., a temporary security, subject to a usage policy) based on another security key. In some examples the wireless device key manager 1840 may transmit, to a target AN 405, a proof of knowledge of a security key based on a set of FT parameters, a set of security parameters, or a combination thereof.

The wireless device FT manager 1845 may manage operations performed by a wireless device 115 that are associated with fast transitions from a source AN 405 to a target AN 405, as described herein. For example, the wireless device FT manager 1845 may transmit to a source AN 405 of a LAN 440, over a first connection, a set of FT parameters pertaining to authentication for caching at the source AN 405 for handover. In some examples the wireless device FT manager 1845 may receive, from a source AN 405, an indication of support for network-based FT, may transmit the set of FT parameters to the source AN 405 based on receiving the indication of support for network-based FT. In some cases, the set of FT parameters includes at least one of: information pertaining to a supplicant key holder ID, information pertaining to a first authenticator key holder ID, information pertaining to a security key, a set of fast basic service set (BSS) transition parameters, or a combination thereof.

The wireless device bearer manager 1850 may manage operations at a wireless device 115 that are associated with radio bearers (e.g., as associated with a connection established with an AN 405), as described herein. For example, the wireless device bearer manager 1850 may establish one or more radio bearers based on a security key. In some cases, an authentication may performed over a radio bearer associated with a connection established with an AN 405. In some cases, one or more radio bearers managed by the wireless device bearer manager 1850 may include at least one of a signaling radio bearer, a data radio bearer, or a combination thereof.

Figure 19:
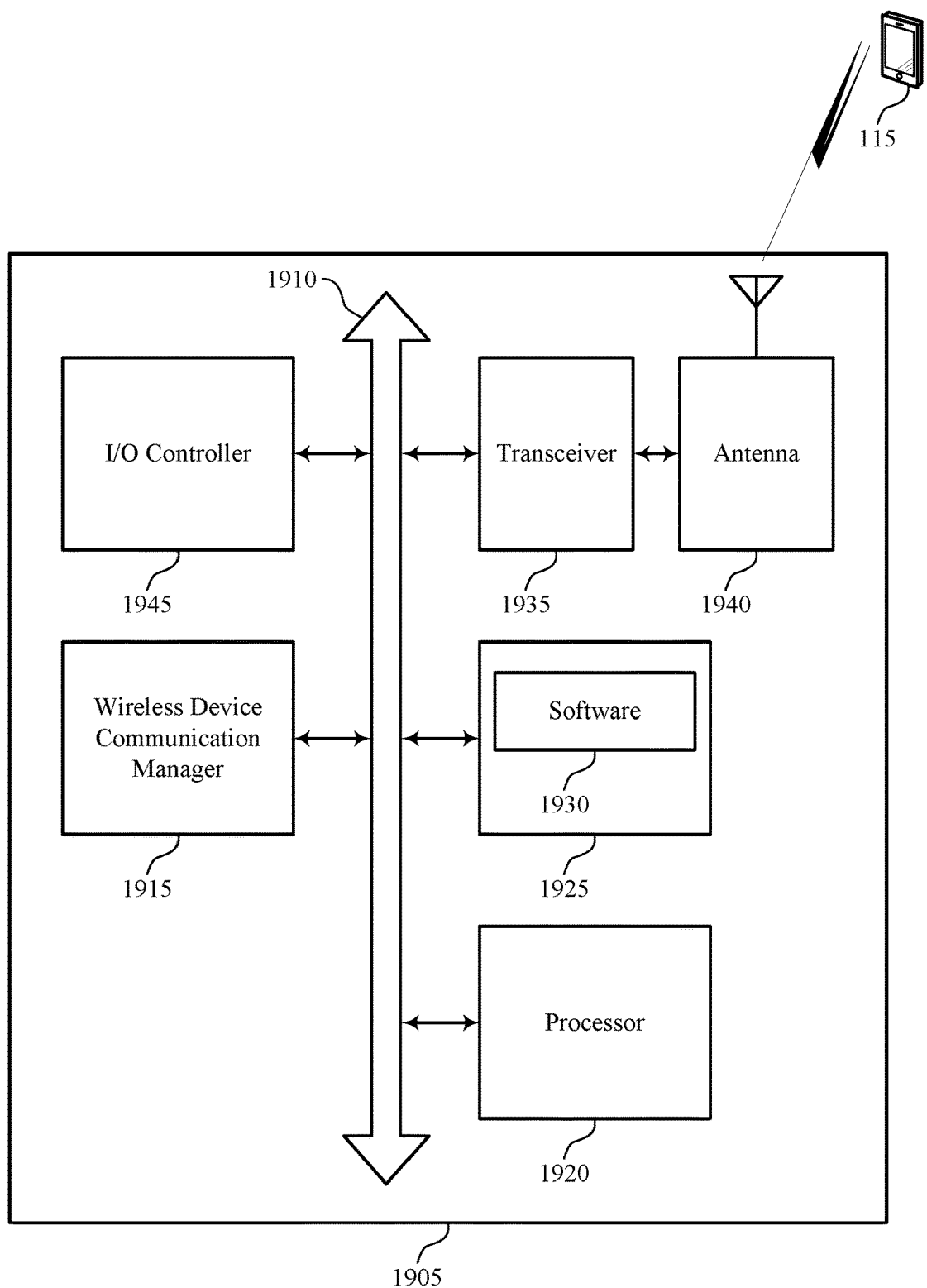
FIG. 19 shows a diagram of a system including a device that supports modified techniques for establishing secure connections between a wireless device and a LAN via an AN, in accordance with various aspects of the present disclosure.

FIG. 19 shows a diagram of a system 1900 including a device 1905 that supports modified techniques for establishing secure connections between a wireless device 115 and a LAN 440 via an AN 405, in accordance with various aspects of the present disclosure. Device 1905 may be an example of or include the components of a wireless device 115 or a device 1705 as described with reference to FIGS. 1, 2, 4, 6, 8, and 9 through 18. Device 1905 may include components for bi-directional voice and data communications including components for transmitting and receiving communications, including wireless device communication manager 1915, processor 1920, memory 1925, software 1930, transceiver 1935, antenna 1940, and I/O controller 1945. These components may be in electronic communication via one or more busses (e.g., bus 1910).

Processor 1920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks that support modified techniques for establishing secure connections between a wireless device 115 and a LAN 440 via an AN 405).

Memory 1925 may include random access memory (RAM) and read only memory (ROM). The memory 1925 may store computer-readable, computer-executable software 1930 including instructions that, when executed (e.g., by the processor 1920), cause the device 1905 to perform various functions described herein. In some cases, the memory 1925 may contain, among other things, a basic input/output system (BIOS) which may control basic hardware and/or software operation such as the interaction with peripheral components or devices.

Software 1930 may include code to implement aspects of the present disclosure, including code to support modified techniques for establishing secure connections between a wireless device 115 and a LAN 440 via an AN 405. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas. In some cases, the device 1905 may include a single antenna 1940. However, in some cases the device 1905 may have more than one antenna 1940, which may be capable of concurrently transmitting or receiving multiple wireless transmissions.

I/O controller 1945 may manage input and output signals for the device 1905. I/O controller 1945 may also manage peripherals not integrated into device 1905. In some cases, I/O controller 1945 may represent a physical connection or port to an external peripheral. In some cases, I/O controller 1945 may utilize an operating system such as iOS®, ANDROID®, MS-DOS®, MS-WINDOWS®, OS/2®, UNIX®, LINUX®, or another known operating system. In other cases, I/O controller 1945 may represent or interact with a modem, a keyboard, a mouse, a touchscreen, or a similar device. In some cases, I/O controller 1945 may be implemented as part of a processor. In some cases, a user may interact with the device 1905 via I/O controller 1945 or via hardware components controlled by I/O controller 1945.

Wireless device communication manager 1915 may be an example of aspects of wireless device communication managers 1715 and 1815 described with reference to FIGS. 17 and 18. The wireless device communication manager 1915 may perform various operations relating to the establishment of secure connections with a LAN 440 via an AN 405 as described herein, and/or may manage aspects of such operations that are performed at least in part by other portions of the device 1905. For example, the wireless device communication manager 1915 may perform communication operations in cooperation with the transceiver 1935 and antenna 1940, and/or the I/O controller 1945. In some examples the wireless device communication manager 1915 may be embodied in a stand-alone processor, and may perform operations in coordination with the processor 1920. In some examples the wireless device communication manager 1915 may be embodied in software/firmware code (e.g., as stored in memory 1925 or elsewhere on the wireless device 1905), and executed by the processor 1920.

Figure 20:
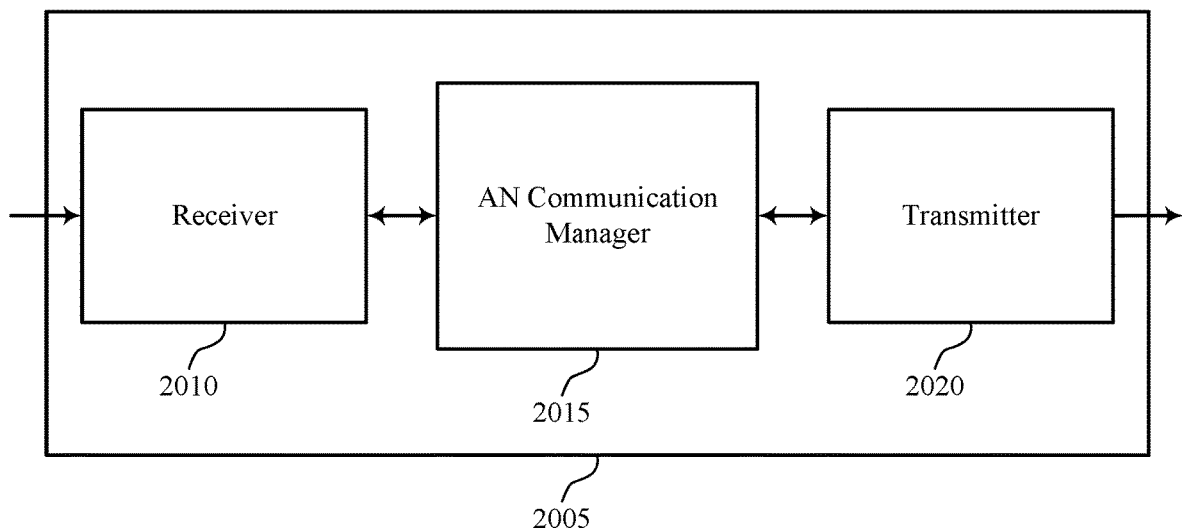
FIG. 20 shows a block diagram of a device that supports modified techniques for establishing secure connections between a wireless device and a LAN via an AN, in accordance with various aspects of the present disclosure.

FIG. 20 shows a block diagram 2000 of a device 2005 that supports modified techniques for establishing secure connections between a wireless device 115 and a LAN 440 via an AN 405, in accordance with various aspects of the present disclosure. Device 2005 may be an example of aspects of an AN 405 as described with reference to FIG. 1. Device 2005 may include receiver 2010, AN communication manager 2015, and transmitter 2020. Device 2005 may also include a processor. Each of these components may be in communication with one another (e.g., via one or more buses).

Receiver 2010 may receive information such as packets, user data, or control information associated with various information channels (e.g., control channels, data channels, and information related to modified techniques for establishing secure connections between a wireless device 115 and a LAN 440 via an AN 405, etc.). Received information may be passed on to other components of the device 2005. The receiver 2010 may be an example of aspects of the transceiver 2335 described with reference to FIG. 23. The receiver 2010 may include or be associated with a single antenna or a plurality of antennas.

Transmitter 2020 may transmit signals generated by other components of the device 2005. In some examples, the transmitter 2020 may be collocated with a receiver 2010 in a transceiver module. For example, the transmitter 2020 may be an example of aspects of the transceiver 2335 described with reference to FIG. 23. The transmitter 2020 may include a single antenna, or it may include a set of antennas.

AN communication manager 2015 and/or at least some of its various sub-components may be implemented in hardware, software executed by a processor, firmware, or any combination thereof. If implemented in software executed by a processor, the functions of the AN communication manager 2015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The AN communication manager 2015 and/or at least some of its various sub-components may be physically located at various positions, including being distributed such that portions of functions are implemented at different physical locations by one or more physical devices. In some examples, AN communication manager 2015 and/or at least some of its various sub-components may be a separate and distinct component in accordance with various aspects of the present disclosure. In other examples, AN communication manager 2015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. AN communication manager 2015 may also be an example of aspects of the AN communication manager 2215 described with reference to FIG. 22.

In examples where the AN communication manager 2015 supports modified techniques for establishing a secure connection with a LAN 440 via an AN 405 as described herein, the AN communication manager 2015 may establish a connection with a wireless device 115, determine that the wireless device 115 has determined to perform an authentication, transmit an indication of a protocol end point for the authentication as being a non-access stratum (NAS) layer or a RRC layer, and provide communications for the authentication between the wireless device 115 and the protocol end point.

In examples where the AN communication manager 2015 supports modified techniques for handover of a connection with a LAN 440 from a source AN 405 to a target AN 405 as described herein, an AN communication manager 2015 at a target AN 405 may establish a connection with a wireless device 115, receive a first security key from a first network node of the LAN 440 (e.g., a source AN 405), the first security key associated with a restriction policy for the first security key, relay authentication information associated with an authentication procedure performed between the wireless device 115 and a second network node of the LAN 440 (e.g., an authentication node such as an authentication server 410), receive a second security key from the second network node of the LAN 440 based on the relayed authentication information, transmit secure communications between the wireless device 115 and the LAN 440, via the connection, based on the first security key, where use of the first security key is determined by the restriction policy for the first security key, and transmit secure communications between the wireless device 115 and the LAN 440, via the connection, based on the second security key, where use of the second security key is not subject to the restriction policy.

In examples where the AN communication manager 2015 supports modified techniques for fast transition of a connection with a LAN 440 from a source AN 405 to a target AN 405, an AN communication manager 2015 at a source AN 405 may receive from a wireless device 115, over a first connection, a set of FT parameters pertaining to authentication, cache the set of FT parameters for forwarding during handover, transmit the set of FT parameters to a target AN 405 of the LAN 440 during handover, receive, from the target AN 405, a set of security parameters associated with secure communication between the wireless device 115 and the target AN 405, the set of security parameters based on the set of FT parameters, and transmit to the wireless device 115, over the first connection, a command to perform a handover to the target AN 405, the command including the set of security parameters.

Figure 21:
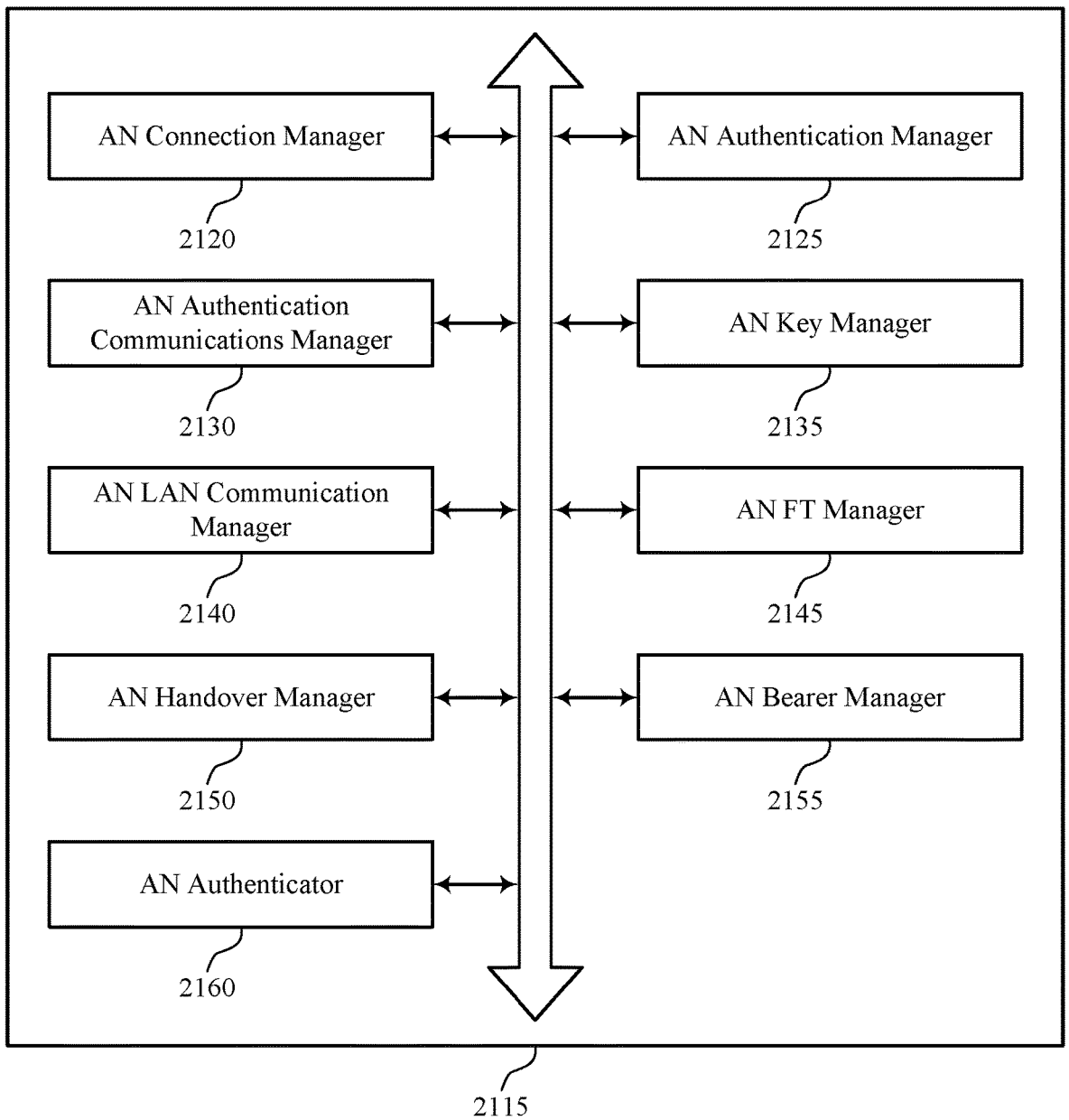
FIG. 21 shows a block diagram of an AN communication manager that supports modified techniques for establishing secure connections between a wireless device and a LAN via an AN, in accordance with various aspects of the present disclosure.

FIG. 21 shows a block diagram 2100 of an AN communication manager 2115 that supports modified techniques for establishing secure connections between a wireless device 115 and a LAN 440 via an AN 405, in accordance with various aspects of the present disclosure. The AN communication manager 2115 may be an example of aspects of an AN communication manager 2015 or an AN communication manager 2315 described with reference to FIGS. 20 and 23. The AN communication manager 2115 may include AN connection manager 2120, AN authentication manager 2125, AN authentication communications manager 2130, AN key manager 2135, AN LAN communication manager 2140, AN FT manager 2145, AN handover manager 2150, AN bearer manager 2155, and AN authenticator 2160. Each of these modules may communicate, directly or indirectly, with one another (e.g., via one or more buses). The AN communication manager 2115 may also be in communication with a transmitter and a receiver (not shown), which may be examples of aspects of the receiver 2010 and/or the transmitter 2020 described with reference to FIG. 20. The AN communication manager 2115 may operate in cooperation with the transmitter and/or receiver to support the various operations described herein.

The AN connection manager 2120 may establish connections with a wireless device 115. In some cases, a connection may be established using a cellular RAT, or based at least in part on a cellular RAT.

The AN authentication manager 2125 may manage authentication operations as performed by an AN 405. For example, the AN authentication manager 2125 may transmit an indication that the AN 405 performs authentications using the authenticator. In some cases, the indication that the AN 405 performs authentications using the authenticator is transmitted in at least one of: system information, a response to a query of the wireless device 115, a RACH establishment message, or a combination thereof. In some cases, the set of security parameters is based on the at least one random parameter.

In response to a transmitted indication of an authentication end point being an authenticator, the AN authentication manager 2125 may receive, from a wireless device 115, an indication that the authentication with the wireless device 115 is to be performed with the authenticator. In some cases, the indication that the authentication is to be performed with the authenticator is received in a RRC connection establishment message. In some cases, the indication that the authentication is to be performed with the authenticator is received in a random access message from the wireless device 115 on at least one resource.

In some examples the AN authentication manager 2125 may determine that a wireless device 115 has determined to perform an authentication, and transmit an indication of a protocol end point for the authentication as being a NAS layer or a RRC layer. The AN authentication manager 2125 may also transmit an indication that the AN 405 performs authentications using an authenticator contained in a CN associated with the AN 405 (e.g., a CN 130 of a LAN 440 including the AN 405, a CN 130 of a separate cellular operator network, etc.). In some examples the AN authentication manager 2125 may determine that the wireless device 115 has determined to perform a subsequent authentication with another authenticator, where the other authenticator is contained in a CN in communication with the AN 405.

In some examples the AN authentication manager 2125 may exchange at least one random parameter over a connection established between an AN 405 and a wireless device 115, transmit the at least one random parameter to a target AN 405. The AN authentication manager 2125 may also transmit a restriction policy associated with a security key to at least one of: a target AN 405, a wireless device 115, or a combination thereof.

In some cases, an authentication node for performing authentications includes a wireless LAN controller and the authentication procedure is based on: a supplicant key holder ID, an authenticator key holder ID, a PMK ID, a PMK name, or a combination thereof. In some cases, an authentication node for performing authentications includes an authentication server and the authentication procedure is based on an EAP.

The AN authentication communications manager 2130 may manage communication operations of an AN 405 as pertaining to authentication communications. For example, the AN authentication communications manager 2130 may provide communications for an authentication between a wireless device 115 and a protocol end point indicated for the authentication. In some cases, providing communications for the authentication includes transmitting messages pertaining to an authentication procedure over a connection established with the wireless device 115, and the authentication procedure may be based on an EAP. The AN authentication communications manager 2130 may also transmit messages associated with a second authentication, and relay authentication information associated with an authentication procedure performed between a wireless device 115 and another network node of the LAN 440. In various examples, authentication procedures may be performed over an RRC layer, a NAS layer, or Ethernet.

In some cases, an authentication procedure is performed on a first radio bearer associated with a connection, and providing communications for the authentication includes: transmitting messages associated with the authentication over a radio bearer associated with the connection established with the wireless device 115. For example, the AN authentication communications manager 2130 may exchange authentication information and/or random parameters with the wireless device 115 over the radio bearer. In some examples secure communications are transmitted on a second radio bearer associated with the connection, the second radio bearer associated with the connection being different from the first radio bearer associated with the connection. In some cases, the messages are transmitted over the RRC layer.

The AN key manager 2135 may perform operations associated with key generation and management at an AN 405, as described herein. For example, the AN key manager 2135 may generate a security key based on exchanged authentication information and/or random parameters. In some examples the AN key manager 2135 may receive a first security key from a first network node of the LAN 440 (e.g., a source AN 405), the first security key associated with a restriction policy for the first security key, and receive a second security key from the second network node of the LAN 440 (e.g., an authentication node such as an authentication server) based on the relayed authentication information. In some examples the AN key manager may derive a third security key based on the second security key, where the third security key is not subject to the restriction policy.

The AN LAN communication manager 2140 may establish connection with wireless devices 115, as described herein. For example, the AN LAN communication manager 2140 may transmit secure communications between a wireless device 115 and a LAN 440, via an established connection, based on a security key. In some examples, the AN LAN communication manager 2140 may securely communicate with a LAN 440, over a connection via a radio bearer associated with the connection.

In various examples, the use of a security key may or may not be determined by a restriction policy for the security key. In some cases, the restriction policy for a security key includes at least one of: a time interval for which the security key is valid for the wireless device 115 to securely communicate with the LAN 440 via the connection, a number of packets for which the security key is valid for the wireless device 115 to securely communicate with the LAN 440 via the connection, a set of one or more radio bearers for which the security key is valid for the wireless device 115 to securely communicate with the LAN 440 via the connection, a radio bearer type for which the security key is valid for the wireless device 115 to securely communicate with the LAN 440 via the connection, or a combination thereof. In some examples the AN LAN communication manager 2140 may switch from transmitting secure communications between a wireless device 115 and a LAN 440 based on a first security key, to transmitting secure communications between the wireless device 115 and the LAN 440 based on the second security key, with the switching based on a restriction policy for the first security key, an availability of the second security key, or a combination thereof.

The AN FT manager 2145 may manage operations performed by an AN 405 that are associated with fast transitions from a source AN 405 to a target AN 405, as described herein. For example, the AN FT manager 2145 may receive from a wireless device 115, over a connection established with the wireless device 115, a set of FT parameters pertaining to authentication, and cache the set of FT parameters for forwarding during handover. The AN FT manager 2145 may transmit the set of FT parameters to a target AN 405 of a LAN 440 during handover. In some examples the AN FT manager 2145 may transmit an indication of support for network-based FT to wireless devices 115. In some cases, the set of FT parameters includes at least one of: information pertaining to a supplicant key holder ID, information pertaining to a first authenticator key holder ID, information pertaining to a security key, a set of fast basic service set (BSS) transition parameters, or a combination thereof.

The AN handover manager 2150 may manage operations performed by an AN 405 in support of handover from a source AN 405 to a target AN 405, as described herein, For example, the AN handover manager 2150 may transmit to a wireless device 115, over a connection established with the wireless device 115, a configuration to determine an AN 405 for handover. In some examples the AN handover manager 2150 may receive from the wireless device 115, via the connection, a measurement report including information pertaining to the target AN 405, the information pertaining to the target AN 405 based on the configuration.

In some examples the AN handover manager 2150 may receive, from a target AN 405, a set of security parameters associated with secure communication between a wireless device 115 and the target AN 405, the set of security parameters based on the set of FT parameters, transmit to the wireless device 115, over the first connection, a command to perform a handover to the target AN 405, the command including the set of security parameters. In some cases, the set of security parameters includes at least one of: information pertaining to a key-holder ID, a cipher suite selection parameter, a time interval for which a security key is valid, a random parameter, a random parameter identifier, a proof of knowledge of a security key, or a combination thereof.

The AN bearer manager 2155 may manage operations at an AN 405 that are associated with radio bearers (e.g., as associated with a connection established with a wireless device 115), as described herein. In some examples the AN bearer manager 2155 may establish one or more radio bearers based on security keys. In some cases, one or more radio bearers managed by the AN bearer manager 2155 may include at least one of a signaling radio bearer, a data radio bearer, or a combination thereof.

In some examples, the AN authenticator 2160 may be an authenticator that is co-located with an AN 405, and the AN authenticator may perform authentication operations at the AN 405, as described herein.

Figure 22:
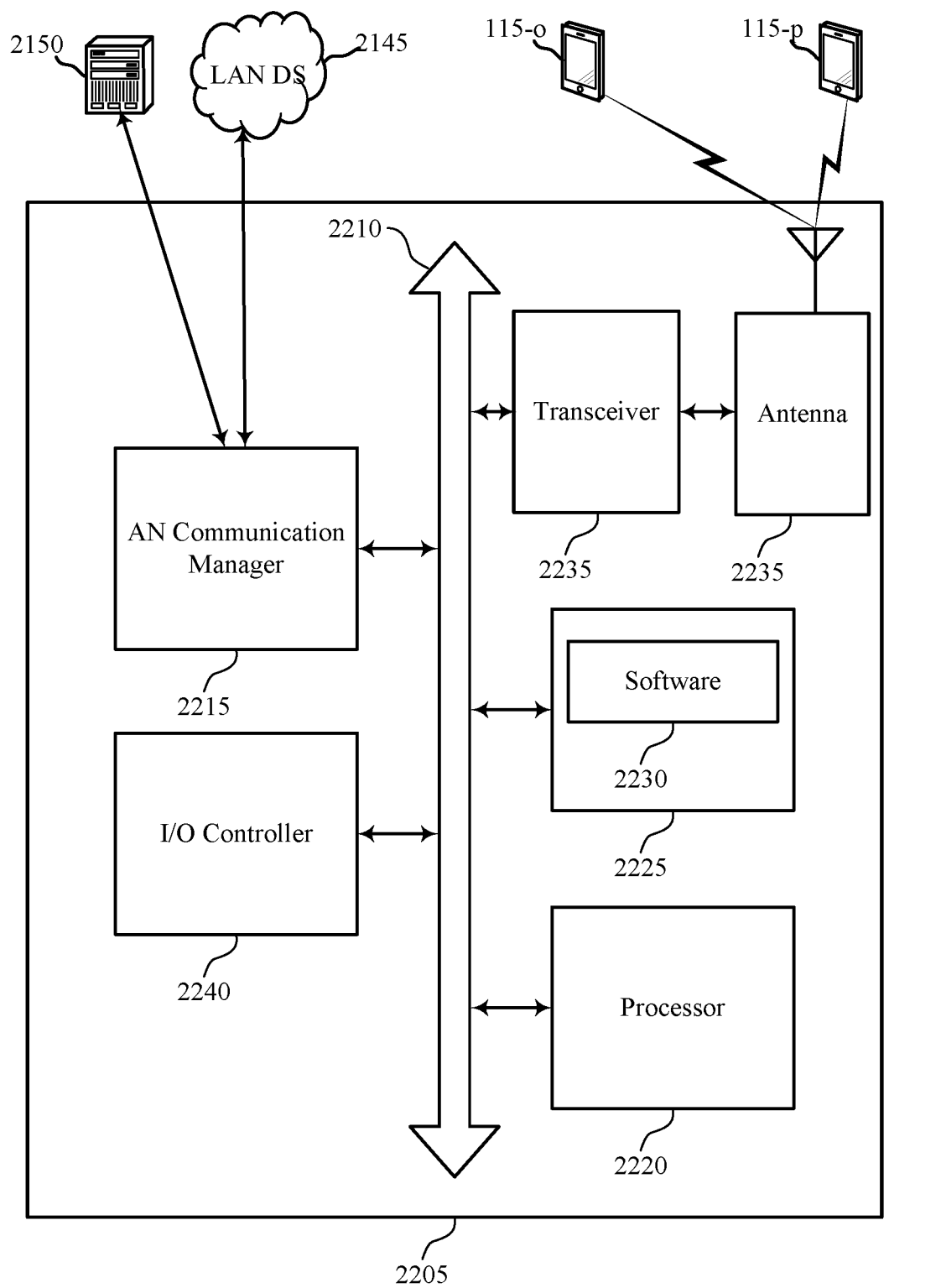
FIG. 22 shows a diagram of a system including a device that supports modified techniques for establishing secure connections between a wireless device and a LAN via an AN, in accordance with various aspects of the present disclosure.

FIG. 22 shows a diagram of a system 2200 including a device 2205 that supports modified techniques for establishing secure connections between a wireless device 115 and a LAN 440 via an AN 405, in accordance with various aspects of the present disclosure. Device 2205 may be an example of or include the components of AN 405 of a device 2005 as described with reference to FIGS. 4, 6, 8, 9 through 16, and 20. Device 2205 may include components for bi-directional voice and data communications including components for transmitting and receiving communications, including AN communication manager 2215, processor 2220, memory 2225, software 2230, transceiver 2235, and I/O controller 2240. These components may be in electronic communication via one or more busses (e.g., bus 2210).

Processor 2220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2220 may be configured to operate a memory array using a memory controller. In other cases, a memory controller may be integrated into processor 2220. Processor 2220 may be configured to execute computer-readable instructions stored in a memory to perform various functions (e.g., functions or tasks that support modified techniques for establishing secure connections between a wireless device 115 and a LAN 440 via an AN 405).

Memory 2225 may include RAM and ROM. The memory 2225 may store computer-readable, computer-executable software 2230 including instructions that, when executed (e.g., by the processor 2220), cause the device 2205 to perform various functions described herein. In some cases, the memory 2225 may contain, among other things, a BIOS which may control basic hardware and/or software operation such as the interaction with peripheral components or devices.

Software 2230 may include code to implement aspects of the present disclosure, including code to support modified techniques for establishing secure connections between a wireless device 115 and a LAN 440 via an AN 405. Software 2230 may be stored in a non-transitory computer-readable medium such as system memory or other memory. In some cases, the software 2230 may not be directly executable by the processor but may cause a computer (e.g., when compiled and executed) to perform functions described herein.

Transceiver 2235 may communicate bi-directionally, via one or more antennas, wired, or wireless links as described above. For example, the transceiver 2235 may represent a wireless transceiver and may communicate bi-directionally with another wireless transceiver. The transceiver 2235 may also include a modem to modulate the packets and provide the modulated packets to the antennas for transmission, and to demodulate packets received from the antennas. In some cases, the device 2205 may include a single antenna 2237. However, in some cases the device 2205 may have more than one antenna 2237, which may be capable of concurrently transmitting or receiving multiple wireless transmissions.

I/O controller 2240 may manage input and output signals for device 2205. I/O controller 2240 may also manage peripherals not integrated into device 2205. In some cases, I/O controller 2240 may represent a physical connection or port to an external peripheral. In some cases, I/O controller 2240 may utilize an operating system such as iOS®, ANDROID®, MS-DOS®, MS-WINDOWS®, OS/2®, UNIX®, LINUX®, or another known operating system. In other cases, I/O controller 2240 may represent or interact with a modem, a keyboard, a mouse, a touchscreen, or a similar device. In some cases, I/O controller 2240 may be implemented as part of a processor. In some cases, a user may interact with device 2205 via I/O controller 2240 or via hardware components controlled by I/O controller 2240.

AN communication manager 2215 may be an example of aspects of AN device communication managers 2015 and 2115 described with reference to FIGS. 20 and 21. The AN communication manager 2215 may perform various operations relating to the establishment of secure connections with a wireless device 115 to access a LAN 440 as described herein, and/or may manage aspects of such operations that are performed at least in part by other portions of the device 2205. For example, the AN communication manager 2215 may perform communication operations in cooperation with the transceiver 2235 and antenna 2237, and/or the I/O controller 2245. In some examples the AN communication manager 2215 may be embodied in a stand-alone processor, and may perform operations in coordination with the processor 2220. In some examples the AN communication manager 2215 may be embodied in software/firmware code (e.g., as stored in memory 2225 or elsewhere on the device 2205), and executed by the processor 2220.

Figure 23:
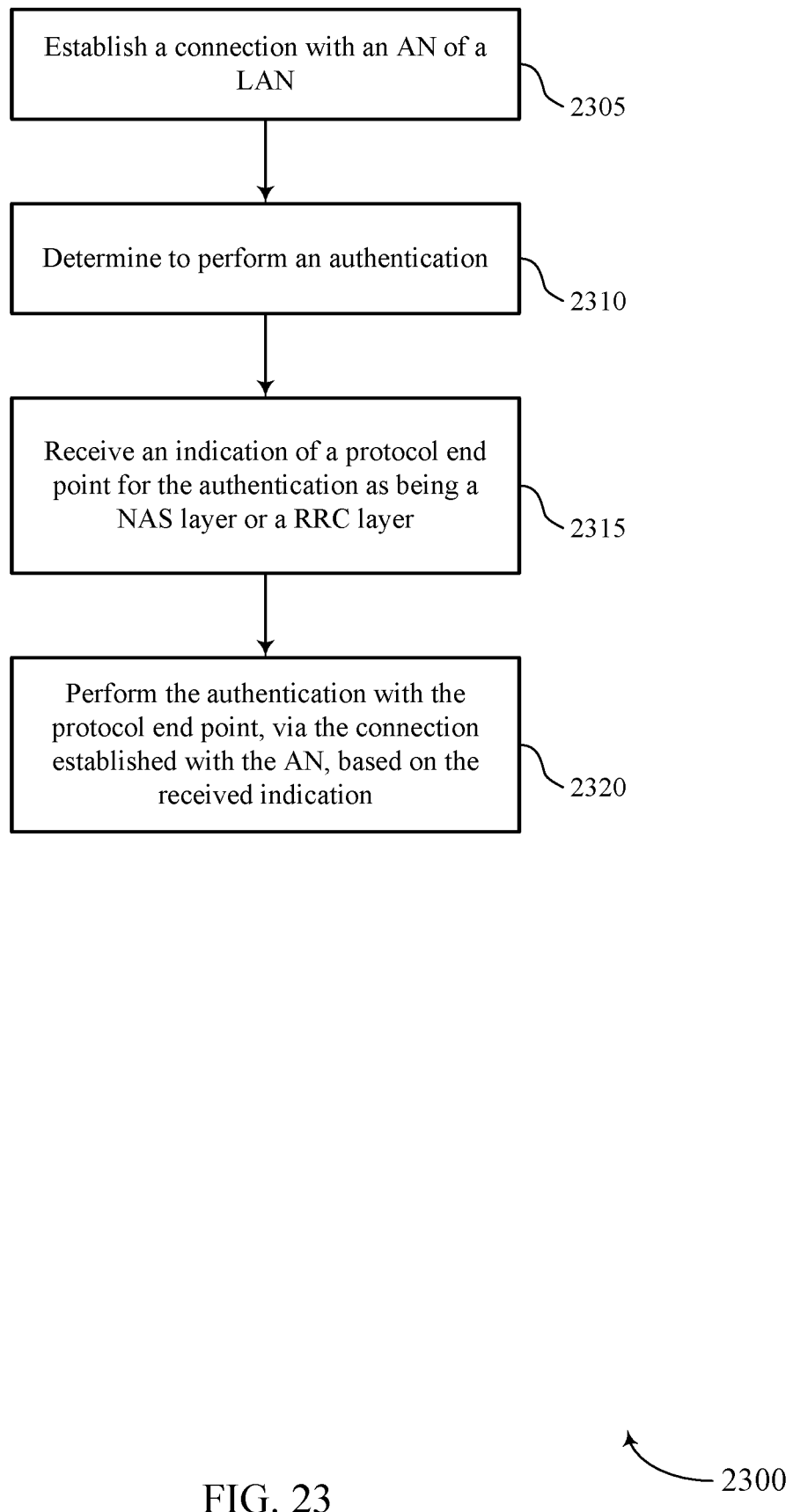
FIGS. 23 through 26 show flowcharts illustrating methods that support establishing a secure connection between a wireless device and a LAN via an AN, in accordance with various aspects of the present disclosure.

FIG. 23 shows a flowchart illustrating a method 2300 that supports establishing a secure connection between a wireless device 115 and a LAN 440 via an AN 405, in accordance with various aspects of the present disclosure. The operations of method 2300 may be implemented by a wireless device 115 or its components as described herein. For example, operations of method 2300 may be performed by a wireless device communication manager 1715, 1815, or 1915 (e.g., in cooperation with a transmitter and/or a receiver), as described with reference to FIGS. 17 through 19. In some examples, a wireless device 115 may execute a set of codes to control the functional elements of the device to perform the functions described below. Additionally or alternatively, a wireless device 115 may perform aspects of the functions described below using special-purpose hardware.

At block 2305 the wireless device 115 may establish a connection with an AN 405 of a LAN 440. The operations of block 2305 may be performed according to the methods described with reference to FIGS. 1 through 16. In certain examples, aspects of the operations of block 2305 may be performed by a wireless device connection manager 1820 as described with reference to FIG. 18.

At block 2310 the wireless device 115 may determine to perform an authentication. The operations of block 2310 may be performed according to the methods described with reference to FIGS. 1 through 16. In certain examples, aspects of the operations of block 2305 may be performed by a wireless device authentication manager 1825 as described with reference to FIG. 18.

At block 2315 the wireless device 115 may receive an indication of a protocol end point for the authentication as being a NAS layer or an RRC layer. The operations of block 2315 may be performed according to the methods described with reference to FIGS. 1 through 16. In certain examples, aspects of the operations of block 2315 may be performed by a wireless device authentication manager 1825 as described with reference to FIG. 18.

At block 2320 the wireless device 115 may perform the authentication with the protocol end point, via the connection established with the AN 405, based at least in part on the received indication. The operations of block 2320 may be performed according to the methods described with reference to FIGS. 1 through 16. In certain examples, aspects of the operations of block 2320 may be performed by a wireless device authentication manager 1825 as described with reference to FIG. 18.

Figure 24:
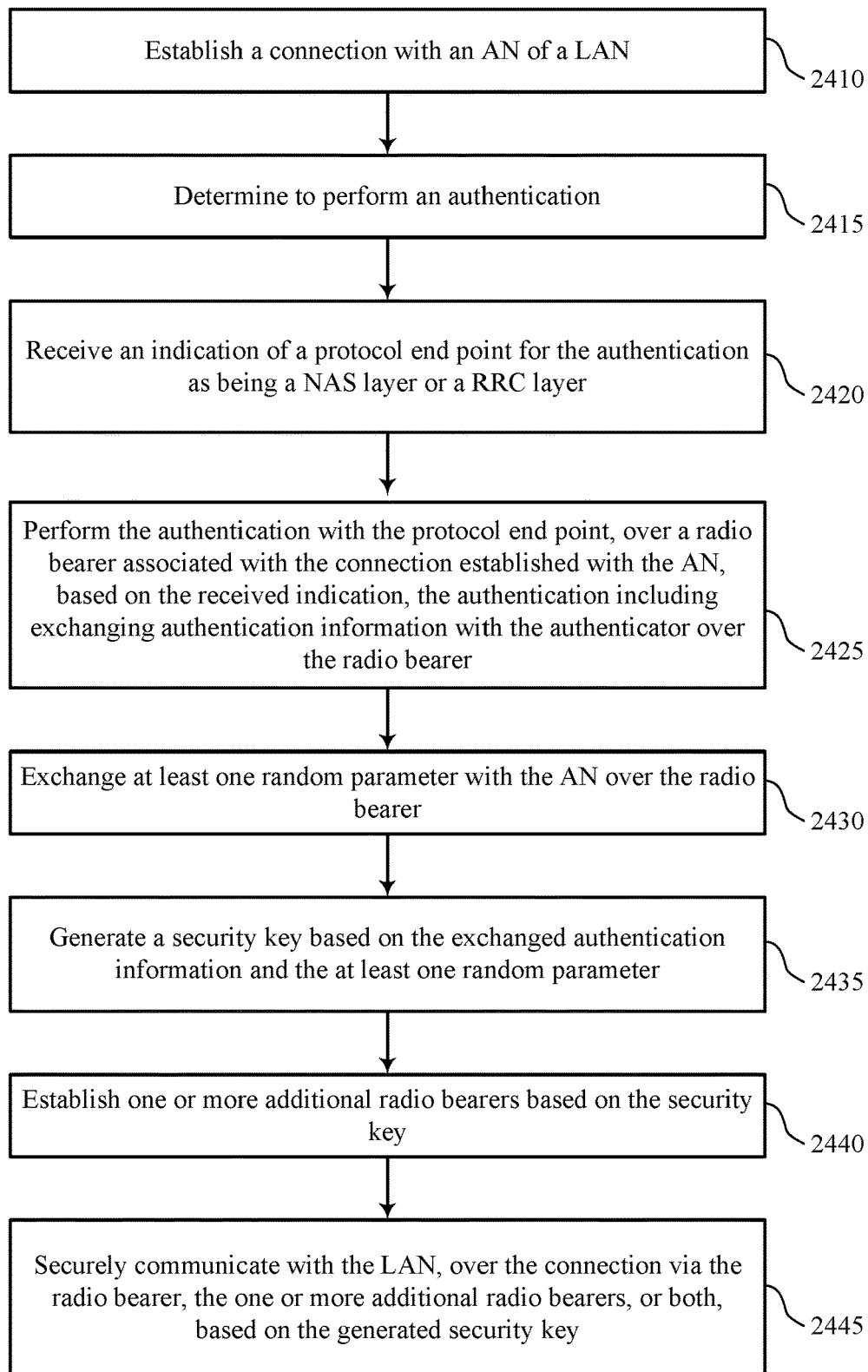

FIG. 24 shows a flowchart illustrating a method 2400 that supports establishing a secure connection between a wireless device 115 and a LAN 440 via an AN 405, in accordance with various aspects of the present disclosure. The operations of method 2400 may be implemented by a wireless device 115 or its components as described herein. For example, operations of method 2400 may be performed by a wireless device communication manager 1715, 1815, or 1915 (e.g., in cooperation with a transmitter and/or a receiver), as described with reference to FIGS. 17 through 19. In some examples, a wireless device 115 may execute a set of codes to control the functional elements of the device to perform the functions described below. Additionally or alternatively, a wireless device 115 may perform aspects of the functions described below using special-purpose hardware.

At block 2410 the wireless device 115 may establish a connection with an AN 405 of a LAN 440. The operations of block 2410 may be performed according to the methods described with reference to FIGS. 1 through 16. In certain examples, aspects of the operations of block 2410 may be performed by a wireless device connection manager 1820 as described with reference to FIG. 18.

At block 2415 the wireless device 115 may determine to perform an authentication. The operations of block 2415 may be performed according to the methods described with reference to FIGS. 1 through 16. In certain examples, aspects of the operations of block 2415 may be performed by a wireless device authentication manager 1825 as described with reference to FIG. 18.

At block 2420 the wireless device 115 may receive an indication of a protocol end point for the authentication as being a NAS layer or a RRC layer. The operations of block 2420 may be performed according to the methods described with reference to FIGS. 1 through 16. In certain examples, aspects of the operations of block 2420 may be performed by a wireless device authentication manager 1825 as described with reference to FIG. 18.

At block 2425 the wireless device 115 may perform the authentication with the protocol end point, via a radio bearer associated with the connection established with the AN 405, based at least in part on the received indication, with the authentication including exchanging authentication information with the authenticator over the radio bearer. The operations of block 2425 may be performed according to the methods described with reference to FIGS. 1 through 16. In certain examples, aspects of the operations of block 2425 may be performed by a wireless device authentication manager 1825 (e.g., in cooperation with a wireless device bearer manager 1850) as described with reference to FIG. 18.

At block 2430 the wireless device 115 may exchange at least one random parameter with the AN 405 over the radio bearer. The operations of block 2430 may be performed according to the methods described with reference to FIGS. 1 through 16. In certain examples, aspects of the operations of block 2430 may be performed by a wireless device authentication manager 1825 as described with reference to FIG. 18.

At block 2435 the wireless device 115 may generate a security key based at least in part on the exchanged authentication information and the at least one random parameter. The operations of block 2435 may be performed according to the methods described with reference to FIGS. 1 through 16. In certain examples, aspects of the operations of block 2435 may be performed by a wireless device key manager 1840 as described with reference to FIG. 18.

At block 2440 the wireless device 115 may establish one or more additional radio bearers based at least in part on the security key. The operations of block 2440 may be performed according to the methods described with reference to FIGS. 1 through 16. In certain examples, aspects of the operations of block 2440 may be performed by a wireless device bearer manager 1850 as described with reference to FIG. 18.

At block 2445 the wireless device 115 may securely communicate with the LAN 440, over the connection via the radio bearer, the one or more additional radio bearers, or both, based at least in part on the generated security key. The operations of block 2445 may be performed according to the methods described with reference to FIGS. 1 through 16. In certain examples, aspects of the operations of block 2445 may be performed by a wireless device LAN communication manager 1830 (e.g., in cooperation with a wireless device bearer manager 1850) as described with reference to FIG. 18.

Figure 25:
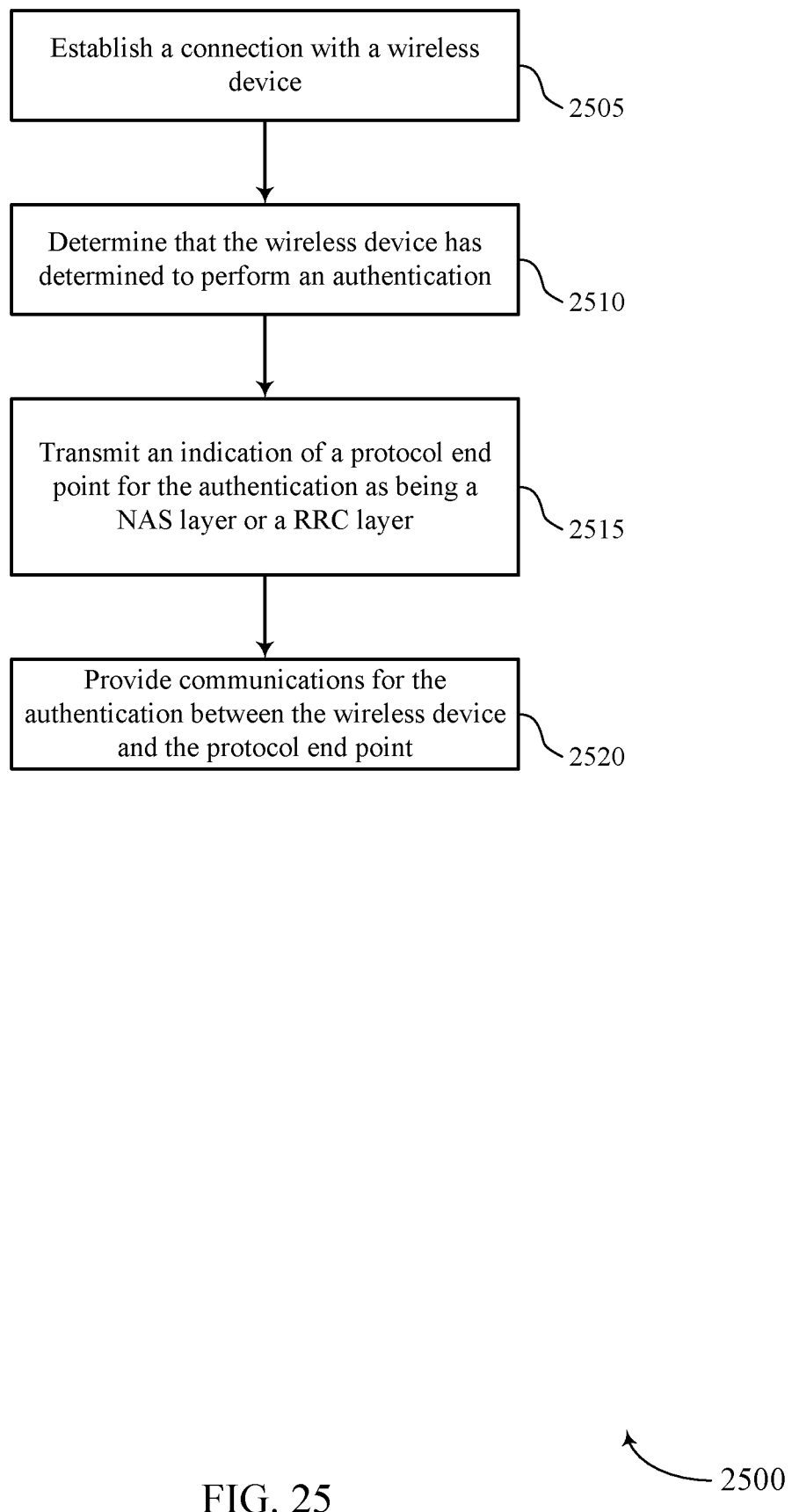

FIG. 25 shows a flowchart illustrating a method 2500 that supports establishing a secure connection between a wireless device 115 and a LAN 440 via an AN 405, in accordance with various aspects of the present disclosure. The operations of method 2500 may be implemented by an AN 405 or its components as described herein. For example, operations of method 2500 may be performed by an AN communication manager 2015, 2115, or 2215 (e.g., in cooperation with a transmitter and/or a receiver), as described with reference to FIGS. 20 through 22. In some examples, an AN 405 may execute a set of codes to control the functional elements of the device to perform the functions described below. Additionally or alternatively, an AN 405 may perform aspects of the functions described below using special-purpose hardware.

At block 2505 the AN 405 may establish a connection with a wireless device 115. The operations of block 2505 may be performed according to the methods described with reference to FIGS. 1 through 16. In certain examples, aspects of the operations of block 2505 may be performed by an AN connection manager 2120 as described with reference to FIG. 21.

At block 2510 the AN 405 may determine that the wireless device 115 has determined to perform an authentication. The operations of block 2510 may be performed according to the methods described with reference to FIGS. 1 through 16. In certain examples, aspects of the operations of block 2510 may be performed by an AN authentication manager 2125 as described with reference to FIG. 21.

At block 2515 the AN 405 may transmit an indication of a protocol end point for the authentication as being a NAS layer or a RRC layer. The operations of block 2515 may be performed according to the methods described with reference to FIGS. 1 through 16. In certain examples, aspects of the operations of block 2515 may be performed by an AN authentication manager 2125 as described with reference to FIG. 21.

At block 2520 the AN 405 may provide communications for the authentication between the wireless device 115 and the protocol end point. The operations of block 2520 may be performed according to the methods described with reference to FIGS. 1 through 16. In certain examples, aspects of the operations of block 2520 may be performed by an AN authentication communications manager 2130 as described with reference to FIG. 21.

Figure 26:
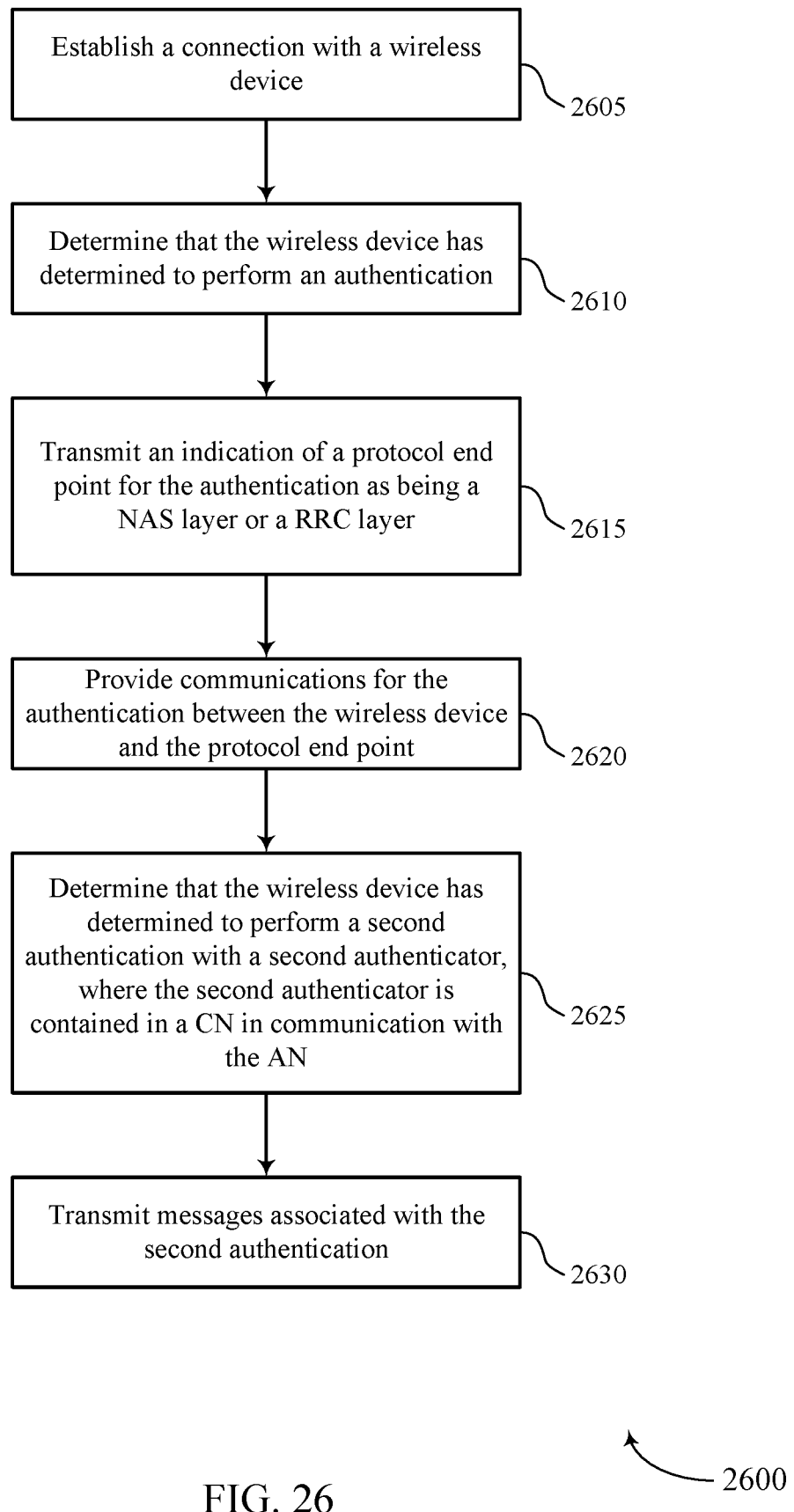

FIG. 26 shows a flowchart illustrating a method 2600 that supports establishing a secure connection between a wireless device 115 and a LAN 440 via an AN 405, in accordance with various aspects of the present disclosure. The operations of method 2600 may be implemented by an AN 405 or its components as described herein. For example, operations of method 2600 may be performed by an AN communication manager 2015, 2115, or 2215 (e.g., in cooperation with a transmitter and/or a receiver), as described with reference to FIGS. 20 through 22. In some examples, an AN 405 may execute a set of codes to control the functional elements of the device to perform the functions described below. Additionally or alternatively, an AN 405 may perform aspects of the functions described below using special-purpose hardware.

At block 2605 the AN 405 may establish a connection with a wireless device 115. The operations of block 2605 may be performed according to the methods described with reference to FIGS. 1 through 16. In certain examples, aspects of the operations of block 2605 may be performed by an AN connection manager 2120 as described with reference to FIG. 21.

At block 2610 the AN 405 may determine that the wireless device 115 has determined to perform an authentication. The operations of block 2610 may be performed according to the methods described with reference to FIGS. 1 through 16. In certain examples, aspects of the operations of block 2610 may be performed by an AN authentication manager 2125 as described with reference to FIG. 21.

At block 2615 the AN 405 may transmit an indication of a protocol end point for the authentication as being a NAS layer or an RRC layer. The operations of block 2615 may be performed according to the methods described with reference to FIGS. 1 through 16. In certain examples, aspects of the operations of block 2615 may be performed by an AN authentication manager 2125 as described with reference to FIG. 21.

At block 2620 the AN 405 may provide communications for the authentication between the wireless device 115 and the protocol end point. The operations of block 2620 may be performed according to the methods described with reference to FIGS. 1 through 16. In certain examples, aspects of the operations of block 2620 may be performed by an AN authentication communications manager 2130 as described with reference to FIG. 21.

At block 2625 the AN 405 may determine that the wireless device 115 has determined to perform a second authentication with a second authenticator, wherein the second authenticator is contained in a CN in communication with the AN 405 (e.g., a CN 130 of a LAN 440 including the AN 405, a CN 130 of a separate cellular operator network, etc.). The operations of block 2625 may be performed according to the methods described with reference to FIGS. 1 through 16. In certain examples, aspects of the operations of block 2625 may be performed by an AN authentication manager 2125 as described with reference to FIG. 21.

At block 2630 the AN 405 may transmit messages associated with the second authentication. The operations of block 2630 may be performed according to the methods described with reference to FIGS. 1 through 16. In certain examples, aspects of the operations of block 2630 may be performed by an AN authentication communications manager 2130 as described with reference to FIG. 21.

Figure 27:
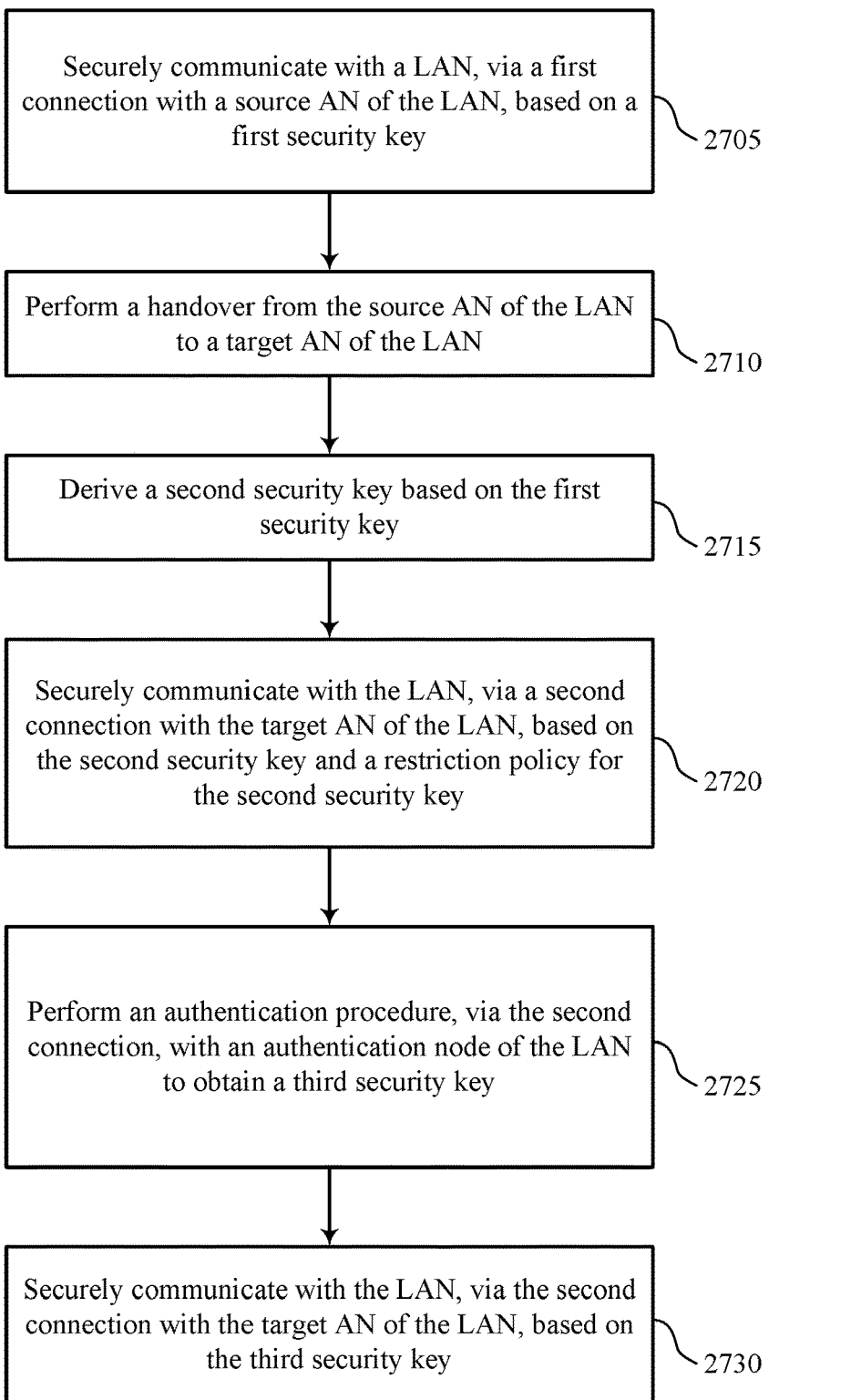
FIGS. 27 through 30 show flowcharts illustrating methods that support handover of a wireless device from a connection with a source AN of a LAN to a connection with a target AN of the LAN, in accordance with various aspects of the present disclosure.

FIG. 27 shows a flowchart illustrating a method 2700 that supports handover of a wireless device 115 from a connection with a source AN 405 of a LAN 440 to a connection with a target AN 405 of the LAN 440, in accordance with various aspects of the present disclosure. The operations of method 2700 may be implemented by a wireless device 115 or its components as described herein. For example, operations of method 2700 may be performed by a wireless device communication manager 1715, 1815, or 1915 (e.g., in cooperation with a transmitter and/or a receiver), as described with reference to FIGS. 17 through 19. In some examples, a wireless device 115 may execute a set of codes to control the functional elements of the device to perform the functions described below. Additionally or alternatively, the wireless device 115 may perform aspects of the functions described below using special-purpose hardware.

At block 2705 the wireless device 115 may securely communicate with a LAN 440, via a first connection with a source AN 405 of the LAN 440, based at least in part on a first security key. The operations of block 2705 may be performed according to the methods described with reference to FIGS. 1 through 16. In certain examples, aspects of the operations of block 2705 may be performed by a wireless device LAN communication manager 1830 as described with reference to FIG. 18.

At block 2710 the wireless device 115 may perform a handover from the source AN 405 of the LAN 440 to a target AN 405 of the LAN 440. The operations of block 2710 may be performed according to the methods described with reference to FIGS. 1 through 16. In certain examples, aspects of the operations of block 2710 may be performed by a wireless device handover manager 1835 as described with reference to FIG. 18.

At block 2715 the wireless device 115 may derive a second security key based at least in part on the first security key. The operations of block 2715 may be performed according to the methods described with reference to FIGS. 1 through 16. In certain examples, aspects of the operations of block 2715 may be performed by a wireless device key manager 1840 as described with reference to FIG. 18.

At block 2720 the wireless device 115 may securely communicate with the LAN 440, via a second connection with the target AN 405 of the LAN 440, based at least in part on the second security key and a restriction policy for the second security key. The operations of block 2720 may be performed according to the methods described with reference to FIGS. 1 through 16. In certain examples, aspects of the operations of block 2720 may be performed by a wireless device LAN communication manager 1830 as described with reference to FIG. 18.

At block 2725 the wireless device 115 may perform an authentication procedure, via the second connection, with an authentication node of the LAN 440 to obtain a third security key (e.g., a security key that is not subject to the restriction policy for the second key). The operations of block 2725 may be performed according to the methods described with reference to FIGS. 1 through 16. In certain examples, aspects of the operations of block 2725 may be performed by a wireless device authentication manager 1825 as described with reference to FIG. 18.

At block 2730 the wireless device 115 may securely communicate with the LAN 440, via the second connection with the target AN 405 of the LAN 440, based at least in part on the third security key. The operations of block 2730 may be performed according to the methods described with reference to FIGS. 1 through 16. In certain examples, aspects of the operations of block 2730 may be performed by a wireless device LAN communication manager 1830 as described with reference to FIG. 18.

Figure 28:
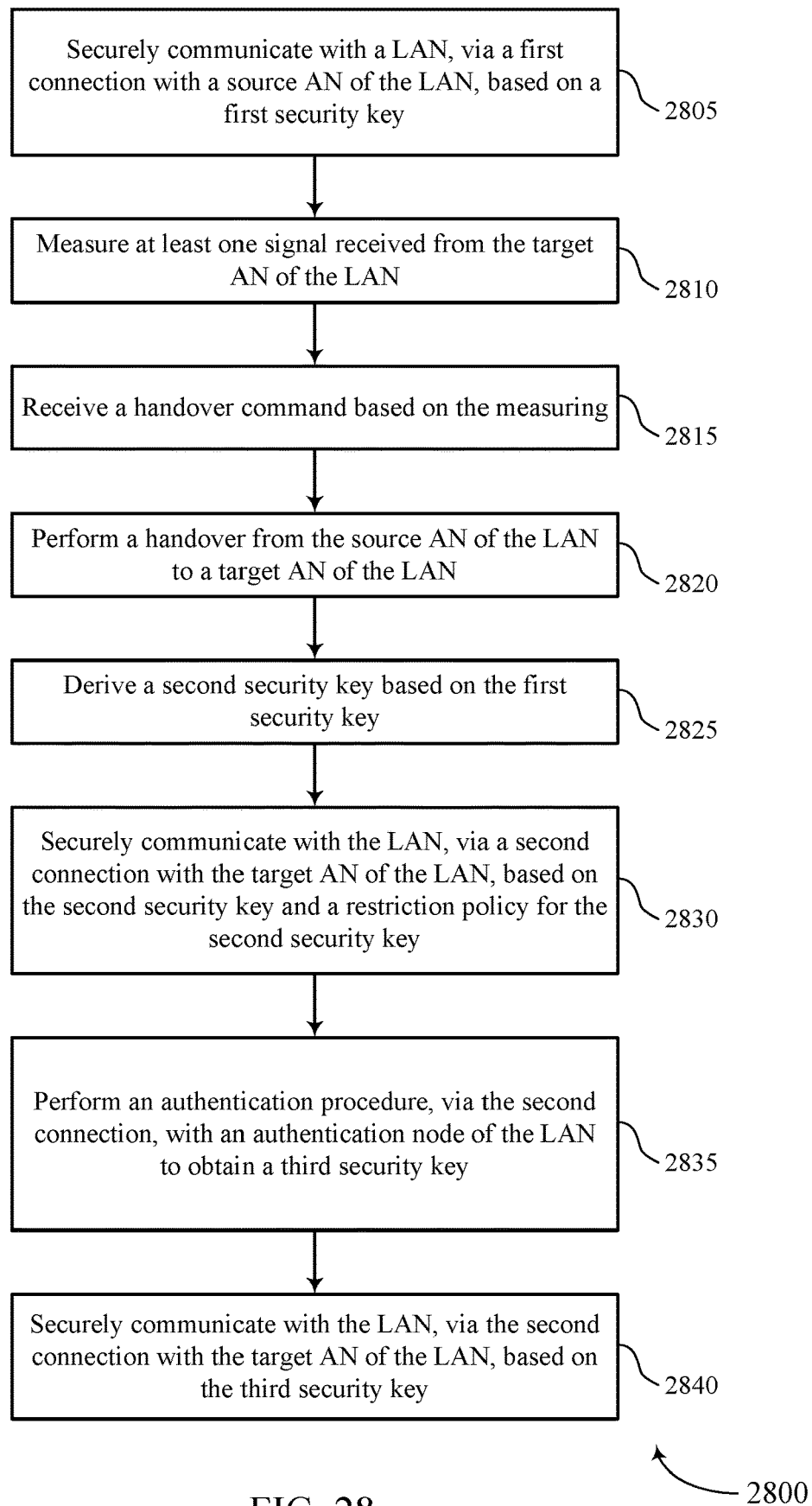

FIG. 28 shows a flowchart illustrating a method 2800 that supports handover of a wireless device 115 from a connection with a source AN 405 of a LAN 440 to a connection with a target AN 405 of the LAN 440, in accordance with various aspects of the present disclosure. The operations of method 2800 may be implemented by a wireless device 115 or its components as described herein. For example, the operations of method 2800 may be performed by a wireless device communication manager 1715, 1815, or 1915 (e.g., in cooperation with a transmitter and/or a receiver), as described with reference to FIGS. 17 through 19. In some examples, a wireless device 115 may execute a set of codes to control the functional elements of the device to perform the functions described below. Additionally or alternatively, the wireless device 115 may perform aspects of the functions described below using special-purpose hardware.

At block 2805 the wireless device 115 may securely communicate with a LAN 440, via a first connection with a source AN 405 of the LAN 440, based at least in part on a first security key. The operations of block 2805 may be performed according to the methods described with reference to FIGS. 1 through 16. In certain examples, aspects of the operations of block 2805 may be performed by a wireless device LAN communication manager 1830 as described with reference to FIG. 18.

At block 2810 the wireless device 115 may measure at least one signal received from the target AN 405 of the LAN 440. The operations of block 2810 may be performed according to the methods described with reference to FIGS. 1 through 16. In certain examples, aspects of the operations of block 2810 may be performed by a wireless device handover manager 1835 as described with reference to FIG. 18.

At block 2815 the wireless device 115 may receive a handover command based at least in part on the measuring. The operations of block 2815 may be performed according to the methods described with reference to FIGS. 1 through 16. In certain examples, aspects of the operations of block 2815 may be performed by a wireless device handover manager 1835 as described with reference to FIG. 18.

At block 2820 the wireless device 115 may perform a handover from the source AN 405 of the LAN 440 to a target AN 405 of the LAN 440. The operations of block 2820 may be performed according to the methods described with reference to FIGS. 1 through 16. In certain examples, aspects of the operations of block 2820 may be performed by a wireless device handover manager 1830 as described with reference to FIG. 18.

At block 2825 the wireless device 115 may derive a second security key based at least in part on the first security key. The operations of block 2825 may be performed according to the methods described with reference to FIGS. 1 through 16. In certain examples, aspects of the operations of block 2825 may be performed by a wireless device key manager 1840 as described with reference to FIG. 18.

At block 2830 the wireless device 115 may securely communicate with the LAN 440, via a second connection with the target AN 405 of the LAN 440, based at least in part on the second security key and a restriction policy for the second security key. The operations of block 2830 may be performed according to the methods described with reference to FIGS. 1 through 16. In certain examples, aspects of the operations of block 2830 may be performed by a wireless device LAN communication manager 1830 as described with reference to FIG. 18.

At block 2835 the wireless device 115 may perform an authentication procedure, via the second connection, with an authentication node of the LAN 440 to obtain a third security key (e.g., a security key that is not subject to the restriction policy for the second key). The operations of block 2835 may be performed according to the methods described with reference to FIGS. 1 through 16. In certain examples, aspects of the operations of block 2835 may be performed by a wireless device authentication manager 1825 as described with reference to FIG. 18.

At block 2840 the wireless device 115 may securely communicate with the LAN 440, via the second connection with the target AN 405 of the LAN 440, based at least in part on the third security key. The operations of block 2840 may be performed according to the methods described with reference to FIGS. 1 through 16. In certain examples, aspects of the operations of block 2840 may be performed by a wireless device LAN communication manager 1830 as described with reference to FIG. 18.

Figure 29:
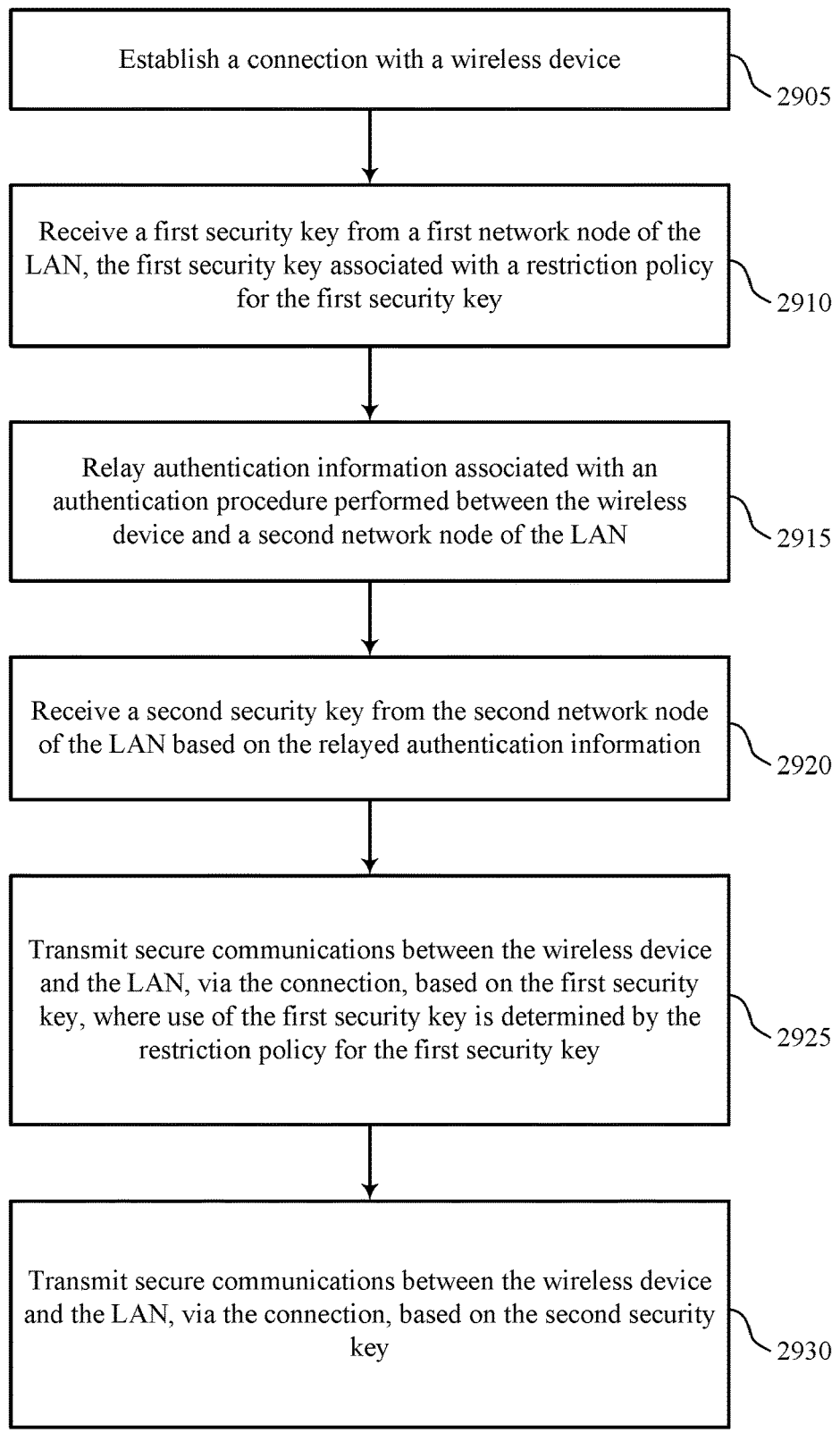

FIG. 29 shows a flowchart illustrating a method 2900 that supports handover of a wireless device 115 from a connection with a source AN 405 of a LAN 440 to a connection with a target AN 405 of the LAN 440, in accordance with various aspects of the present disclosure. The operations of method 2900 may be implemented by an AN 405 or its components as described herein. For example, the operations of method 2900 may be performed by an AN communication manager 2015, 2115, or 2215 (e.g., in cooperation with a transmitter and/or a receiver), as described with reference to FIGS. 20 through 22. In some examples, an AN 405 may execute a set of codes to control the functional elements of the device to perform the functions described below. Additionally or alternatively, an AN 405 may perform aspects of the functions described below using special-purpose hardware.

At block 2905 the AN 405 may establish a connection with a wireless device 115. The operations of block 2905 may be performed according to the methods described with reference to FIGS. 1 through 16. In certain examples, aspects of the operations of block 2905 may be performed by an AN connection manager 2120 as described with reference to FIG. 21.

At block 2910 the AN 405 may receive a first security key from a first network node of the LAN 440, the first security key associated with a restriction policy for the first security key. The operations of block 2910 may be performed according to the methods described with reference to FIGS. 1 through 16. In certain examples, aspects of the operations of block 2910 may be performed by an AN key manager 2135 as described with reference to FIG. 21.

At block 2915 the AN 405 may relay authentication information associated with an authentication procedure performed between the wireless device 115 and a second network node of the LAN 440. The operations of block 2915 may be performed according to the methods described with reference to FIGS. 1 through 16. In certain examples, aspects of the operations of block 2915 may be performed by an AN authentication communications manager 2130 as described with reference to FIG. 21.

At block 2920 the AN 405 may receive a second security key from the second network node of the LAN 440 based at least in part on the relayed authentication information. The operations of block 2920 may be performed according to the methods described with reference to FIGS. 1 through 16. In certain examples, aspects of the operations of block 2920 may be performed by an AN key manager 2135 as described with reference to FIG. 21.

At block 2925 the AN 405 may transmit secure communications between the wireless device 115 and the LAN 440, via the connection, based at least in part on the first security key, wherein use of the first security key is determined by the restriction policy for the first security key. The operations of block 2925 may be performed according to the methods described with reference to FIGS. 1 through 16. In certain examples, aspects of the operations of block 2925 may be performed by an AN LAN communication manager 2140 as described with reference to FIG. 21.

At block 2930 the AN 405 may transmit secure communications between the wireless device 115 and the LAN 440, via the connection, based at least in part on the second security key (e.g., secure communications that are not subject to the restriction policy for the first security key). The operations of block 2930 may be performed according to the methods described with reference to FIGS. 1 through 16. In certain examples, aspects of the operations of block 2930 may be performed by an AN LAN communication manager 2140 as described with reference to FIG. 21.

Figure 30:
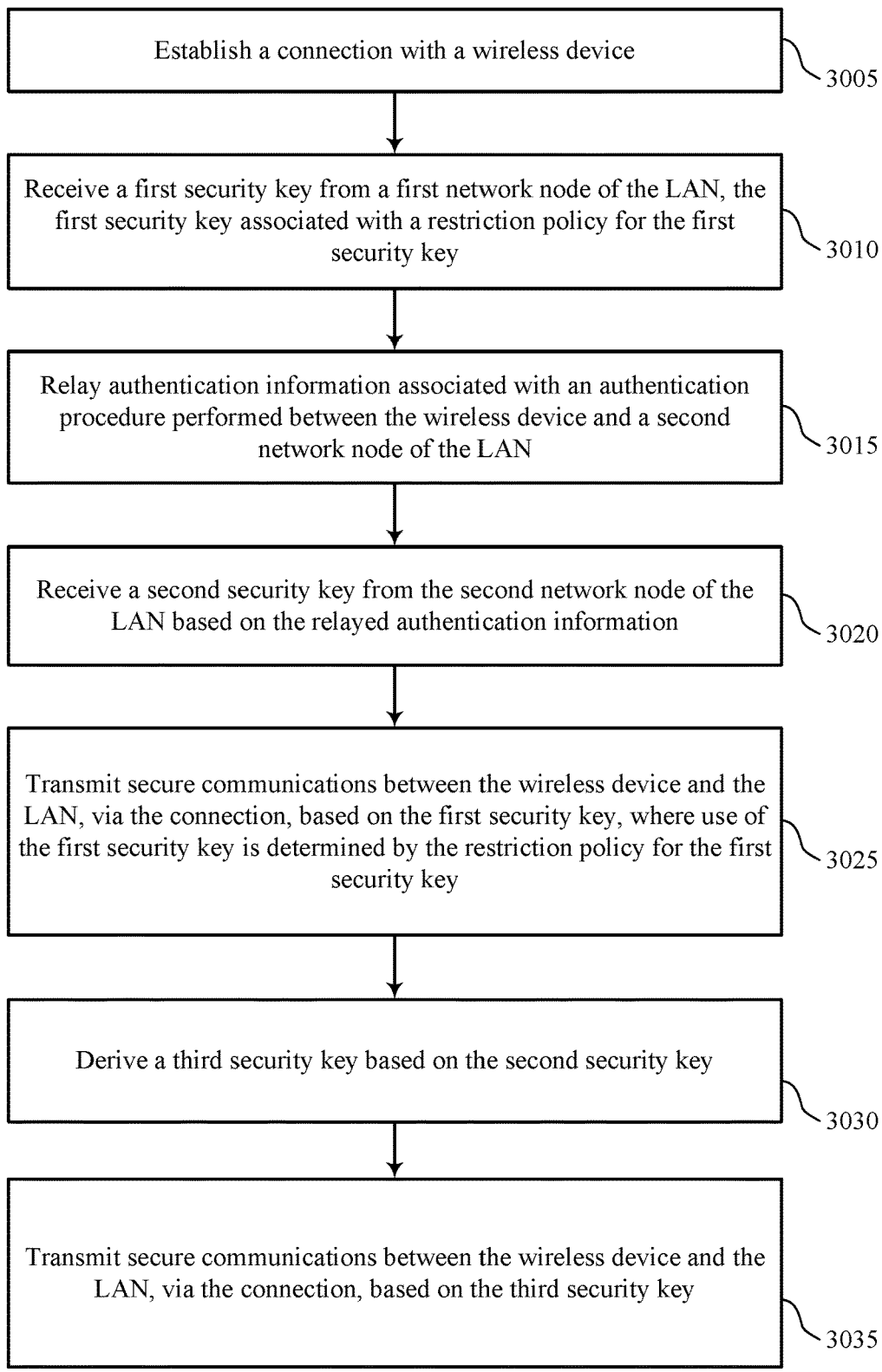

FIG. 30 shows a flowchart illustrating a method 3000 that supports handover of a wireless device 115 from a connection with a source AN 405 of a LAN 440 to a connection with a target AN 405 of the LAN 440, in accordance with various aspects of the present disclosure. The operations of method 3000 may be implemented by an AN 405 or its components as described herein. For example, the operations of method 3000 may be performed by an AN communication manager 2015, 2115, or 2215 (e.g., in cooperation with a transmitter and/or a receiver), as described with reference to FIGS. 20 through 22. In some examples, an AN 405 may execute a set of codes to control the functional elements of the device to perform the functions described below. Additionally or alternatively, the AN 405 may perform aspects of the functions described below using special-purpose hardware.

At block 3005 the AN 405 may establish a connection with a wireless device 115. The operations of block 3005 may be performed according to the methods described with reference to FIGS. 1 through 16. In certain examples, aspects of the operations of block 3005 may be performed by an AN connection manager 2120 as described with reference to FIG. 21.

At block 3010 the AN 405 may receive a first security key from a first network node of the LAN 440, the first security key associated with a restriction policy for the first security key. The operations of block 3010 may be performed according to the methods described with reference to FIGS. 1 through 16. In certain examples, aspects of the operations of block 3010 may be performed by an AN key manager 2135 as described with reference to FIG. 21.

At block 3015 the AN 405 may relay authentication information associated with an authentication procedure performed between the wireless device 115 and a second network node of the LAN 440. The operations of block 3015 may be performed according to the methods described with reference to FIGS. 1 through 16. In certain examples, aspects of the operations of block 3015 may be performed by an AN authentication communications manager 2130 as described with reference to FIG. 21.

At block 3020 the AN 405 may receive a second security key from the second network node of the LAN 440 based at least in part on the relayed authentication information. The operations of block 3020 may be performed according to the methods described with reference to FIGS. 1 through 16. In certain examples, aspects of the operations of block 3020 may be performed by an AN key manager 2135 as described with reference to FIG. 21.

At block 3025 the AN 405 may transmit secure communications between the wireless device 115 and the LAN 440, via the connection, based at least in part on the first security key, wherein use of the first security key is determined by the restriction policy for the first security key. The operations of block 3025 may be performed according to the methods described with reference to FIGS. 1 through 16. In certain examples, aspects of the operations of block 3025 may be performed by an AN LAN communication manager 2140 as described with reference to FIG. 21.

At block 3030 the AN 405 may derive a third security key based at least in part on the second security key (e.g., another security key that is not subject to the restriction policy for the first security key). The operations of block 3035 may be performed according to the methods described with reference to FIGS. 1 through 16. In certain examples, aspects of the operations of block 3035 may be performed by an AN key manager 2135 as described with reference to FIG. 21.

At block 3035 the AN 405 may transmit secure communications between the wireless device 115 and the LAN 440, via the connection, based at least in part on the third security key (e.g., secure communications that are not subject to the restriction policy for the first security key). The operations of block 3030 may be performed according to the methods described with reference to FIGS. 1 through 16. In certain examples, aspects of the operations of block 3030 may be performed by an AN LAN communication manager 2140 as described with reference to FIG. 21.

Figure 31:
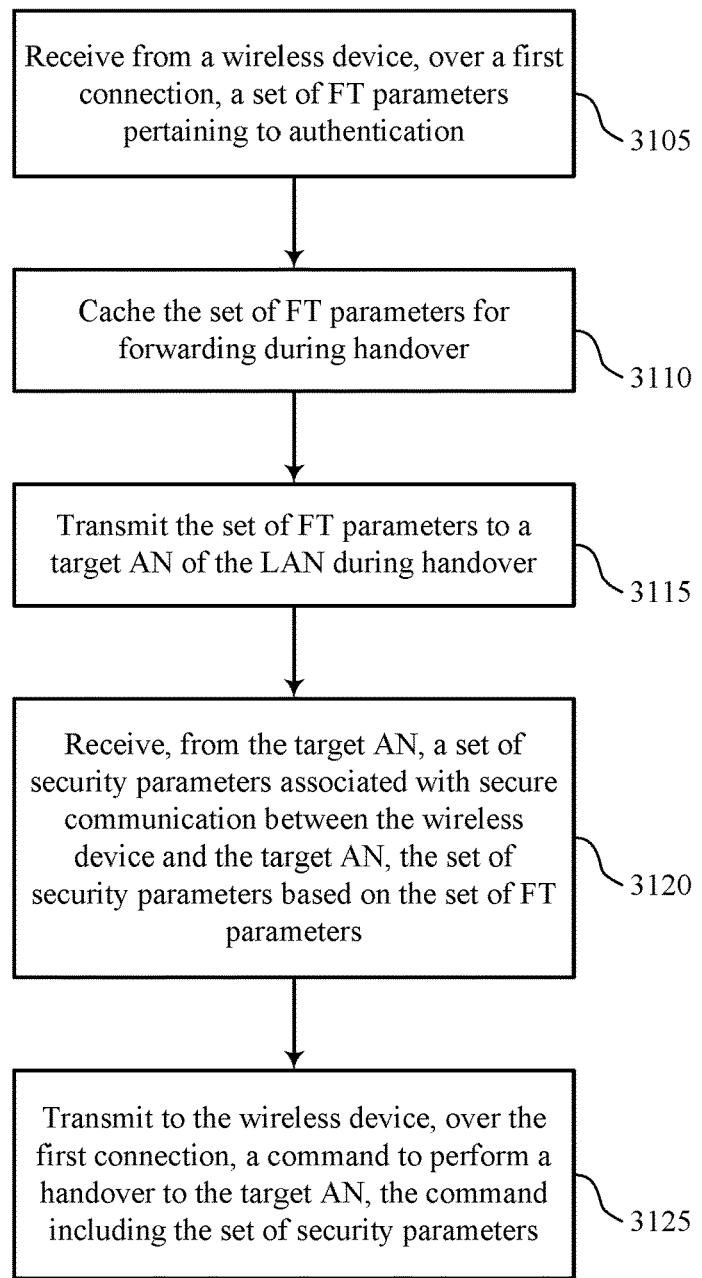
FIGS. 31 through 34 show flowcharts illustrating methods that support fast transition of a wireless device from a connection with a source AN of a LAN to a connection with a target AN of the LAN, in accordance with various aspects of the present disclosure.

FIG. 31 shows a flowchart illustrating a method 3100 that supports fast transition of a wireless device 115 from a connection with a source AN 405 of a LAN 440 to a connection with a target AN 405 of the LAN 440, in accordance with various aspects of the present disclosure. The operations of method 3100 may be implemented by an AN 405 or its components as described herein. For example, operations of method 3100 may be performed by an AN communication manager 2015, 2115, or 2215 (e.g., in cooperation with a transmitter and/or a receiver), as described with reference to FIGS. 20 through 22. In some examples, an AN 405 may execute a set of codes to control the functional elements of the device to perform the functions described below. Additionally or alternatively, the AN 405 may perform aspects of the functions described below using special-purpose hardware.

At block 3105 the AN 405 may receive from a wireless device 115, over a first connection, a set of FT parameters pertaining to authentication. The operations of block 3105 may be performed according to the methods described with reference to FIGS. 1 through 16. In certain examples, aspects of the operations of block 3105 may be performed by an AN FT manager 2145 as described with reference to FIG. 21.

At block 3110 the AN 405 may cache the set of FT parameters for forwarding during handover. The operations of block 3110 may be performed according to the methods described with reference to FIGS. 1 through 16. In certain examples, aspects of the operations of block 3110 may be performed by an AN FT manager 2145 as described with reference to FIG. 21.

At block 3115 the AN 405 may transmit the set of FT parameters to a target AN 405 of the LAN 440 during handover. The operations of block 3115 may be performed according to the methods described with reference to FIGS. 1 through 16. In certain examples, aspects of the operations of block 3115 may be performed by an AN FT manager 2145 as described with reference to FIG. 21.

At block 3120 the AN 405 may receive, from the target AN 405, a set of security parameters associated with secure communication between the wireless device 115 and the target AN 405, the set of security parameters based at least in part on the set of FT parameters. The operations of block 3120 may be performed according to the methods described with reference to FIGS. 1 through 16. In certain examples, aspects of the operations of block 3120 may be performed by an AN handover manager 2150 as described with reference to FIG. 21.

At block 3125 the AN 405 may transmit to the wireless device 115, over the first connection, a command to perform a handover to the target AN 405, the command including the set of security parameters. The operations of block 3125 may be performed according to the methods described with reference to FIGS. 1 through 16. In certain examples, aspects of the operations of block 3125 may be performed by an AN handover manager 2150 as described with reference to FIG. 21.

Figure 32:
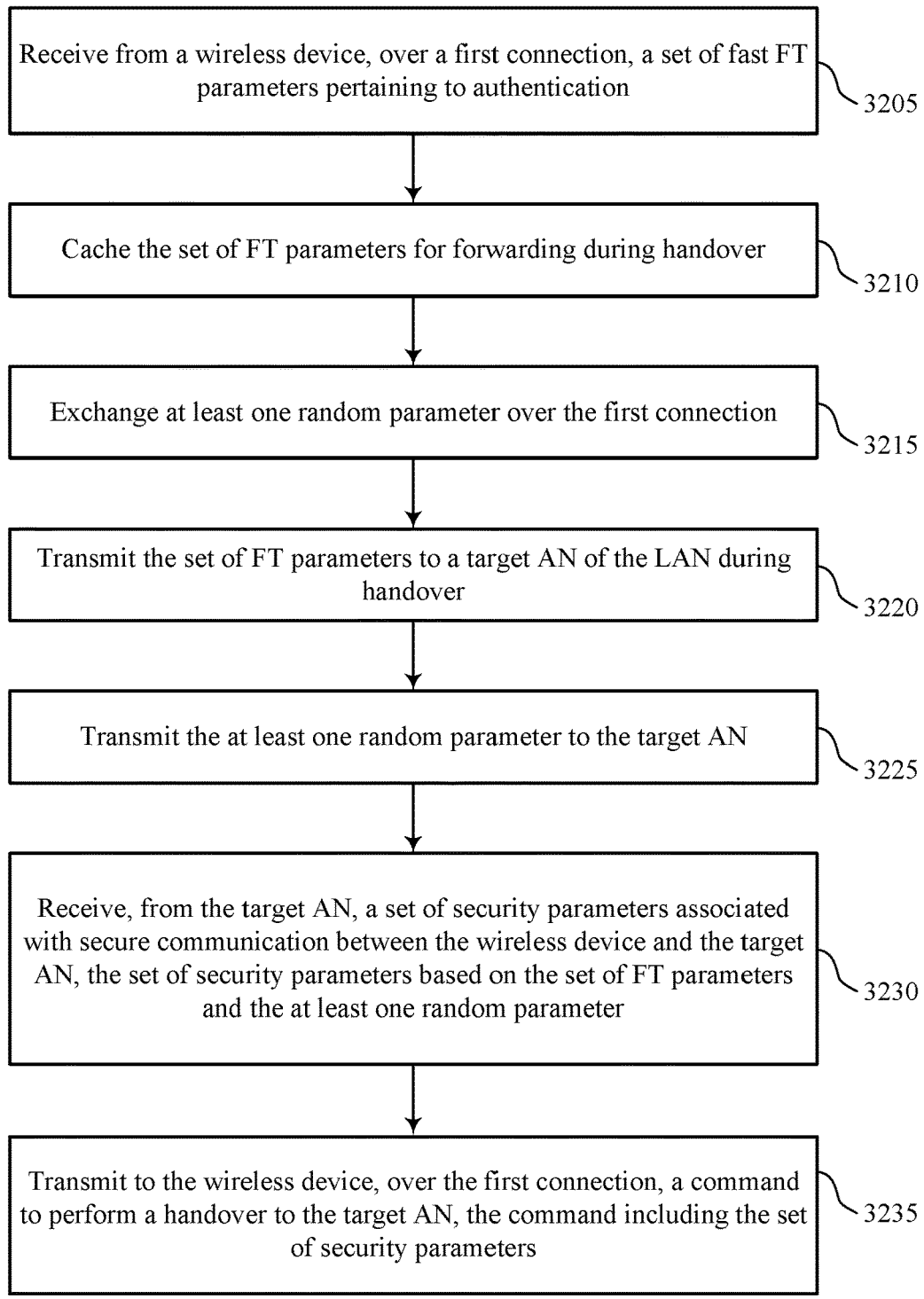

FIG. 32 shows a flowchart illustrating a method 3200 that supports fast transition of a wireless device 115 from a connection with a source AN 405 of a LAN 440 to a connection with a target AN 405 of the LAN 440, in accordance with various aspects of the present disclosure. The operations of method 3200 may be implemented by an AN 405 or its components as described herein. For example, operations of method 3200 may be performed by an AN communication manager 2015, 2115, or 2215 (e.g., in cooperation with a transmitter and/or a receiver), as described with reference to FIGS. 20 through 22. In some examples, an AN 405 may execute a set of codes to control the functional elements of the device to perform the functions described below. Additionally or alternatively, an AN 405 may perform aspects of the functions described below using special-purpose hardware.

At block 3205 the AN 405 may receive from a wireless device 115, over a first connection, a set of FT parameters pertaining to authentication. The operations of block 3205 may be performed according to the methods described with reference to FIGS. 1 through 16. In certain examples, aspects of the operations of block 3205 may be performed by an AN FT manager 2145 as described with reference to FIG. 21.

At block 3210 the AN 405 may cache the set of FT parameters for forwarding during handover. The operations of block 3210 may be performed according to the methods described with reference to FIGS. 1 through 16. In certain examples, aspects of the operations of block 3210 may be performed by an AN FT manager 2145 as described with reference to FIG. 21.

At block 3215 the AN 405 may exchange at least one random parameter over the first connection. The operations of block 3215 may be performed according to the methods described with reference to FIGS. 1 through 16. In certain examples, aspects of the operations of block 3215 may be performed by an AN authentication manager 2125 as described with reference to FIG. 21.

At block 3220 the AN 405 may transmit the set of FT parameters to a target AN 405 of the LAN 440 during handover. The operations of block 3220 may be performed according to the methods described with reference to FIGS. 1 through 16. In certain examples, aspects of the operations of block 3220 may be performed by a AN FT manager 2145 as described with reference to FIG. 21.

At block 3225 the AN 405 may transmit the at least one random parameter to the target AN 405. The operations of block 3225 may be performed according to the methods described with reference to FIGS. 1 through 16. In certain examples, aspects of the operations of block 3225 may be performed by a AN authentication manager 2125 as described with reference to FIG. 21.

At block 3230 the AN 405 may receive, from the target AN 405, a set of security parameters associated with secure communication between the wireless device 115 and the target AN 405, the set of security parameters based at least in part on the set of FT parameters and the at least one random parameter. The operations of block 3230 may be performed according to the methods described with reference to FIGS. 1 through 16. In certain examples, aspects of the operations of block 3230 may be performed by a AN handover manager 2150 as described with reference to FIG. 21.

At block 3235 the AN 405 may transmit to the wireless device 115, over the first connection, a command to perform a handover to the target AN 405, the command including the set of security parameters. The operations of block 3240 may be performed according to the methods described with reference to FIGS. 1 through 16. In certain examples, aspects of the operations of block 3240 may be performed by a AN handover manager 2150 as described with reference to FIG. 21.

Figure 33:
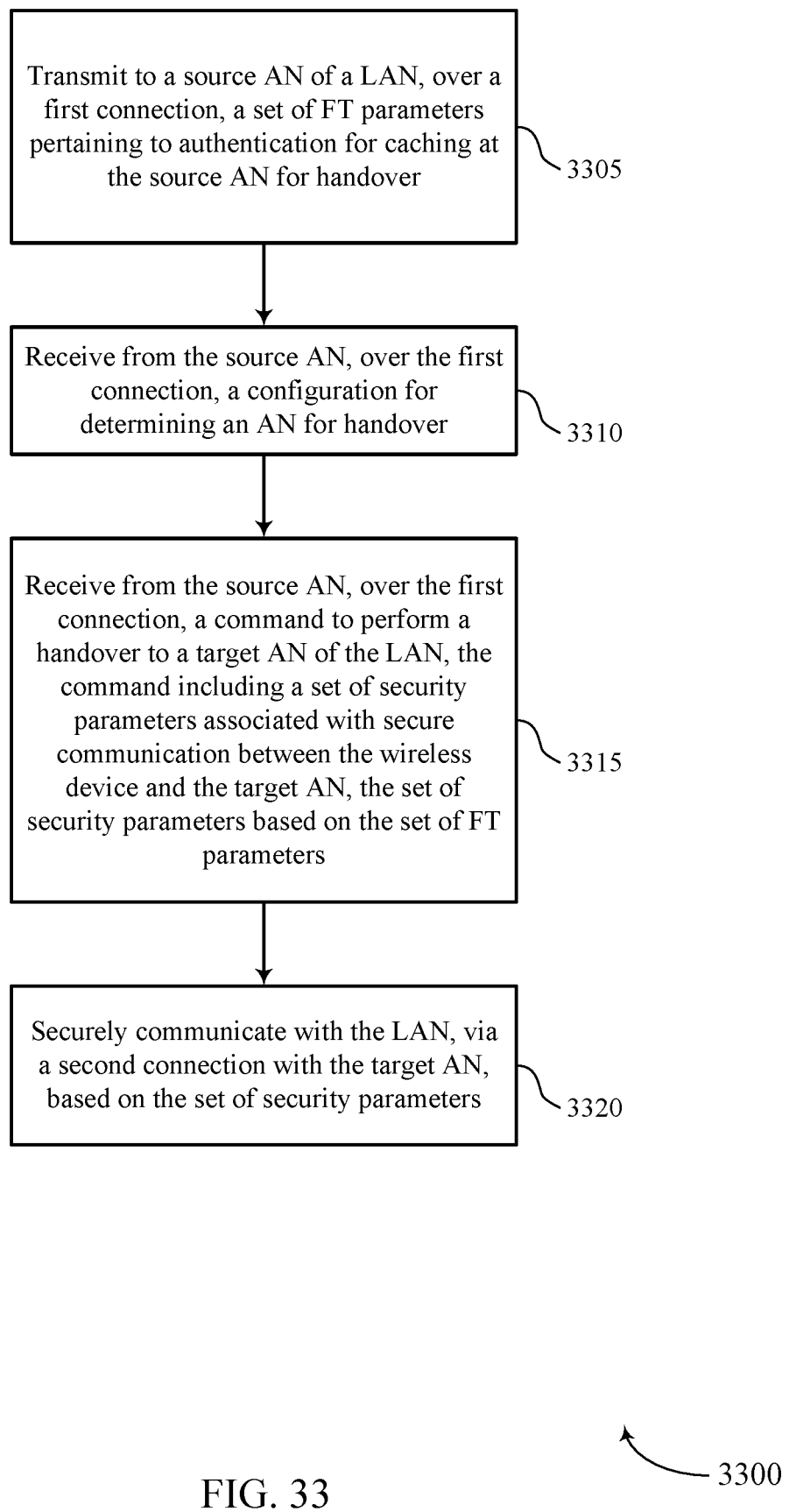

FIG. 33 shows a flowchart illustrating a method 3300 that supports fast transition of a wireless device 115 from a connection with a source AN 405 of a LAN 440 to a connection with a target AN 405 of the LAN 440, in accordance with various aspects of the present disclosure. The operations of method 3300 may be implemented by a wireless device 115 or its components as described herein. For example, operations of method 3300 may be performed by a wireless device communication manager 1715, 1815, or 1915 (e.g., in cooperation with a transmitter and/or a receiver), as described with reference to FIGS. 17 through 19. In some examples, a wireless device 115 may execute a set of codes to control the functional elements of the device to perform the functions described below. Additionally or alternatively, the wireless device 115 may perform aspects of the functions described below using special-purpose hardware.

At block 3305 the wireless device 115 may transmit to a source AN 405 of a LAN 440, over a first connection, a set of FT parameters pertaining to authentication for caching at the source AN 405 for handover. The operations of block 3305 may be performed according to the methods described with reference to FIGS. 1 through 16. In certain examples, aspects of the operations of block 3305 may be performed by a wireless device FT manager 1845 as described with reference to FIG. 18.

At block 3310 the wireless device 115 may receive from the source AN 405, over the first connection, a configuration for determining an AN 405 for handover. The operations of block 3310 may be performed according to the methods described with reference to FIGS. 1 through 16. In certain examples, aspects of the operations of block 3310 may be performed by a wireless device handover manager 1835 as described with reference to FIG. 18.

At block 3315 the wireless device 115 may receive from the source AN 405, over the first connection, a command to perform a handover to a target AN 405 of the LAN 440, the command including a set of security parameters associated with secure communication between the wireless device 115 and the target AN 405, the set of security parameters based at least in part on the set of FT parameters. The operations of block 3315 may be performed according to the methods described with reference to FIGS. 1 through 16. In certain examples, aspects of the operations of block 3315 may be performed by a wireless device handover manager 1835 as described with reference to FIG. 18.

At block 3320 the wireless device 115 may securely communicate with the LAN 440, via a second connection with the target AN 405, based at least in part on the set of security parameters. The operations of block 3320 may be performed according to the methods described with reference to FIGS. 1 through 16. In certain examples, aspects of the operations of block 3320 may be performed by a wireless device LAN communication manager 1830 as described with reference to FIG. 18.

Figure 34:
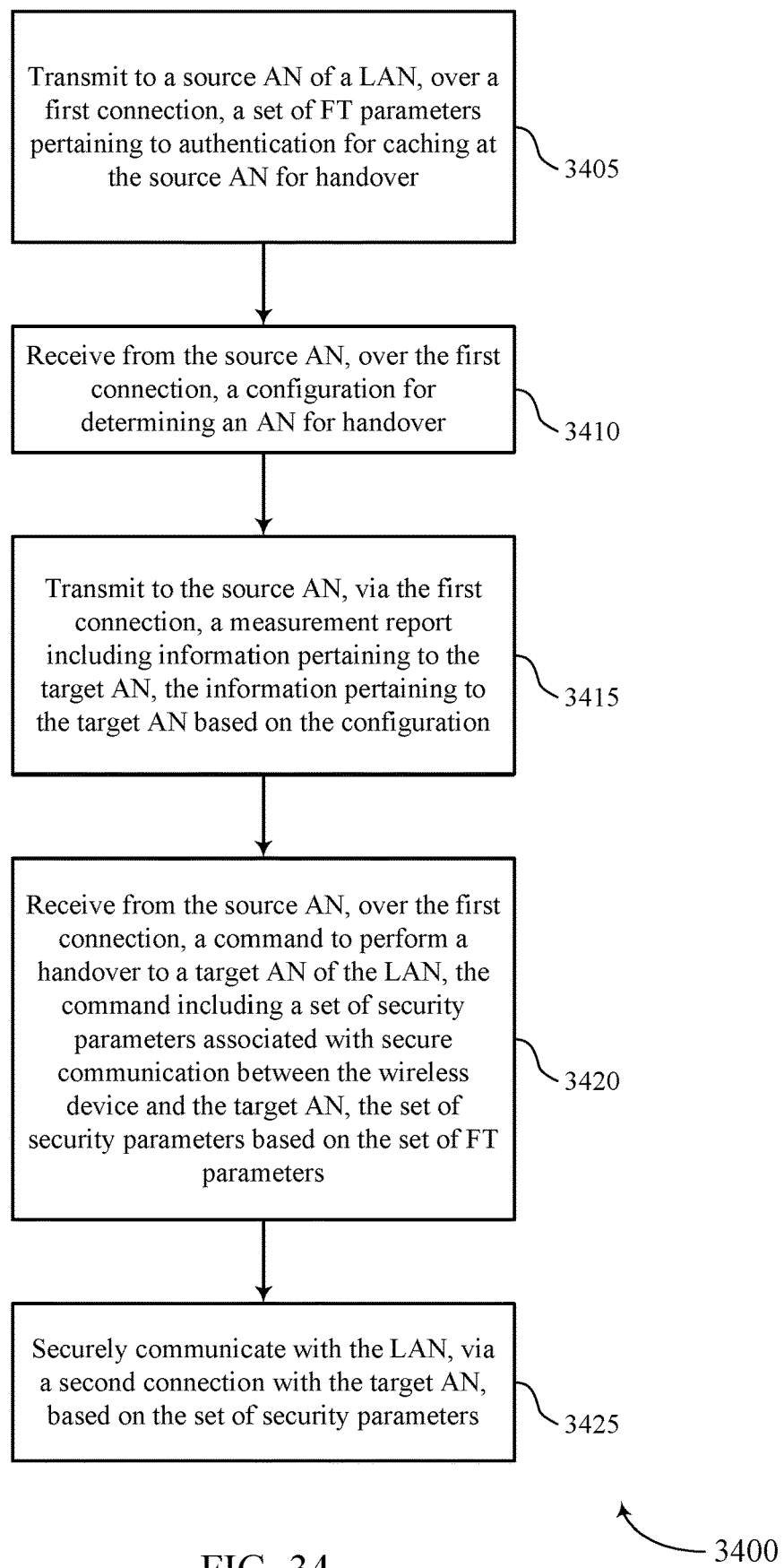

FIG. 34 shows a flowchart illustrating a method 3400 that supports fast transition of a wireless device 115 from a connection with a source AN 405 of a LAN 440 to a connection with a target AN 405 of the LAN 440, in accordance with various aspects of the present disclosure. The operations of method 3400 may be implemented by a wireless device 115 or its components as described herein. For example, operations of method 3400 may be performed by a wireless device communication manager 1715, 1815, or 1915 (e.g., in cooperation with a transmitter and/or a receiver), as described with reference to FIGS. 17 through 19. In some examples, a wireless device 115 may execute a set of codes to control the functional elements of the device to perform the functions described below. Additionally or alternatively, the wireless device 115 may perform aspects of the functions described below using special-purpose hardware.

At block 3405 the wireless device 115 may transmit to a source AN 405 of a LAN 440, over a first connection, a set of FT parameters pertaining to authentication for caching at the source AN 405 for handover. The operations of block 3405 may be performed according to the methods described with reference to FIGS. 1 through 16. In certain examples, aspects of the operations of block 3405 may be performed by a wireless device FT manager 1845 as described with reference to FIG. 18.

At block 3410 the wireless device 115 may receive from the source AN 405, over the first connection, a configuration for determining an AN 405 for handover. The operations of block 3410 may be performed according to the methods described with reference to FIGS. 1 through 16. In certain examples, aspects of the operations of block 3410 may be performed by a wireless device handover manager 1835 as described with reference to FIG. 18.

At block 3415 the wireless device 115 may transmit to the source AN 405, via the first connection, a measurement report including information pertaining to the target AN 405, the information pertaining to the target AN 405 based at least in part on the configuration. The operations of block 3415 may be performed according to the methods described with reference to FIGS. 1 through 16. In certain examples, aspects of the operations of block 3415 may be performed by a wireless device handover manager 1835 as described with reference to FIG. 18.

At block 3420 the wireless device 115 may receive from the source AN 405, over the first connection, a command to perform a handover to a target AN 405 of the LAN 440, the command including a set of security parameters associated with secure communication between the wireless device 115 and the target AN 405, the set of security parameters based at least in part on the set of FT parameters. The operations of block 3420 may be performed according to the methods described with reference to FIGS. 1 through 16. In certain examples, aspects of the operations of block 3420 may be performed by a wireless device handover manager 1835 as described with reference to FIG. 18.

At block 3425 the wireless device 115 may securely communicate with the LAN 440, via a second connection with the target AN 405, based at least in part on the set of security parameters. The operations of block 3425 may be performed according to the methods described with reference to FIGS. 1 through 16. In certain examples, aspects of the operations of block 3425 may be performed by a wireless device LAN communication manager 1830 as described with reference to FIG. 18.

It should be noted that the methods described above illustrate possible implementations of the techniques described in the present disclosure. In some examples, aspects of the methods 2300, 2400, 2700, 2800, 3300, or 3400 described with reference to FIG. 23, 24, 27, 28, 33, or 34 may be combined. In some examples, aspects of the methods 2500, 2600, 2900, 3000, 3100, or 3200 may be combined. In some examples, the operations of the methods may be performed in different orders or include different operations. In some examples, aspects of each of the methods may include steps or aspects of the other methods, or other steps or techniques described herein.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash- OFDM, etc. UTRA and E-UTRA are part of Universal Mobile Telecommunication system (Universal Mobile Telecommunication system (UMTS)). 3GPP LTE and LTE-A are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communication system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an AP, a radio transceiver, a NodeB, eNodeB (eNB), Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The wireless devices described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by wireless devices with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by wireless devices with service subscriptions with the network provider. A femto cell may also cover a small geographic area (e.g., a home) and may provide restricted access by wireless devices having an association with the femto cell (e.g., wireless devices in a closed subscriber group (CSG), wireless devices for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A wireless device may be able to communicate with various types of base stations and network equipment including macro eNBs, small cell eNBs, relay base stations, and the like.

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communication system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication at a wireless device, the method comprising:
    establishing a connection with an access node (AN) of a local area network (LAN);
    transmitting a query to the AN for an indication of one or more protocol end points for an authentication;
    receiving a response to the query comprising authentication end point information that includes the indication of the one or more protocol end points for the authentication, wherein the one or more protocol end points comprise a non-access stratum (NAS) layer, a radio resource control (RRC) layer, or both the NAS layer and the RRC layer;
    determining to perform the authentication via at least one of the one or more protocol end points based at least in part on the received indication of the one or more protocol end points;
    transmitting an authentication indication comprising the determination to perform the authentication; and
    performing the authentication via the connection established with the AN and the at least one of the one or more protocol end points, based at least in part on the determination to perform the authentication.

2. The method of claim 1, wherein transmitting the authentication indication comprises:
    transmitting, to the AN, an indication that the authentication is to be performed with an authenticator.

3. The method of claim 2, wherein the transmitted indication that the authentication is to be performed with the authenticator is transmitted in a RRC connection establishment message.

4. The method of claim 2, further comprising:
    selecting at least one resource for performing a random access procedure; and
    performing the random access procedure with the AN using the at least one selected resource,
    wherein the at least one selected resource for performing the random access procedure comprises the indication that the authentication is to be performed with the authenticator.

5. The method of claim 1, wherein receiving the response to the query comprising authentication end point information that includes the indication of the one or more protocol end points for the authentication comprises:
    receiving an indication that the AN performs authentications using an authenticator,
    wherein determining to perform the authentication is based at least in part on receiving the indication that the AN performs authentications using the authenticator.

6. The method of claim 5, wherein the indication that the AN performs authentications using the authenticator is received in at least one of:
    system information, a random access channel (RACH) establishment message, or a combination thereof.

7. The method of claim 1, further comprising:
    receiving an indication that the AN performs authentications using a second authenticator, wherein the second authenticator is contained in a core network (CN) associated with the AN.

8. The method of claim 7, wherein determining to perform an authentication comprises:
    selecting an authenticator that is co-located with the AN, the second authenticator, or both to perform the authentication.

9. The method of claim 1, wherein determining to perform the authentication is based at least in part on a configuration of the AN stored at the wireless device.

10. The method of claim 9, further comprising:
    receiving an identifier associated with the AN; and
    retrieving the configuration of the AN based at least in part on the received identifier.

11. The method of claim 1, wherein the authentication is performed over a radio bearer associated with the connection established with the AN.

12. The method of claim 11, wherein the authentication is performed over the RRC layer.

13. The method of claim 11, wherein the at least one of the one or more protocol end points for the authentication comprises an authenticator, and wherein performing the authentication comprises:
    exchanging authentication information with the authenticator over the radio bearer;
    exchanging at least one random parameter with the AN over the radio bearer; and
    generating a security key based at least in part on the exchanged authentication information and the at least one random parameter.

14. The method of claim 13, further comprising:
    establishing one or more additional radio bearers based at least in part on the security key; and
    securely communicating with the LAN, over the connection via the radio bearer, the one or more additional radio bearers, or both, based at least in part on the generated security key.

15. The method of claim 1, wherein the authentication is based at least in part on an extensible authentication protocol (EAP) performed over a radio bearer associated with the connection established with the AN.

16. The method of claim 15, wherein the authentication is performed over the RRC layer or Ethernet.

17. The method of claim 1, wherein the at least one of the one or more protocol end points for the authentication comprises a first authenticator, the method further comprising:
    determining to perform a second authentication with a second authenticator, the second authenticator contained in a core network (CN) in communication with the AN; and
    performing the second authentication with the second authenticator via the AN.

18. The method of claim 17, wherein the second authentication is performed over the NAS layer.

19. The method of claim 1, wherein the connection is established using a cellular radio access technology (RAT).

20. The method of claim 1, wherein the authentication is performed with an authenticator that is co-located with the AN, or an authenticator that is hosted at a node of the LAN located apart from the AN, or both.

21. An apparatus for wireless communication at a wireless device, comprising:
    a processor; and
    memory in electronic communication with the processor;

instructions stored in the memory and operable, when executed by the processor, to cause the apparatus to:
establish a connection with an access node (AN) of a local area network (LAN);
transmit a query to the AN for an indication of one or more protocol end points for an authentication;
receive a response to the query comprising authentication end point information that includes the indication of the one or more protocol end points for the authentication, wherein the one or more protocol end points comprise a non-access stratum (NAS) layer, a radio resource control (RRC) layer, or both the NAS layer and the RRC layer;
determine to perform the authentication via at least one of the one or more protocol end points based at least in part on the received indication of the one or more protocol end points;
transmit an authentication indication comprising the determination to perform the authentication; and
perform the authentication via the connection established with the AN and the at least one of the one or more protocol end points, based at least in part on the determination to perform the authentication.

22. The apparatus of claim 21, wherein the instructions are operable to cause the apparatus to:
transmit, to the AN, an indication that the authentication is to be performed with an authenticator.

23. The apparatus of claim 22, wherein the transmitted indication that the authentication is to be performed with the authenticator is transmitted in a RRC connection establishment message.

24. The apparatus of claim 22, wherein the instructions are operable to cause the apparatus to:
select at least one resource for performing a random access procedure; and
perform the random access procedure with the AN using the at least one selected resource,
wherein the at least one selected resource for performing the random access procedure comprises the indication that the authentication is to be performed with the authenticator.

25. The apparatus of claim 21, wherein the instructions are operable to cause the apparatus to:
receive an indication that the AN performs authentications using an authenticator,
wherein the instructions to determine to perform the authentication are operable based at least in part on receiving the indication that the AN performs authentications using the authenticator.

26. The apparatus of claim 25, wherein the indication that the AN performs authentications using the authenticator is received in at least one of:
system information, a random access channel (RACH) establishment message, or a combination thereof.

27. The apparatus of claim 21, wherein the instructions are operable to cause the apparatus to:
receive an indication that the AN performs authentications using a second authenticator, wherein the second authenticator is contained in a core network (CN) associated with the AN.

28. The apparatus of claim 27, wherein the instructions to determine to perform an authentication are operable to cause the apparatus to:
select an authenticator that is co-located with the AN, the second authenticator, or both to perform the authentication.

29. The apparatus of claim 21, wherein the instructions to determine to perform the authentication are operable based at least in part on a configuration of the AN stored at the wireless device.

30. The apparatus of claim 29, wherein the instructions are operable to cause the apparatus to:
receive an identifier associated with the AN; and
retrieve the configuration of the AN based at least in part on the received identifier.

31. The apparatus of claim 21, wherein the authentication is performed over a radio bearer associated with the connection established with the AN.

32. The apparatus of claim 31, wherein the authentication is performed over the RRC layer.

33. The apparatus of claim 31, wherein the at least one of the one or more protocol end points for the authentication comprises an authenticator, and wherein the instructions to perform the authentication are operable to cause the apparatus to:
exchange authentication information with the authenticator over the radio bearer;
exchange at least one random parameter with the AN over the radio bearer; and
generate a security key based at least in part on the exchanged authentication information and the at least one random parameter.

34. The apparatus of claim 33, wherein the instructions are operable to cause the apparatus to:
establish one or more additional radio bearers based at least in part on the security key; and
securely communicate with the LAN, over the connection via the radio bearer, the one or more additional radio bearers, or both, based at least in part on the generated security key.

35. The apparatus of claim 21, wherein the authentication is based at least in part on an extensible authentication protocol (EAP) performed over a radio bearer associated with the connection established with the AN.

36. The apparatus of claim 35, wherein the authentication is performed over the RRC layer or Ethernet.

37. The apparatus of claim 21, wherein the at least one of the one or more protocol end points for the authentication comprises a first authenticator, and the instructions are operable to cause the apparatus to:
determine to perform a second authentication with a second authenticator, the second authenticator contained in a core network (CN) in communication with the AN; and
perform the second authentication with the second authenticator via the AN.

38. The apparatus of claim 37, wherein the second authentication is performed over the NAS layer.

39. The apparatus of claim 21, wherein the connection is established using a cellular radio access technology (RAT).

40. The apparatus of claim 21, wherein the authentication is performed with an authenticator that is co-located with the AN, or an authenticator that is hosted at a node of the LAN located apart from the AN, or both.

41. An apparatus for wireless communication at a wireless device, the apparatus comprising:
means for establishing a connection with an access node (AN) of a local area network (LAN);
means for transmitting a query to the AN for an indication of one or more protocol end points for an authentication;
means for receiving a response to the query comprising authentication end point information that includes the indication of the one or more protocol end points for the authentication, wherein the one or more protocol end points comprise a non-access stratum (NAS) layer, a radio resource control (RRC) layer, or both the NAS layer and the RRC layer;

means for determining to perform the authentication via at least one of the one or more protocol end points based at least in part on the received indication of the one or more protocol end points;

means for transmitting an authentication indication comprising the determination to perform the authentication; and means for performing the authentication via the connection established with the AN and the at least one of the one or more protocol end points, based at least in part on the determination to perform the authentication.

42. A non-transitory computer-readable medium storing computer-executable code for wireless communication at a wireless device, the code executable to:

establish a connection with an access node (AN) of a local area network (LAN);

transmit a query to the AN for an indication of one or more protocol end points for an authentication;

receive a response to the query comprising authentication end point information that includes the indication of the one or more protocol end points for the authentication, wherein the one or more protocol end points comprise a non-access stratum (NAS) layer, a radio resource control (RRC) layer, or both the NAS layer and the RRC layer;

determine to perform the authentication via at least one of the one or more protocol end points based at least in part on the received indication of the one or more protocol end points; and perform the authentication via the connection established with the AN and the at least one of the one or more protocol end points, based at least in part on the determination to perform the authentication.

43. A method for wireless communication at an access node (AN) of a local area network (LAN), the method comprising:

establishing a connection with a wireless device;

receiving a query from the wireless device for an indication of one or more protocol end points for an authentication;

transmitting a response to the query comprising authentication end point information that includes the indication of the one or more protocol end points for the authentication, wherein the one or more protocol end points comprise a non-access stratum (NAS) layer, a radio resource control (RRC) layer, or both the NAS layer and the RRC layer;

receiving an authentication indication comprising a determination from the wireless device to perform the authentication; and providing communications for the authentication between the wireless device and at least one of the one or more protocol end points.

44. The method of claim 43, wherein receiving the authentication indication comprises:

receiving, from the wireless device, an indication that the authentication is to be performed with an authenticator.

45. The method of claim 44, wherein the indication that the authentication is to be performed with the authenticator is received in a RRC connection establishment message.

46. The method of claim 44, wherein the indication that the authentication is to be performed with the authenticator is received in a random access message from the wireless device on at least one resource.

47. The method of claim 43, wherein transmitting the response to the query comprising authentication end point information that includes the indication of the one or more protocol end points for the authentication comprises:

transmitting an indication that the AN performs authentications using an authenticator.

48. The method of claim 47, wherein the indication that the AN performs authentications using the authenticator is transmitted in at least one of:

system information, a random access channel (RACH) establishment message, or a combination thereof.

49. The method of claim 47, further comprising:

transmitting an indication that the AN performs authentications using a second authenticator, wherein the second authenticator is contained in a core network (CN) associated with the AN.

50. The method of claim 43, wherein providing communications for the authentication comprises:

transmitting messages associated with the authentication over a radio bearer associated with the connection established with the wireless device.

51. The method of claim 50, wherein the messages are transmitted over the RRC layer.

52. The method of claim 50, further comprising:

exchanging authentication information with the wireless device over the radio bearer;

exchanging at least one random parameter with the wireless device over the radio bearer; and generating a security key based at least in part on the exchanged authentication information and the at least one random parameter.

53. The method of claim 52, further comprising:

establishing one or more additional radio bearers based at least in part on the security key; and securely communicating with the LAN, over the connection via the radio bearer, the one or more additional radio bearers, or both, based at least in part on the generated security key.

54. The method of claim 43, wherein providing communications for the authentication comprises:

transmitting messages pertaining to an authentication procedure over the connection established with the wireless device, wherein the authentication procedure is based at least in part on an extensible authentication protocol (EAP).

55. The method of claim 54, wherein the authentication procedure is performed over the RRC layer or Ethernet.

56. The method of claim 43, wherein the at least one of the one or more protocol end points for the authentication comprises a first authenticator, the method further comprising:

determining that the wireless device has determined to perform a second authentication with a second authenticator, wherein the second authenticator is contained in a core network (CN) in communication with the AN; and transmitting messages associated with the second authentication.

57. The method of claim 56, wherein the second authentication is performed over the NAS layer.

58. The method of claim 43, wherein the connection is established using a cellular radio access technology (RAT).

59. The method of claim 43, wherein the authentication is performed with an authenticator that is co-located with the AN, with an authenticator that is hosted at a node of the LAN located apart from the AN, or both.

60. An apparatus for wireless communication at an access node (AN) of a local area network (LAN), comprising:
a processor; and
memory in electronic communication with the processor;
instructions stored in the memory and operable, when executed by the processor, to cause the apparatus to:
establish a connection with a wireless device;
receive a query from the wireless device for an indication of one or more protocol end points for an authentication;
transmit a response to the query comprising authentication end point information that includes the indication of the one or more protocol end points for the authentication, wherein the one or more protocol end points comprise a non-access stratum (NAS) layer, a radio resource control (RRC) layer, or both the NAS layer and the RRC layer;
receive an authentication indication comprising a determination from the wireless device to perform the authentication; and
provide communications for the authentication between the wireless device and at least one of the one or more protocol end points.

61. The apparatus of claim 60, wherein the instructions are operable to cause the apparatus to:
receive, from the wireless device, an indication that the authentication is to be performed with an authenticator.

62. The apparatus of claim 61, wherein the indication that the authentication is to be performed with the authenticator is received in a RRC connection establishment message.

63. The apparatus of claim 61, wherein the indication that the authentication is to be performed with the authenticator is received in a random access message from the wireless device on at least one resource.

64. The apparatus of claim 60, wherein the instructions are operable to cause the apparatus to:
transmit an indication that the AN performs authentications using an authenticator.

65. The apparatus of claim 64, wherein the indication that the AN performs authentications using the authenticator is transmitted in at least one of:
system information, a random access channel (RACH) establishment message, or a combination thereof.

66. The apparatus of claim 64, wherein the instructions are operable to cause the apparatus to:
transmit an indication that the AN performs authentications using a second authenticator, wherein the second authenticator is contained in a core network (CN) associated with the AN.

67. The apparatus of claim 60, wherein the instructions to provide communications for the authentication are operable to cause the apparatus to:
transmit messages associated with the authentication over a radio bearer associated with the connection established with the wireless device.

68. The apparatus of claim 67, wherein the messages are transmitted over the RRC layer.

69. The apparatus of claim 67, wherein the instructions are operable to cause the apparatus to:
exchange authentication information with the wireless device over the radio bearer;
exchange at least one random parameter with the wireless device over the radio bearer; and
generate a security key based at least in part on the exchanged authentication information and the at least one random parameter.

70. The apparatus of claim 69, wherein the instructions are operable to cause the apparatus to:
establish one or more additional radio bearers based at least in part on the security key; and
securely communicate with the LAN, over the connection via the radio bearer, the one or more additional radio bearers, or both, based at least in part on the generated security key.

71. The apparatus of claim 60, wherein the instructions to provide communications for the authentication are operable to cause the apparatus to:
transmit messages pertaining to an authentication procedure over the connection established with the wireless device, wherein the authentication procedure is based at least in part on an extensible authentication protocol (EAP).

72. The apparatus of claim 71, wherein the authentication procedure is performed over the RRC layer or Ethernet.

73. The apparatus of claim 60, wherein the at least one of the one or more protocol end points for the authentication comprises a first authenticator, and the instructions are operable to cause the apparatus to:
determine that the wireless device has determined to perform a second authentication with a second authenticator, wherein the second authenticator is contained in a core network (CN) in communication with the AN; and
transmit messages associated with the second authentication.

74. The apparatus of claim 73, wherein the second authentication is performed over the NAS layer.

75. The apparatus of claim 60, wherein the connection is established using a cellular radio access technology (RAT).

76. The apparatus of claim 60, wherein the authentication is performed with an authenticator that is co-located with the AN, with an authenticator that is hosted at a node of the LAN located apart from the AN, or both.

77. An apparatus for wireless communication at an access node (AN) of a local area network (LAN), the apparatus comprising:
means for establishing a connection with a wireless device;
means for receiving a query from the wireless device for an indication of one or more protocol end points for an authentication;
means for transmitting a response to the query comprising authentication end point information that includes the indication of the one or more protocol end points for the authentication, wherein the one or more protocol end points comprise a non-access stratum (NAS) layer, a radio resource control (RRC) layer, or both the NAS layer and the RRC layer;
means for receiving an authentication indication comprising a determination from the wireless device to perform the authentication; and
means for providing communications for the authentication between the wireless device and at least one of the one or more protocol end points.

78. A non-transitory computer-readable medium storing computer-executable code for wireless communication at an access node (AN) of a local area network (LAN), the code executable to:
establish a connection with a wireless device;
receive a query from the wireless device for an indication of one or more protocol end points for an authentication;

transmit a response to the query comprising authentication end point information that includes the indication of the one or more protocol end points for the authentication, wherein the one or more protocol end points comprise a non-access stratum (NAS) layer, a radio resource control (RRC) layer, or both the NAS layer and the RRC layer;

receive an authentication indication comprising a determination from the wireless device to perform the authentication; and provide communications for the authentication between the wireless device and at least one of the one or more protocol end points.

\* \* \* \* \*